United States Patent [19]

Sasaki et al.

[11] 4,251,613
[45] Feb. 17, 1981

[54] DISAZO COMPOUNDS, PROCESS FOR PREPARATION OF SAME AND APPLICATION OF SAID DISAZO COMPOUNDS AND ANALOGUES THEREOF TO ELECTROPHOTOGRAPHIC SENSITIVE MATERIALS

[75] Inventors: Masaomi Sasaki, Kawasaki; Kiyoshi Sakai, Tokyo; Mitsuru Hashimoto, Hino; Masafumi Ohta, Yokohama; Kyoji Tsutsui, Tokyo, all of Japan

[73] Assignee: Ricoh Company, Ltd., Tokyo, Japan

[21] Appl. No.: 908,116

[22] Filed: May 22, 1978

[30] Foreign Application Priority Data

| Jun. 8, 1977 | [JP] | Japan | 52-66711 |
| Jun. 9, 1977 | [JP] | Japan | 52-68182 |
| Jun. 20, 1977 | [JP] | Japan | 52-72205 |
| Jun. 30, 1977 | [JP] | Japan | 52-77155 |

[51] Int. Cl.$^3$ .................... G03G 5/06; G03G 13/22
[52] U.S. Cl. ...................... 430/72; 430/58; 430/75; 430/78; 260/176
[58] Field of Search .............. 252/501; 430/58, 72, 430/75, 76, 78; 260/176, 174

[56] References Cited

U.S. PATENT DOCUMENTS

| 4,026,704 | 5/1977 | Rochlitz | 96/1.5 |
| 4,051,123 | 9/1977 | Philler et al. | 96/1.6 |
| 4,052,210 | 10/1977 | Hectors | 96/1.5 |

*Primary Examiner*—Dennis E. Talbert, Jr.
*Assistant Examiner*—John L. Goodrow
*Attorney, Agent, or Firm*—Blanchard, Flynn, Thiel, Boutell & Tanis

[57] ABSTRACT

The present invention provides disazo compounds expressed by the general formula I

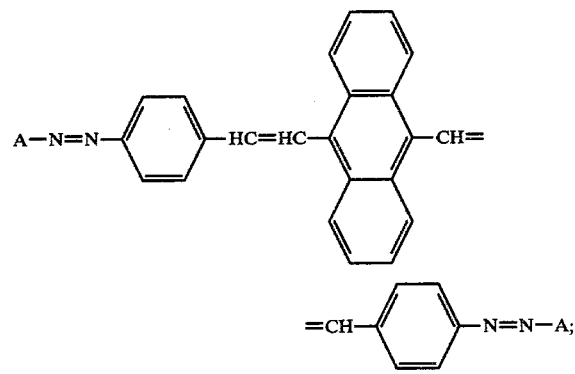

a process for the preparation of said compounds; and electrophotographic sensitive material having a high sensitivity as well as a high flexibility which comprise a conductive support and a photosensitive layer formed thereon, said photosensitive layer containing a disazo compound, as an effective ingredient, which is expressed by the general formula II A'—N═N—Z—N═N—A'.

60 Claims, 6 Drawing Figures

DISAZO COMPOUNDS, PROCESS FOR PREPARATION OF SAME AND APPLICATION OF SAID DISAZO COMPOUNDS AND ANALOGUES THEREOF TO ELECTROPHOTOGRAPHIC SENSITIVE MATERIALS

BACKGROUND OF THE INVENTION (a) Field of the Invention

The present invention relates to novel disazo compounds, a process for the preparation of the same, and application of said disazo compounds as well as analogues thereof to electrophotographic sensitive materials.

(b) Description of the Prior Art

It is known that some organic compounds, for instance, indigo-type compounds, phthalocyanine-type compounds, etc. are useful as a photoconductive material for preparing photosensitive materials for use in the electrophotographic process. The "electrophotographic process" herein is one of the image-forming process which generally comprise first charging a photo-conductive sensitive material with the electric charge by corona discharge or the like in the dark, subsequently subjecting it to image-wise exposure so as to discharge the electric charge of the exposed area selectively, thereby obtaining an electrostatic latent image, and then rendering visible this latent image area by a developing means employing a toner, etc., thereby forming an intended image. As the fundamental characteristics required for the photosensitive materials for use in such an electrophotographic process, there are enumerated (1) an appropriate chargeability in the dark, (2) a low dischargeability in the dark, and (3) a rapid dischargeability upon exposure to light. As a matter of fact, however, the known photoconductive organic compounds have not always sufficiently satisfied these requirements.

As applicable photoconductive materials, there are known inorganic materials such as selenium, zinc oxide, etc., of which selenium has admittedly been widely put to practical use. However, with the adoption of various processes in the latest electrophotographic processes, there is an increasing demand for, for instance, a belt-shaped photosensitive material or the like having the aforementioned fundamental characteristics as well as a satisfactory flexibility with respect to the shape thereof. In this regard, the foregoing selenium is generally difficult to form into a photosensitive material having such a shape as above.

Meanwhile, there are known electrophotographic sensitive materials prepared by forming a photosensitive layer containing some azo compound, as an effective ingredient, on a conductive support; for instance, one prepared by employing monoazo compound has been disclosed in Japanese Patent Publication No. 16474/1969, and ones prepared by employing benzidine-type disazo compound have been disclosed in U.S. Pat. Nos. 3,898,048 and 4,052,210. The azo compounds mentioned in these literatures are admittedly useful materials as an effective ingredient of the photosensitive layer, but when various requirements for photosensitive materials are taken into account from the view point of the electrophotographic process, there has in fact not yet been obtained such a material as will sufficiently meet these requirements. Therefore, it is desirable to find a wide variety of compounds, not limited to azo compounds, and which are effective for use in electrophotographic sensitive materials so as to make it possible to select an appropriate one, and in this way, it will become possible for the first time to provide photosensitive material apposite to a certain specific process.

Figure 1:
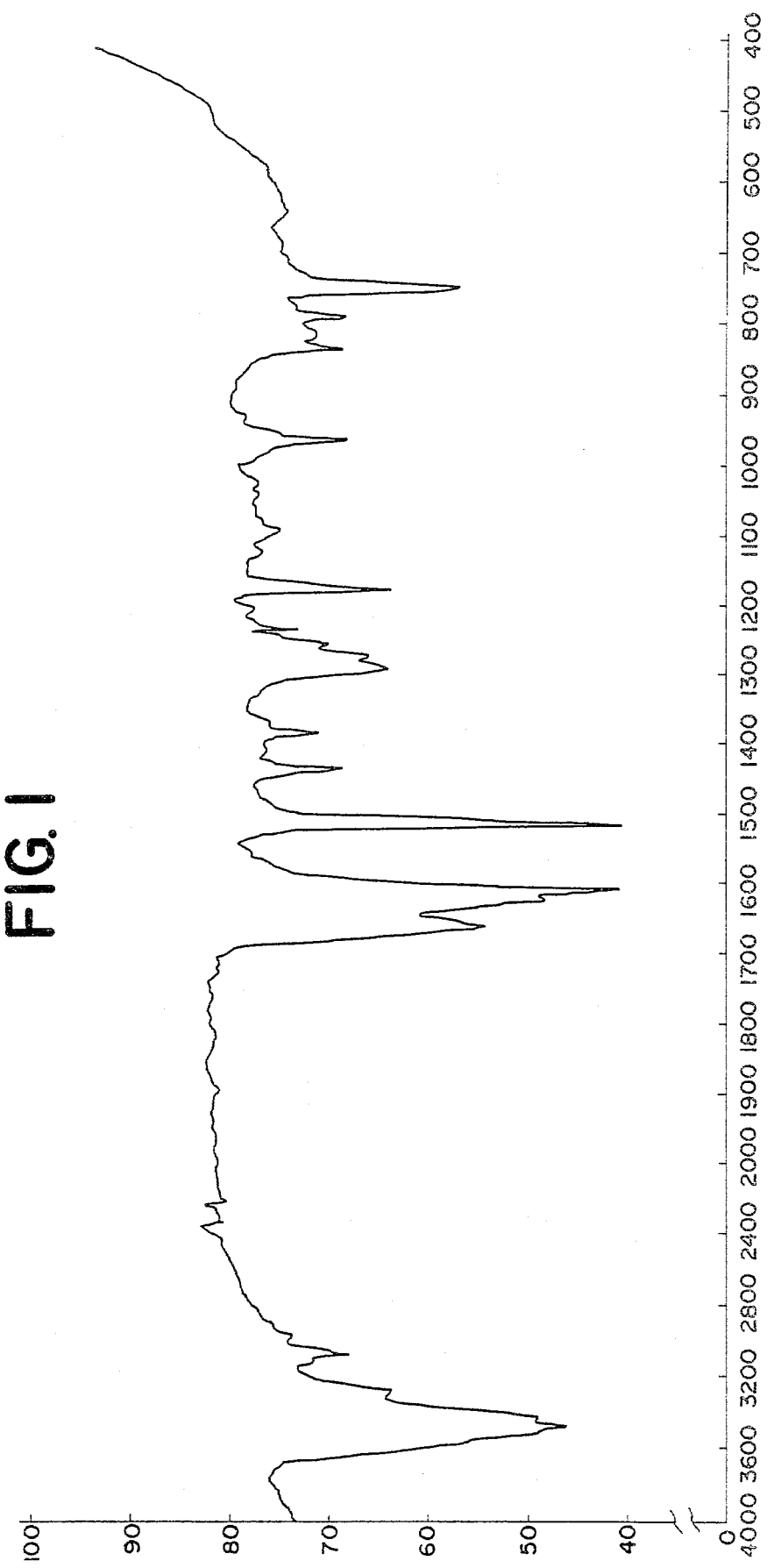
FIG. 1 and FIG. 2 are the infrared absorption spectra of 9,10-bis(4-aminostyryl)anthracene used as an intermediate for the preparation of disazo compounds according to the present invention and that of the tetrazonium difluoroborate thereof, respectively.

In the drawings, 1 denotes a conductive support, 2, 2'0 and 2" denote respectively a photosensitive layer, 3 denotes a binder, 4 denotes a disazo compound, 5 denotes a charge-transfer medium, 6 denotes a charge-carrier generating layer, and 7 denotes a charge-transfer medium layer.

SUMMARY OF THE INVENTION

A primary object of the present invention is to provide novel disazo compounds which are free from the drawbacks possessed by the photoconductive substances employed for the above described photosensitive materials and are especially useful as a photoconductive material, as well as a process for the preparation of said compounds.

A secondary object of the present invention is to provide electrophotographic sensitive materials having a high sensitivity as well as a high flexibility which contain a disazo compound, said disazo compound being selectable from a great variety and workable as an effective ingredient in various electrophotographic processes.

In other words, one embodiment of the present invention is a novel disazo compound expressed by the general formula I

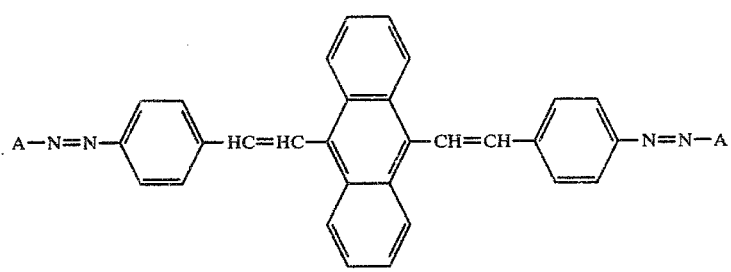

[wherein A represents

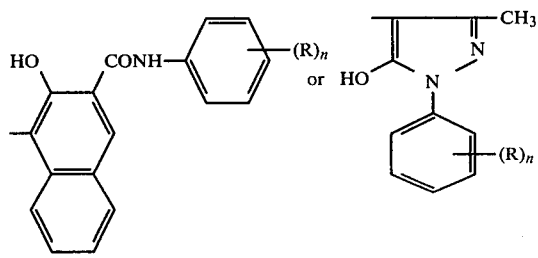

(wherein R represents alkyl radical, alkoxy radical, nitro radical, dialkylamino radical or halogen, n is 0 or an integer of 1, 2 or 3, and R may be either identical or different when n is an integer of 2 or 3)].

This novel disazo compound is in the form of colored crystals at normal temperature, and concrete examples thereof are as shown in the following Table-1.

TABLE 1

| Compound No. | Structural formula of disazo compound (melting point) | Elementary analysis value (%) actual value | Elementary analysis value (%) theoretical value | Infrared absorption spectrum (cm$^{-1}$) $\nu$C=O | Infrared absorption spectrum (cm$^{-1}$) $\delta$t-(CH=CH) | Color tone |
|---|---|---|---|---|---|---|
| I | (structure shown) (250° C. or more) | C 79.97<br>H 4.62<br>N 8.75 | 79.97<br>4.62<br>8.75 | 1680 | 965 | bluish black |
| II | (structure shown) (250° C. or more) | C 76.90<br>H 4.70<br>N 8.20 | 77.50<br>4.89<br>8.22 | 1680 | 960 | bluish black |
| III | (structure shown) (250° C. or more) | C 76.40<br>H 4.85<br>N 8.30 | 77.50<br>4.89<br>8.22 | 1680 | 960 | bluish black |
| IV | (structure shown) (250° C. or more) | C 79.70<br>H 5.01<br>N 8.45 | 80.00<br>5.05<br>8.48 | 1675 | 960 | bluish black |

TABLE 1-continued

| Compound No. | Structural formula of disazo compound (melting point) | Elementary analysis value (%) actual value | theoretical value | Infrared absorption spectrum (cm$^{-1}$) $\nu$C=O | $\delta$t-(CH=CH) | Color tone |
|---|---|---|---|---|---|---|
| V | 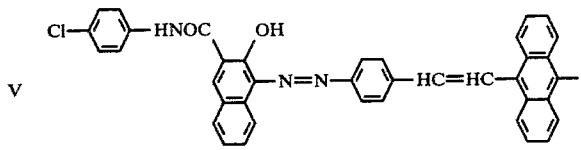 (250° C. or more) | C 75.01<br>H 4.30<br>N 8.14 | 74.49<br>4.27<br>8.15 | 1680 | 965 | bluish black |
| VI | 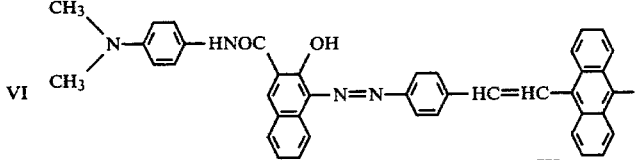 (250° C. or more) | C 77.58<br>H 5.31<br>N 9.23 | 77.86<br>5.34<br>9.16 | 1680 | 960 | bluish black |
| VII | 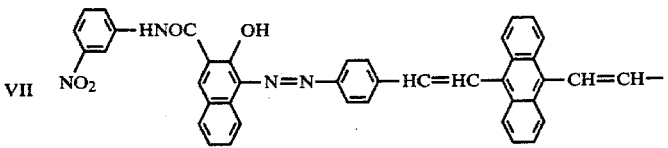 (250° C. or more) | C 73.10<br>H 4.20<br>N 10.52 | 73.00<br>4.18<br>10.65 | 1680 | 960 | bluish black |
| VIII | 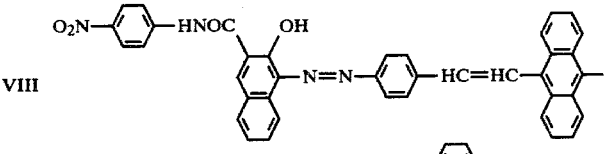 (250° C. or more) | C 73.09<br>H 4.17<br>N 10.68 | 73.00<br>4.18<br>10.65 | 1680 | 960 | bluish black |

TABLE 1-continued

| Compound No. | Structural formula of disazo compound (melting point) | Elementary analysis value (%) actual value | theoretical value | Infrared absorption spectrum (cm$^{-1}$) $\nu C{=}O$ | $\delta t{-}(CH{=}CH)$ | Color tone |
|---|---|---|---|---|---|---|
| IX | 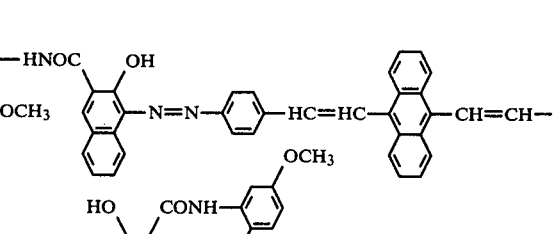 (250° C. or more) | C 74.85<br>H 5.15<br>N 7.80 | 75.28<br>5.17<br>7.75 | 1680 | 960 | bluish black |
| X | 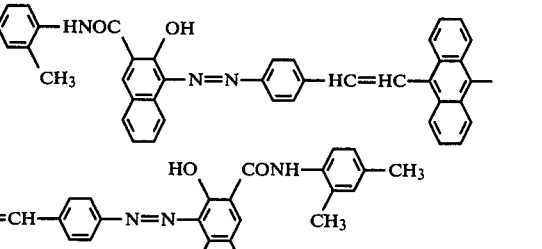 (250° C. or more) | C 79.85<br>H 5.47<br>N 8.30 | 80.00<br>5.47<br>8.24 | 1680 | 960 | bluish black |
| XI | 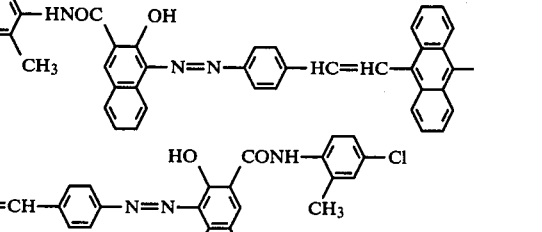 (250° C. or more) | C 74.38<br>H 4.74<br>N 7.80 | 74.65<br>4.71<br>7.92 | 1680 | 960 | bluish black |
| XII | 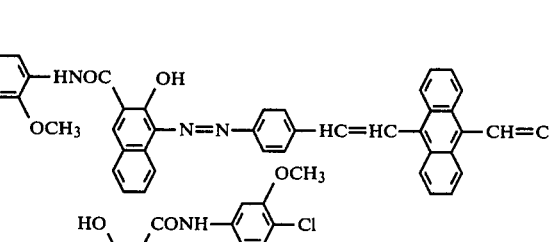 (250° C. or more) | C 70.95<br>H 4.82<br>N 7.30 | 70.65<br>4.85<br>7.27 | 1680 | 960 | bluish black (metallic luster) |

TABLE 1-continued

| Compound No. | Structural formula of disazo compound (melting point) | Elementary analysis value (%) actual value | theoretical value | Infrared absorption spectrum (cm⁻¹) $\nu C=O$ | $\delta t$-(CH=CH) | Color tone |
|---|---|---|---|---|---|---|
| XIII | (structure shown) (250° C. or more) | C 75.70<br>H 4.90<br>N 14.30 | 76.72<br>4.86<br>14.32 | 1665 | 960 | red |
| XIV | (structure shown) (250° C. or more) | C 69.08<br>H 4.36<br>N 16.01 | 68.65<br>4.35<br>16.02 | 1665 | 960 | reddish brown |

Figure 3:
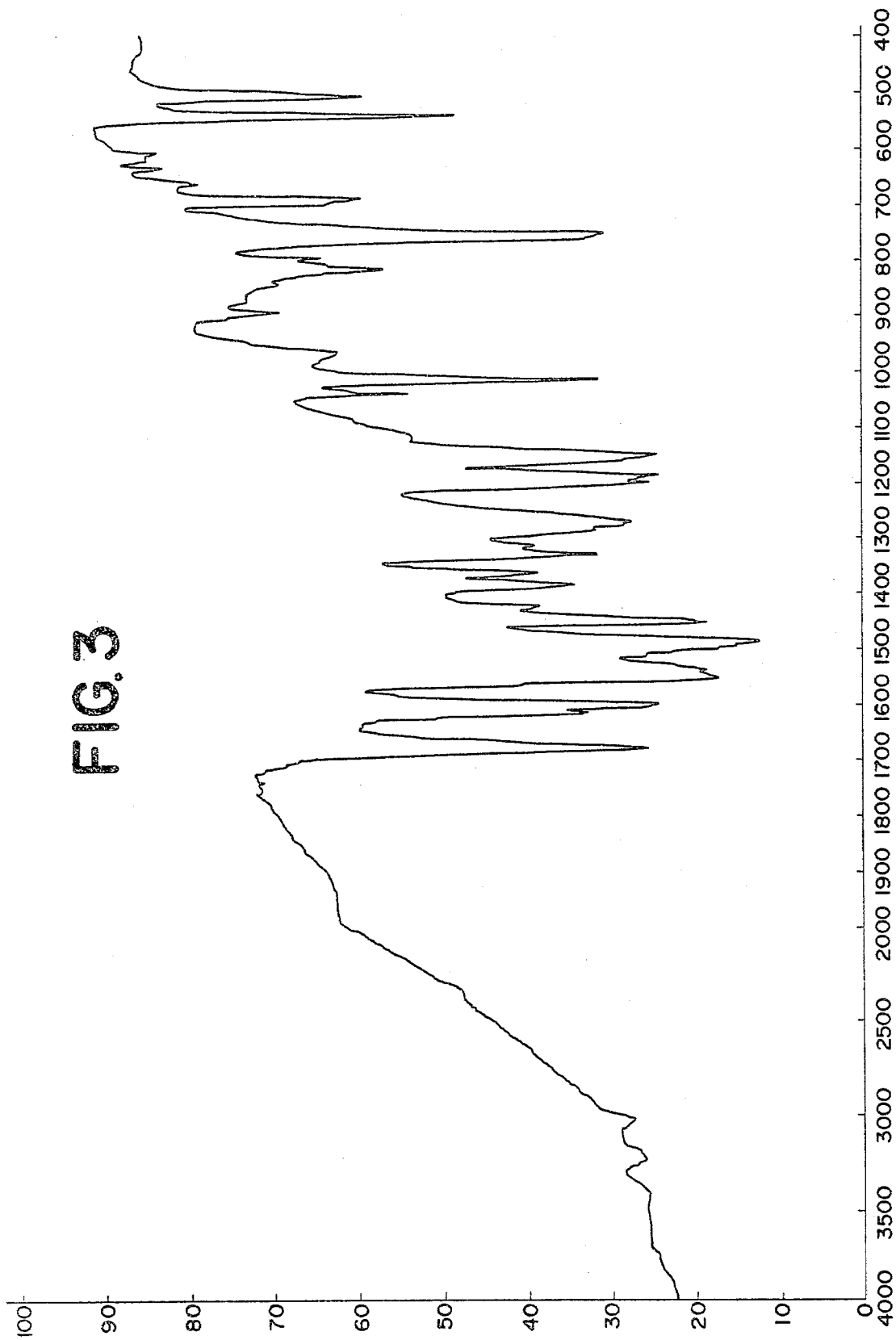
FIG. 3 is the infrared absorption spectrum of the disazo compound No. I according to the present invention.

In this connection, the infrared absorption spectrum (according to KBr Tablet process) of Compound No. (I) exemplifying these disazo compounds was shown in FIG. 3. These disazo compounds can be prepared by the procedure described below. That is to say, another embodiment of the present invention is a process for the preparation of the foregoing novel disazo compounds, which process comprises diazotizing, for instance, 9,10-bis(4-aminostyryl)anthracene obtained by reducing 9,10-bis(nitrostyryl)anthracene into a tetrazonium salt expressed by the structural formula

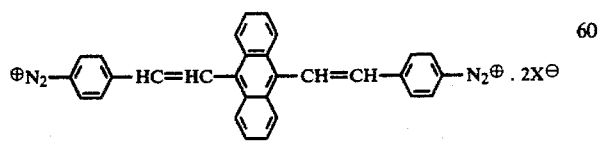

(wherein X represents anionic functional radical) and reacting this salt with a compound (coupler) expressed by the general formula

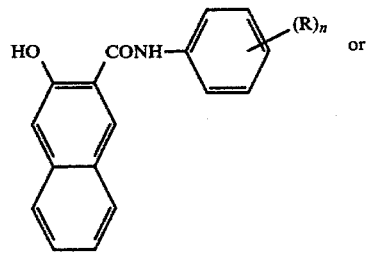

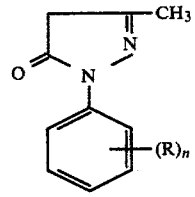

(wherein R represents alkyl, radical, alkoxy radical, nitro radical, dialkylamino radical or halogen, n is 0 or an integer of 1, 2 or 3, and R may be either identical or different when n is an integer of 2 or 3). 9,10-bis(4-aminostyryl)anthracene for use in this process is a novel compound which is obtained by reducing, for instance, 9,10-(4-nitrostyryl)anthracene expressed by the structural formula

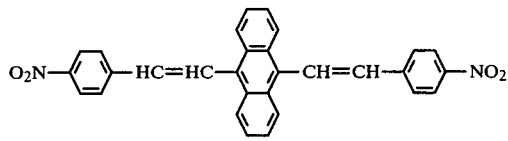

(this compound is obtained through, for instance, the process disclosed in Japanese Patent Open No. 98261/1976). This reduction is performed by effecting reaction in an organic solvent such as N,N-diethyl formamide in the presence of a reducing agent, e.g., iron-hydrochloric acid, etc. popular for use in reducing nitro radical, at a temperature of 70° to 110° C. for about 30 minutes to 2 hours.

Next, the diazotization reduction of the thus obtained 9,10-bis(4-aminostyryl)anthracene is effected by adding thereto an aqueous solution of sodium nitrite in the presence of a dilute inorganic acid such as dilute hydrochloric acid or dilute sulfuric acid at a temperature of $-10°$ C. to 10° C. This reaction completes in 30 minutes to 3 hours. Further, it is desirable to precipitate the tetrazonium salt by adding borofluoric acid or the like to the reactant mixture and then filter said salt, thereby obtaining crystals.

Subsequently, by adding either of the foregoing compounds (couplers) to this tetrazonium salt, a coupling reaction is effected between the tetrazonium salt and coupling ingredient. Practically speaking, this reaction is effected through the procedure comprising preparing a solution by mixing the tetrazonium salt and coupling ingredient with an organic solvent such as N,N-dimethyl formamide, etc. and adding to this solution dropwise an aqueous solution of alkali such as sodium acetate at a temperature of about $-10°$ C. to 10° C. This reaction completes in 5 minutes to 3 hours.

The thus prepared novel disazo compounds are useful as a photoconductive substance for electrophotographic sensitive materials as set forth above.

Therefore, still another embodiment of the present invention is the application of the thus prepared disazo compounds as well as analogues thereof to electrophotographic sensitive materials. That is to say, the photosensitive material according to the present invention is an electrophotographic sensitive material which comprises a conductive support and a photosensitive layer formed thereon, said photosensitive layer containing a disazo compound, as an effective ingredient, which is expressed by the general formula II A'-N=N-Z-N=N-A' [wherein A' represents a member selected from the group consisting of

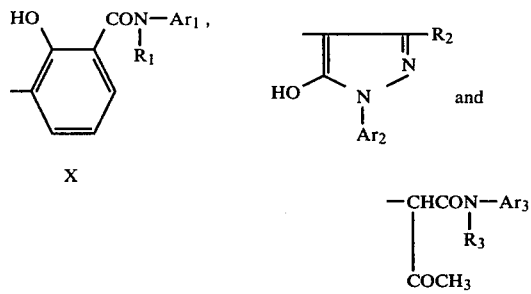

(wherein X represents any one of aromatic rings such as benzene ring, naphthalene ring, etc., hetero rings such as indole ring, carbazole ring, benzofuran ring, etc. and their substituents, $Ar_1$ represents any one of aromatic rings such as benzene ring, naphthalene ring, etc., hetero rings such as dibenzofuran, etc. and their substituents, $Ar_2$ and $Ar_3$ represent respectively any one of aromatic rings such as benzene ring, naphthalene ring, etc. and their substituents, $R_1$ and $R_3$ represent respectively any one of hydrogen, lower alkyl radical, phenyl radical and their substituents, and $R_2$ represents any one of lower alkyl radical, carboxyl radical and their esters), and Z represents a member selected from the group consisting of

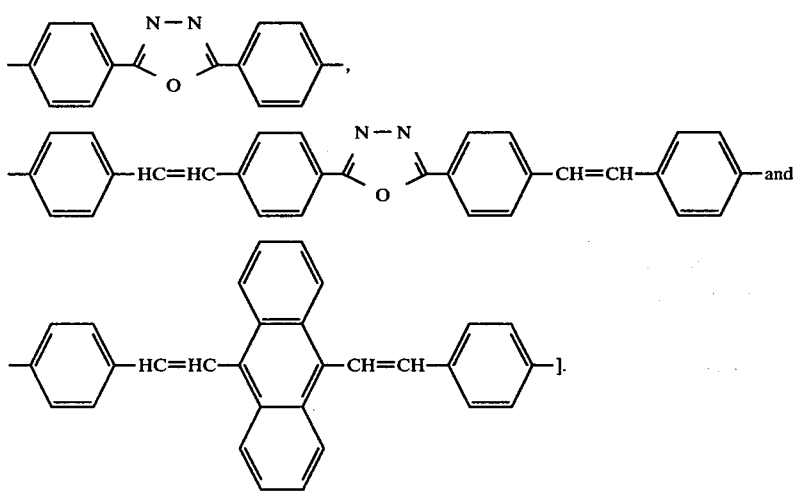

Shown hereunder in terms of the structural formulas are concrete examples of the compound expressed by the foregoing general formula II which are useful in the electrophotographic sensitive materials according to the present invention.

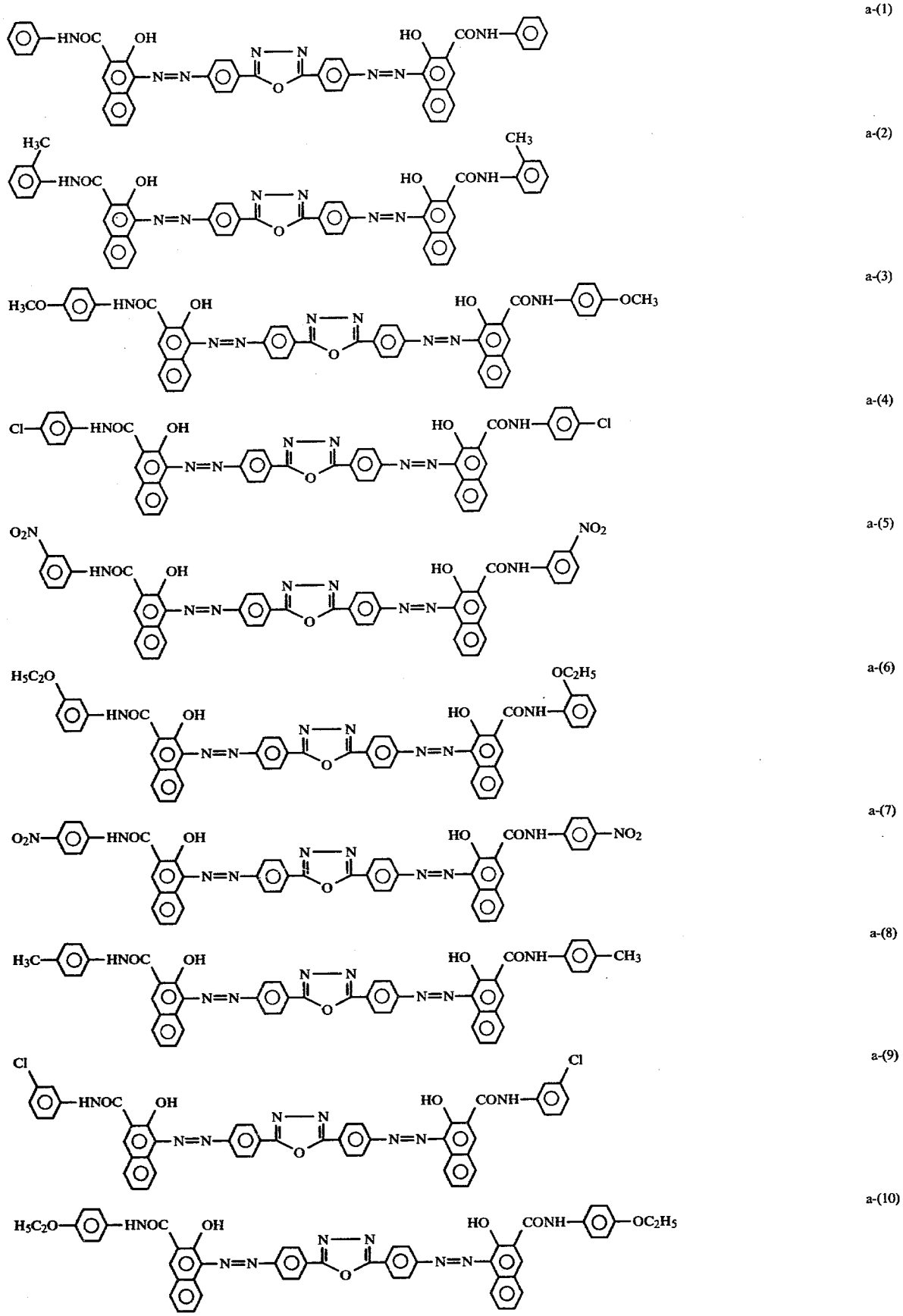

-continued
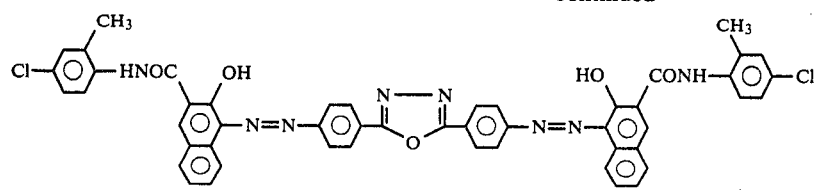
a-(11)
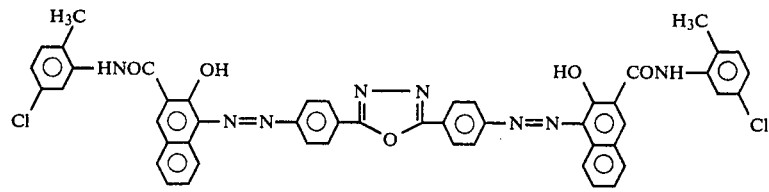
a-(12)
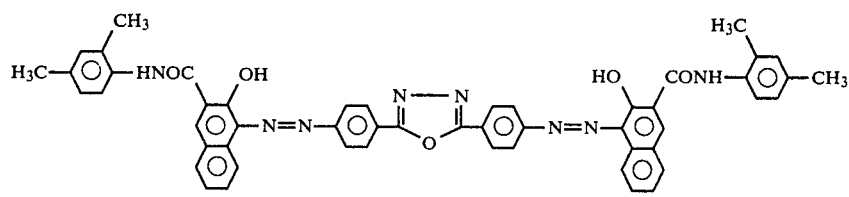
a-(13)
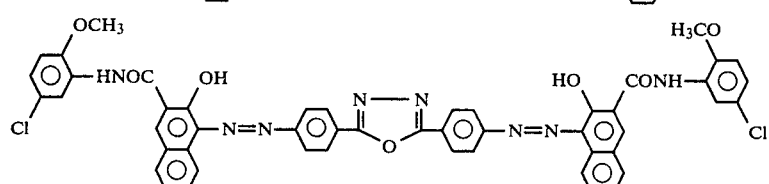
a-(14)
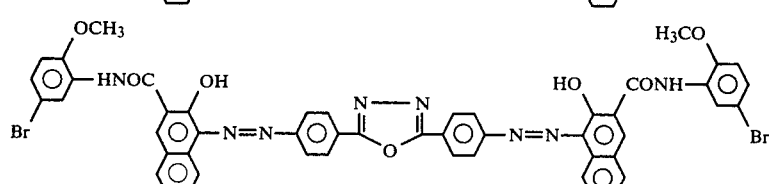
a-(15)
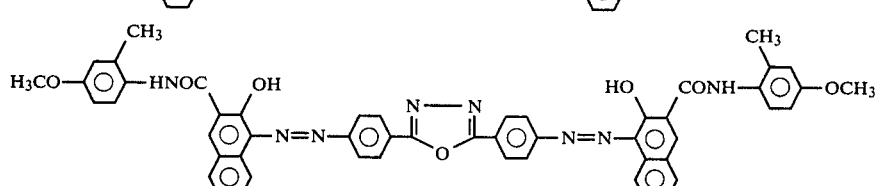
a-(16)
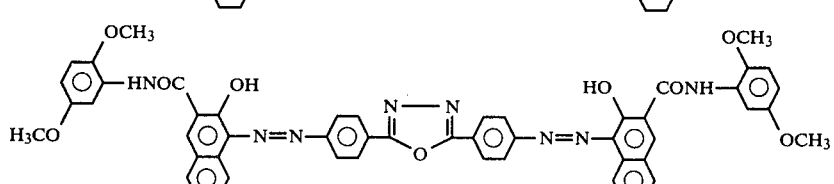
a-(17)
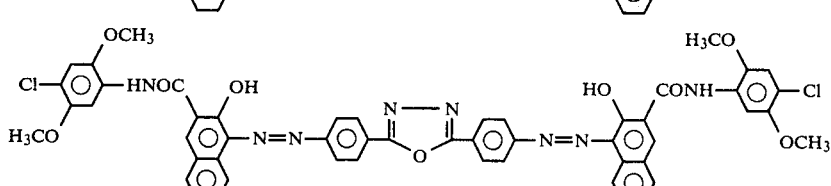
a-(18)
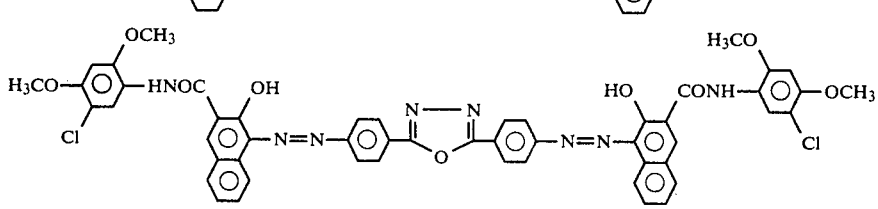
a-(19)

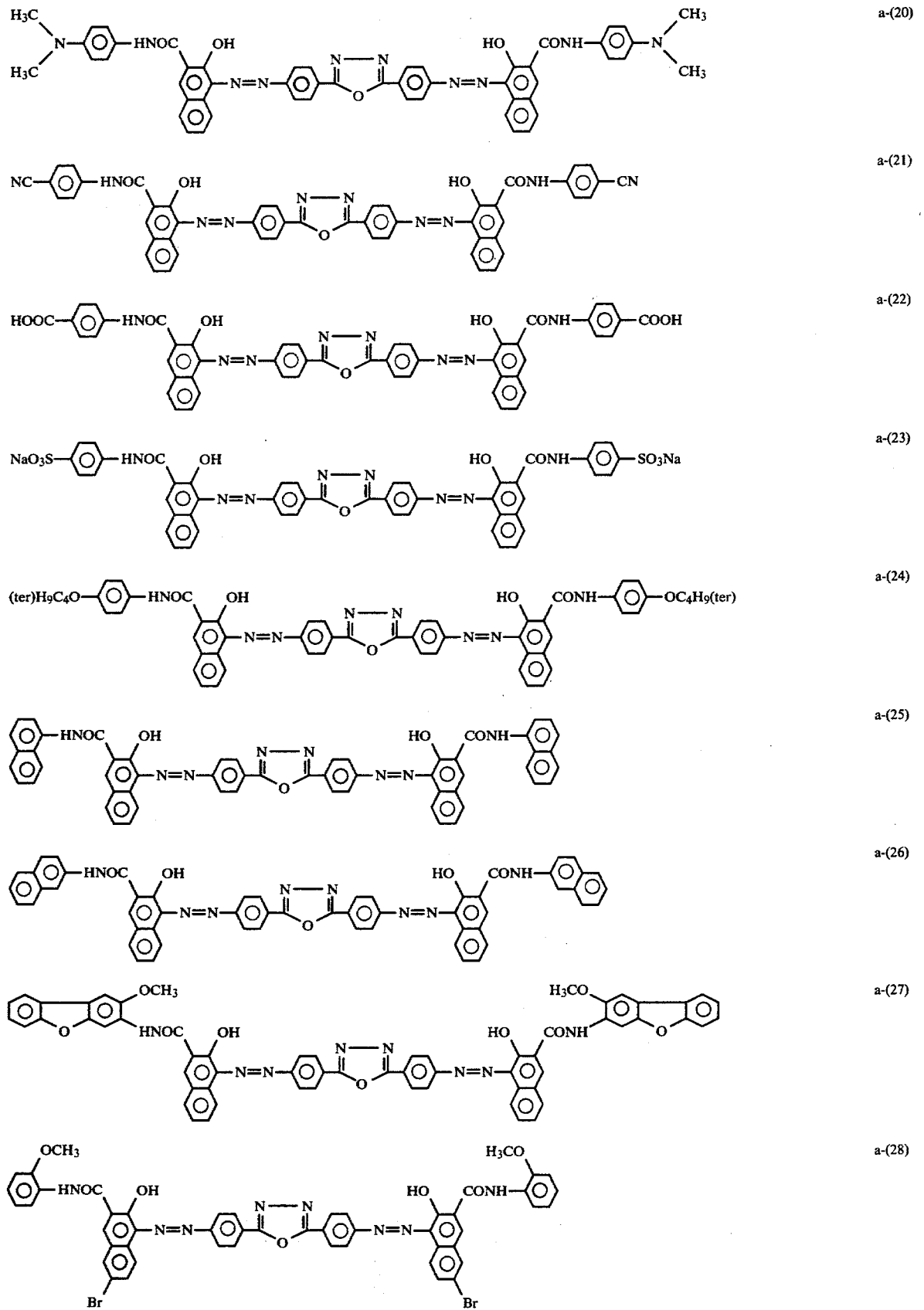

-continued
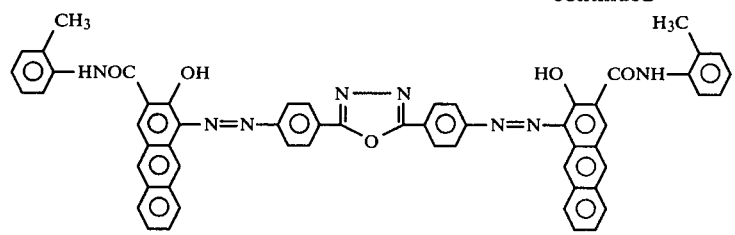
a-(29)
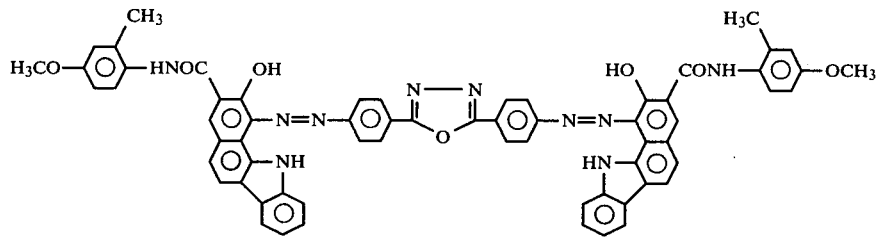
a-(30)
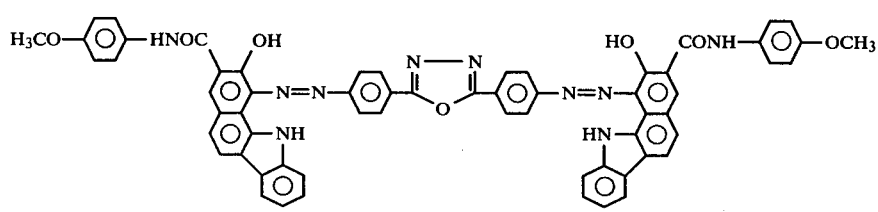
a-(31)
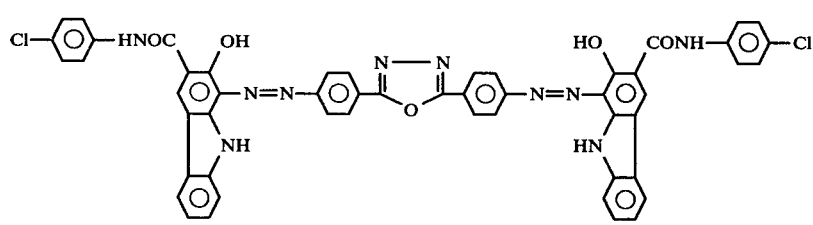
a-(32)
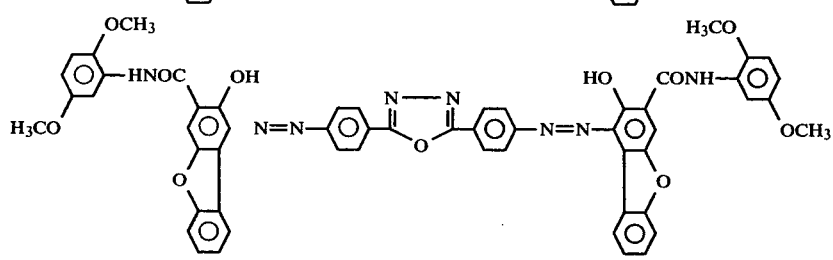
a-(33)
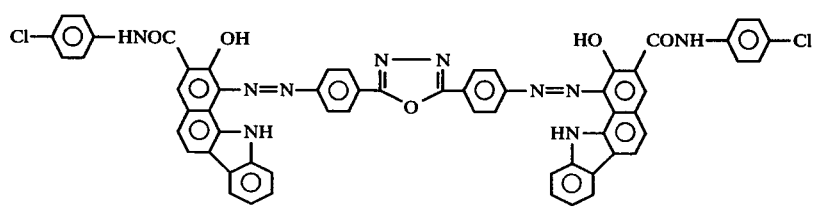
a-(34)
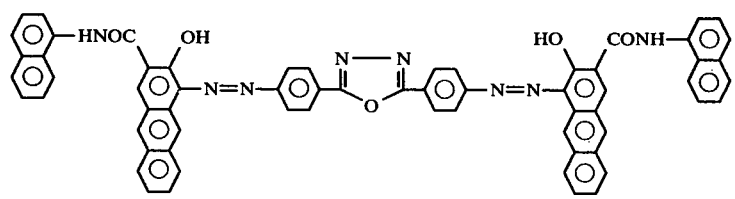
a-(35)
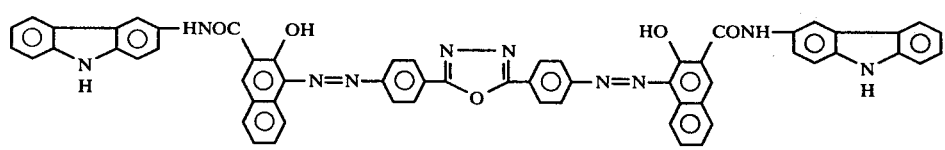
a-(36)

-continued
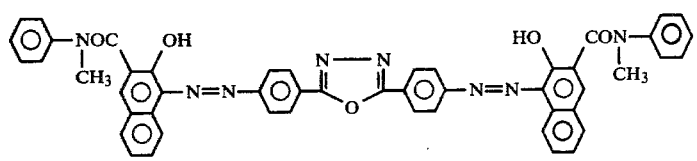
a-(37)
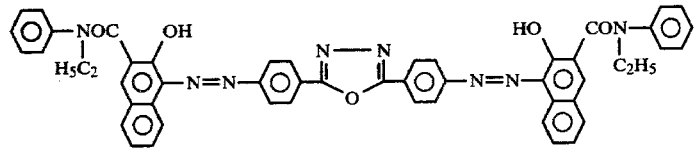
a-(38)
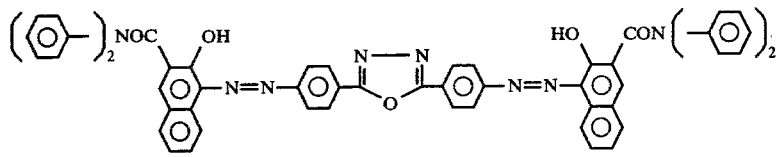
a-(39)
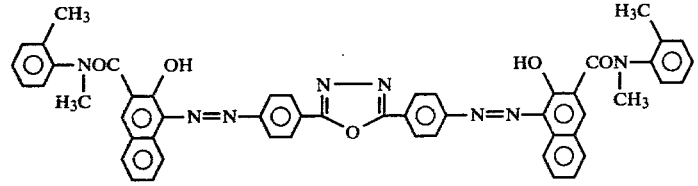
a-(40)
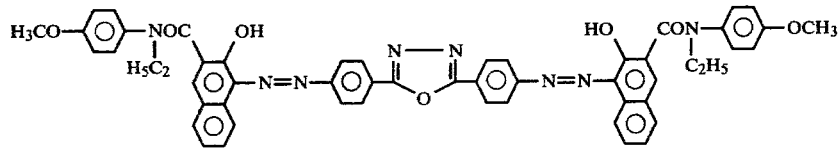
a-(41)
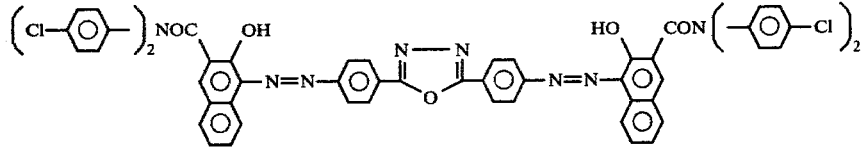
a-(42)
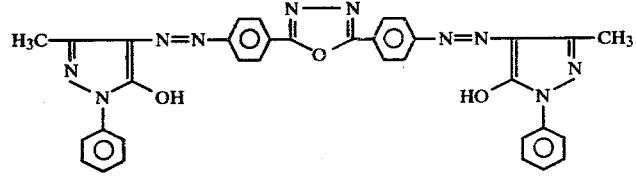
a-(43)
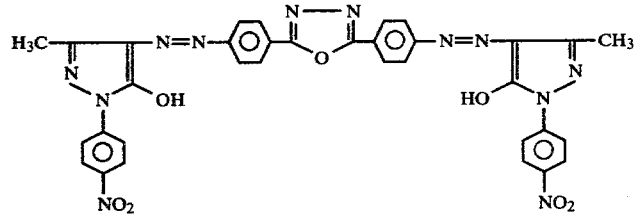
a-(44)
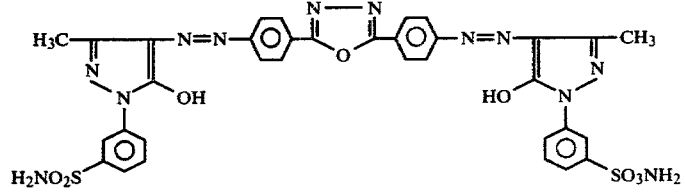
a-(45)

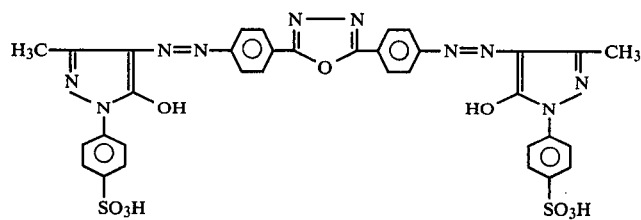
a-(46)
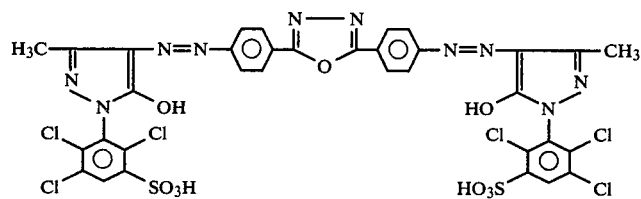
a-(47)
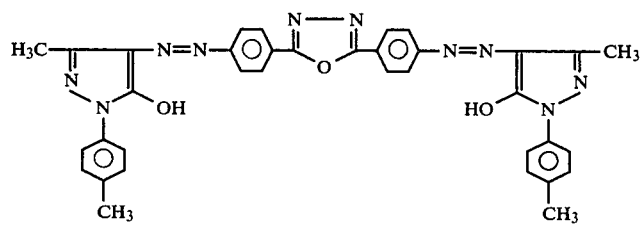
a-(48)
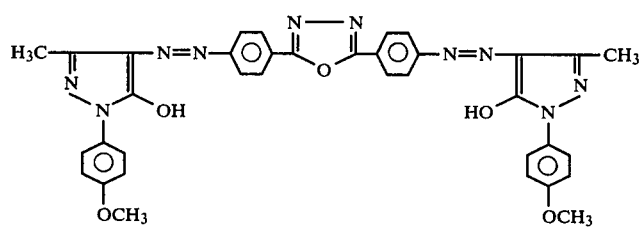
a-(49)
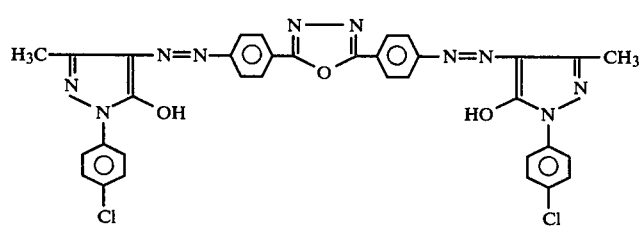
a-(50)
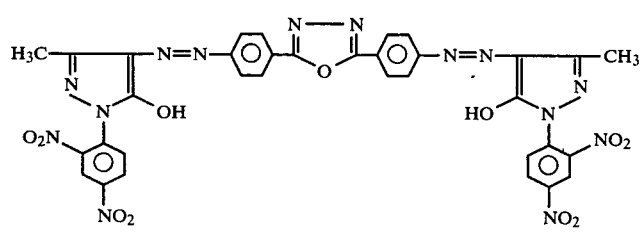
a-(51)
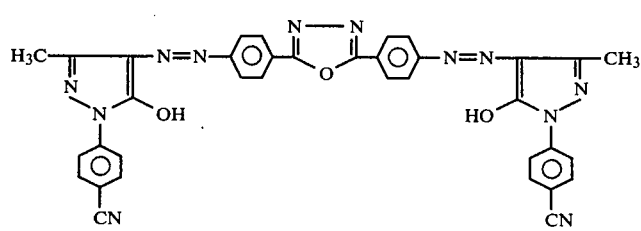
a-(52)

-continued
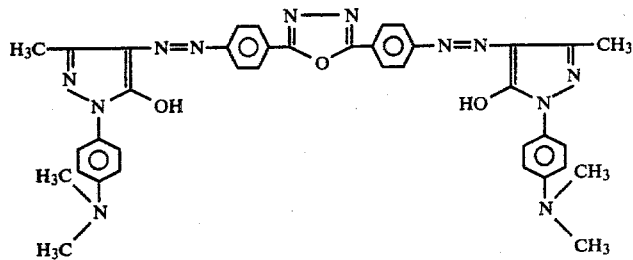
a-(53)
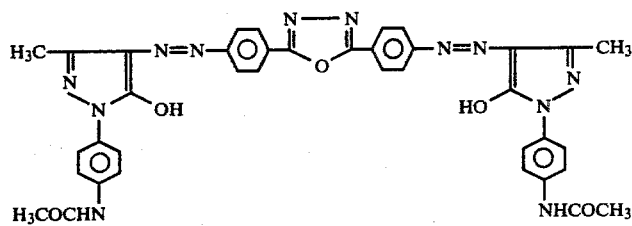
a-(54)
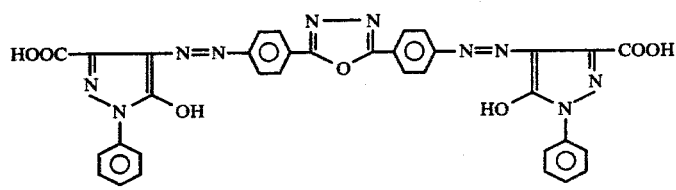
a-(55)
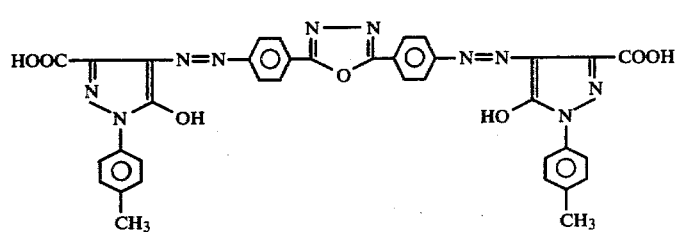
a-(56)
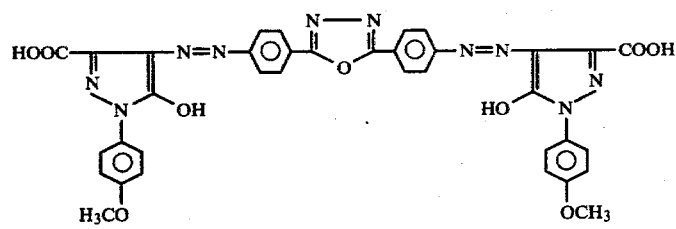
a-(57)
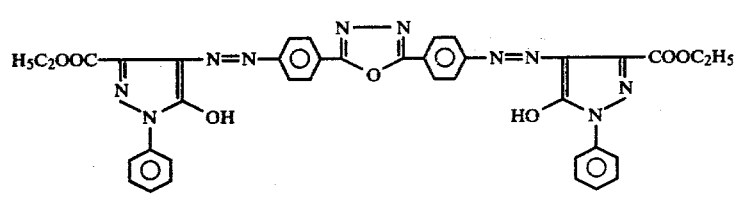
a-(58)
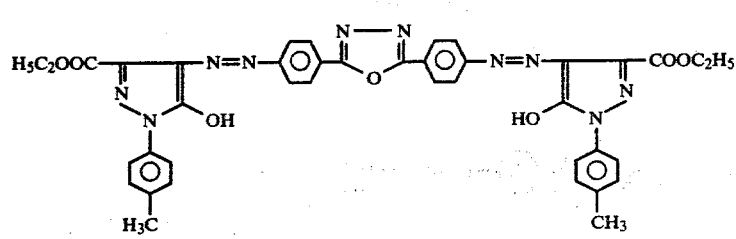
a-(59)

-continued
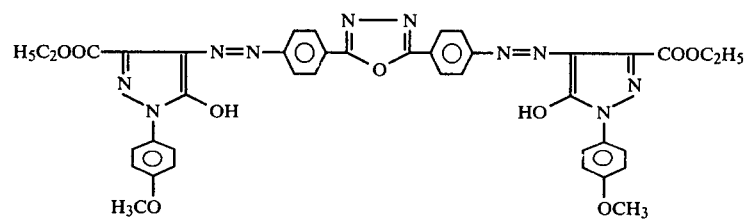 a-(60)
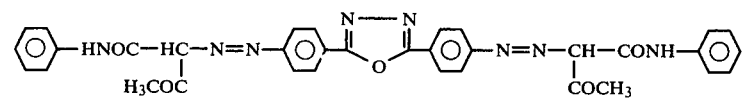 a-(61)
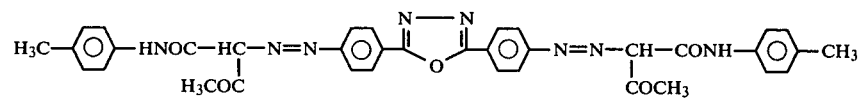 a-(62)
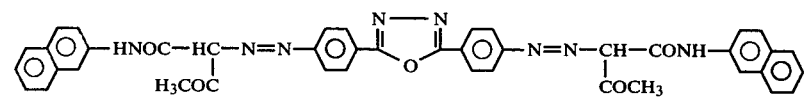 a-(63)
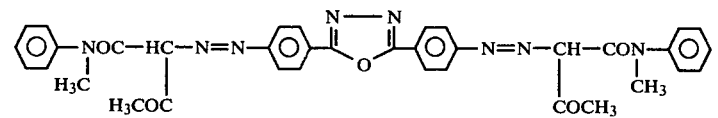 a-(64)
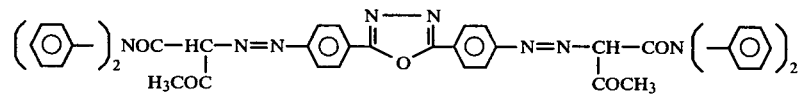 a-(65)
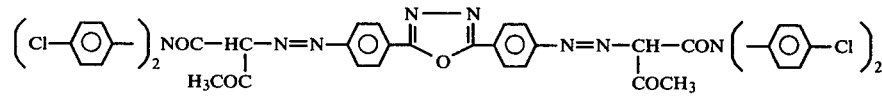 a-(66)
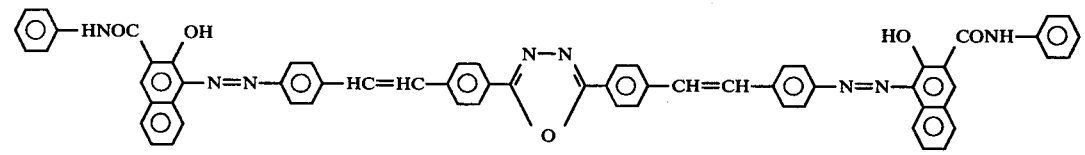 b-(1)
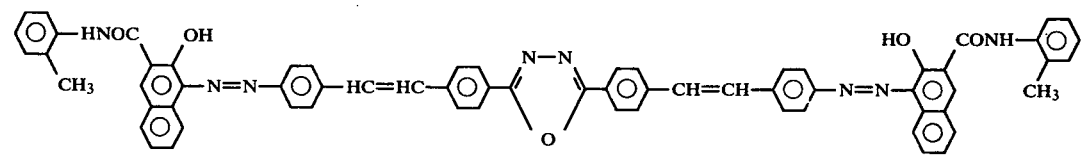 b-(2)
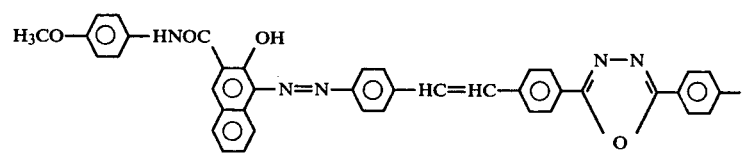 b-(3)
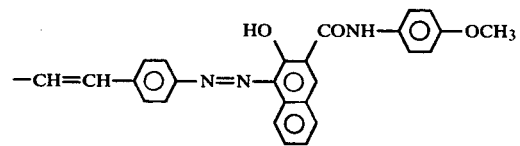
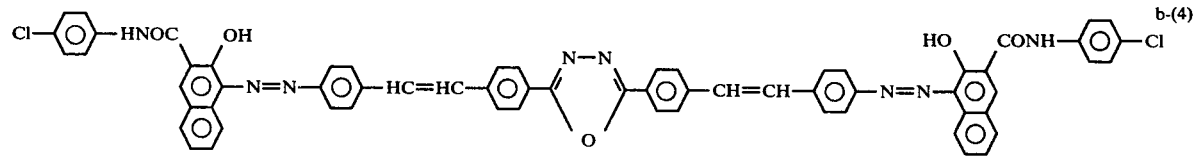 b-(4)

-continued
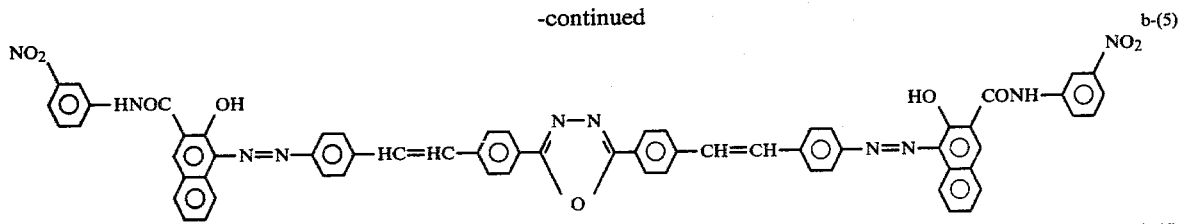
b-(5)
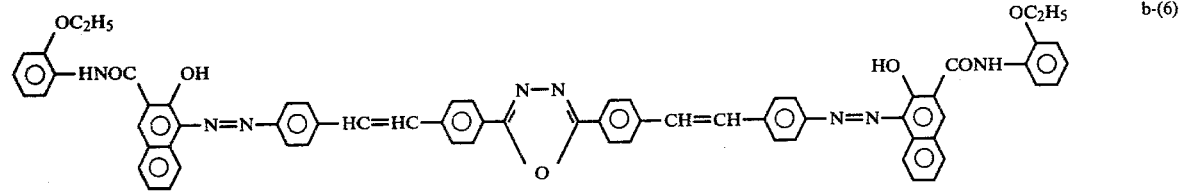
b-(6)
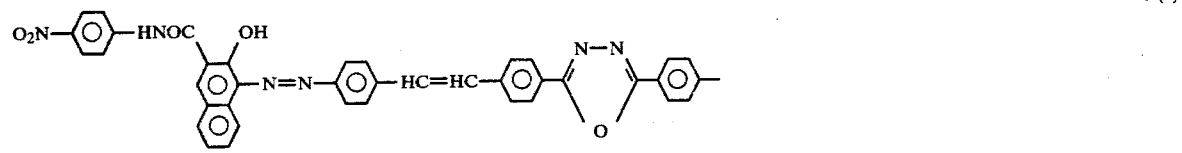
b-(7)
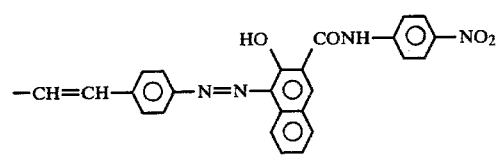
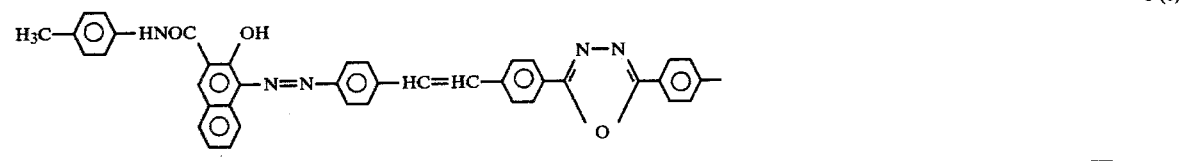
b-(8)
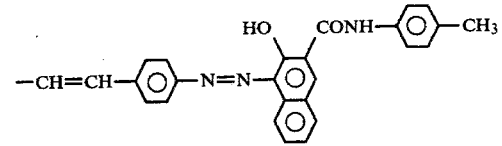
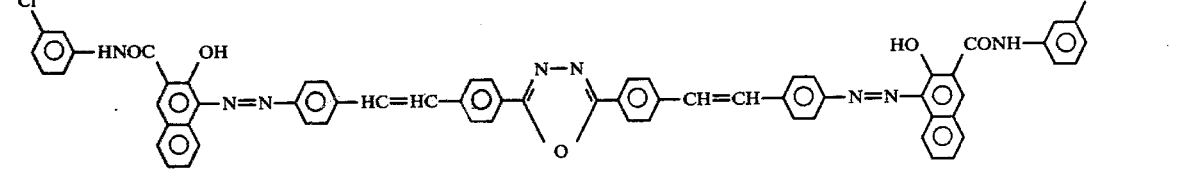
b-(9)
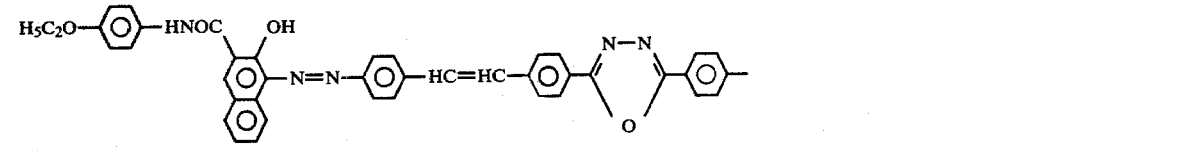
b-(10)
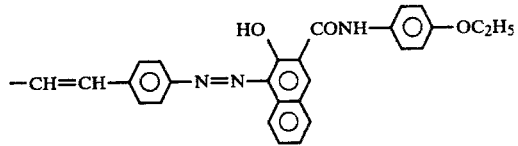
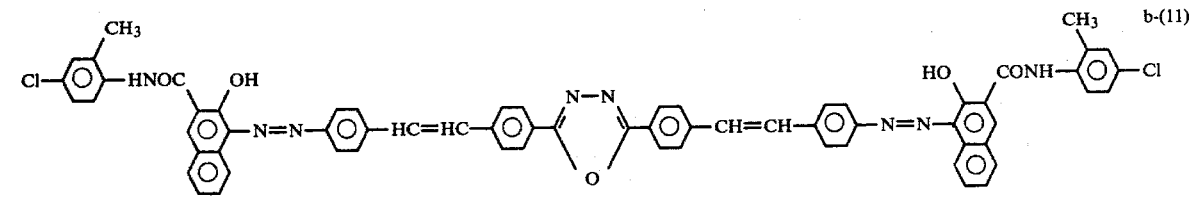
b-(11)

-continued
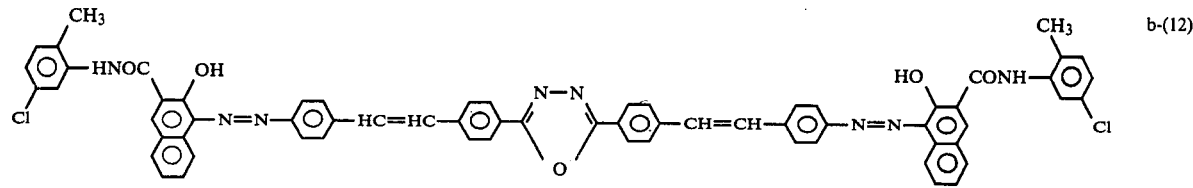
b-(12)
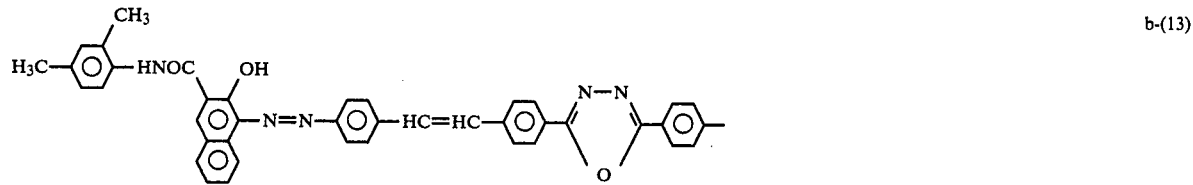
b-(13)
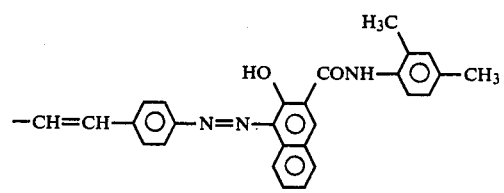
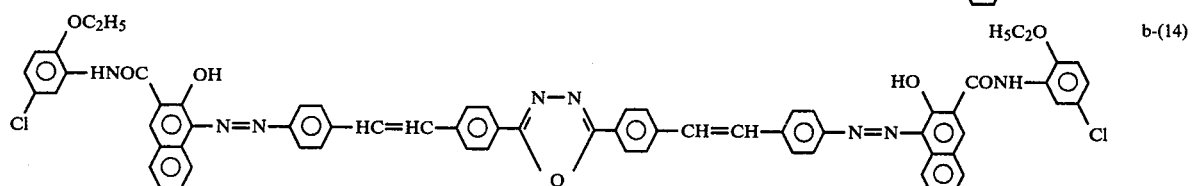
b-(14)
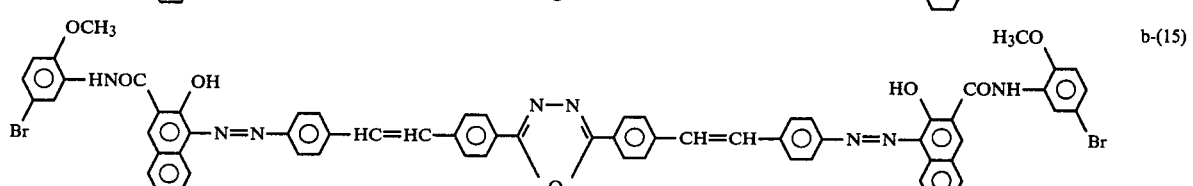
b-(15)
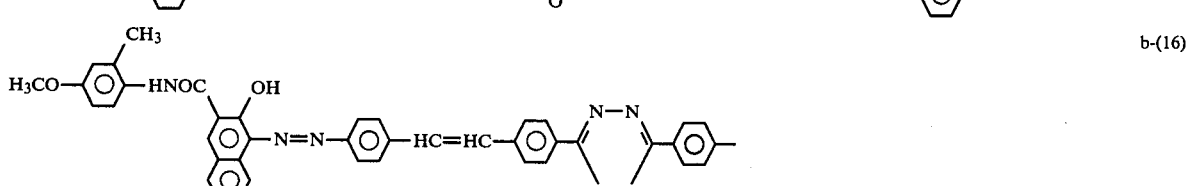
b-(16)
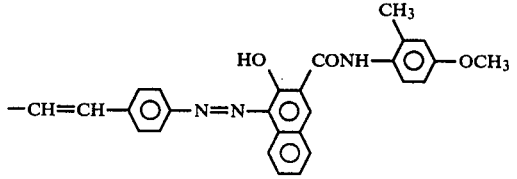
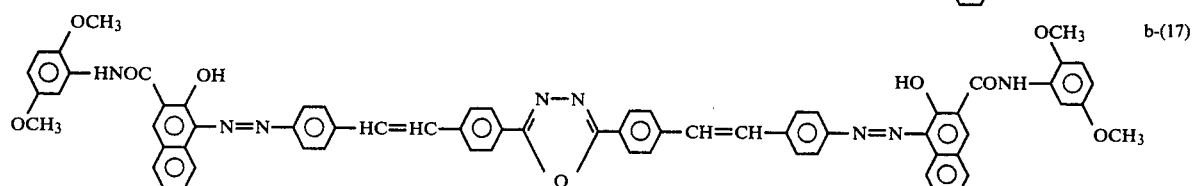
b-(17)
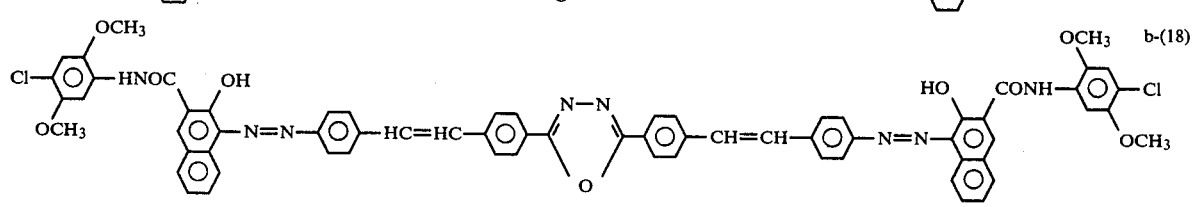
b-(18)

b-(19)
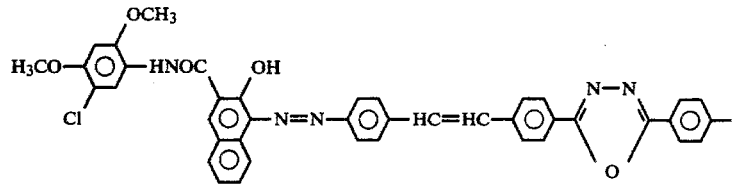
b-(20)
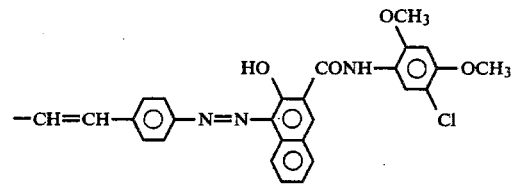
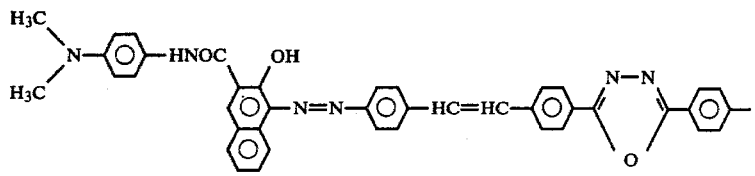
b-(21)
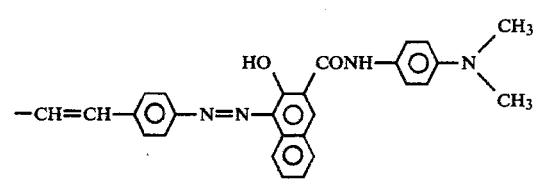
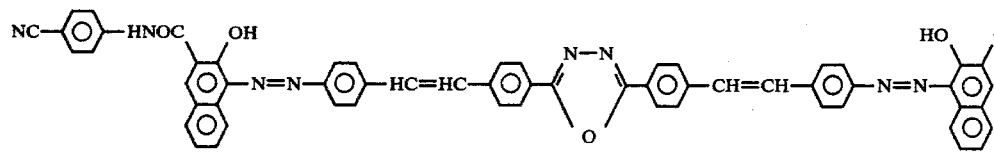
b-(22)
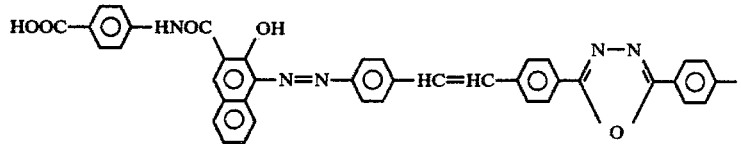
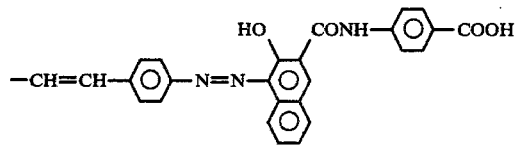
b-(23)
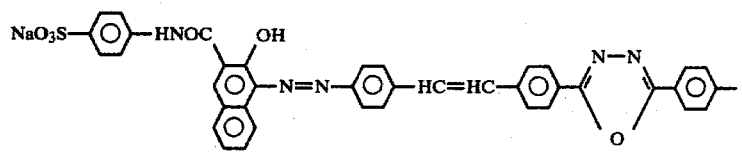
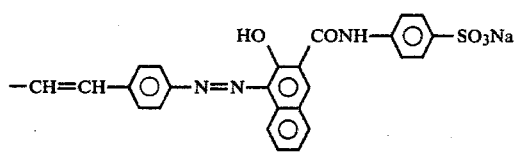
b-(24)
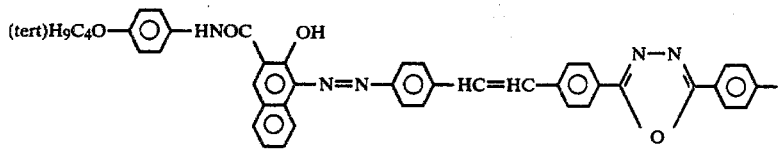

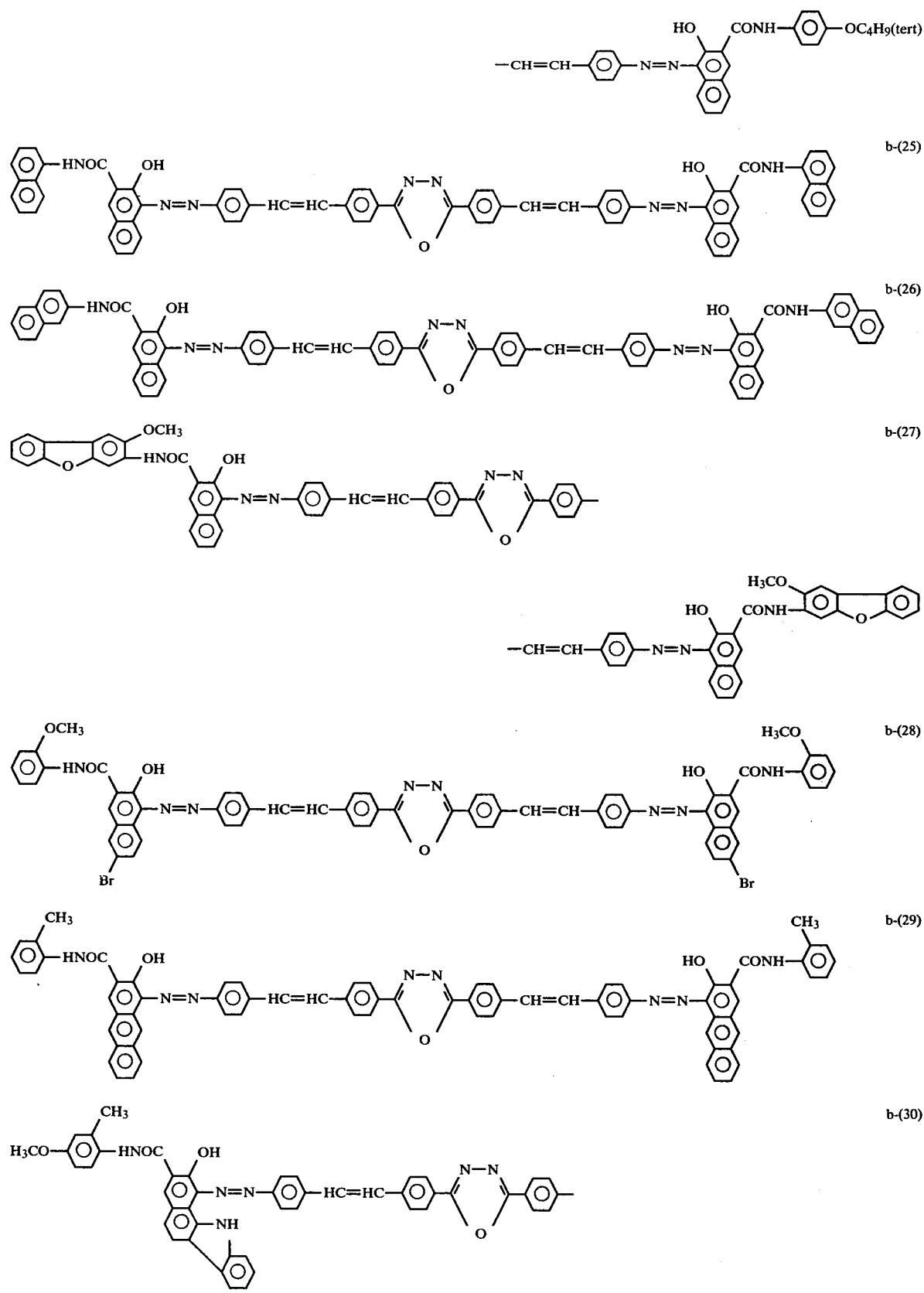

-continued
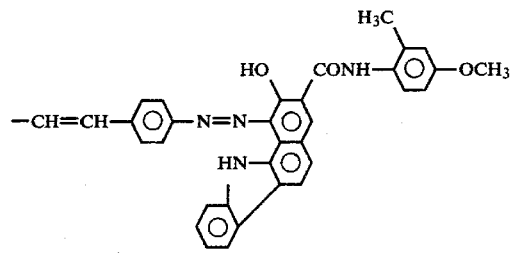
b-(31)
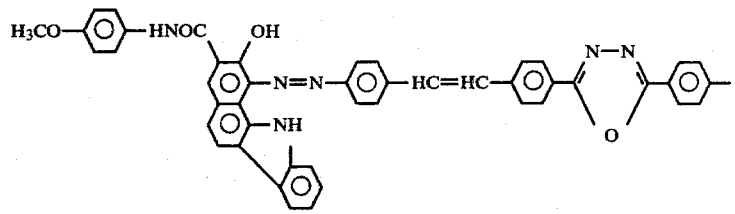
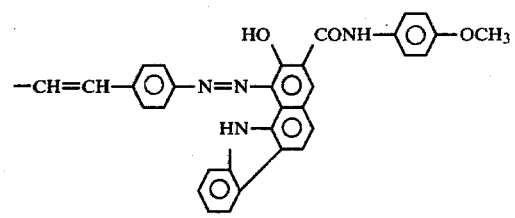
b-(32)
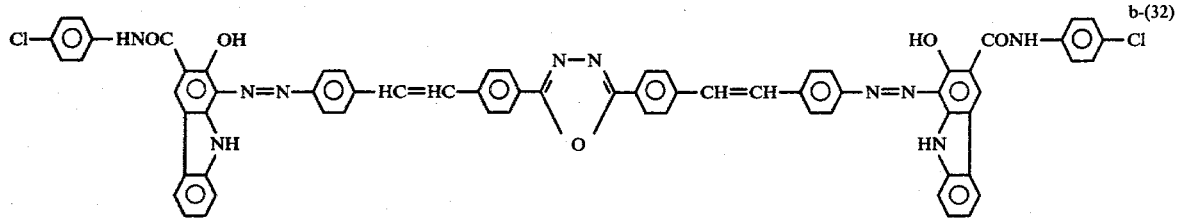
b-(33)
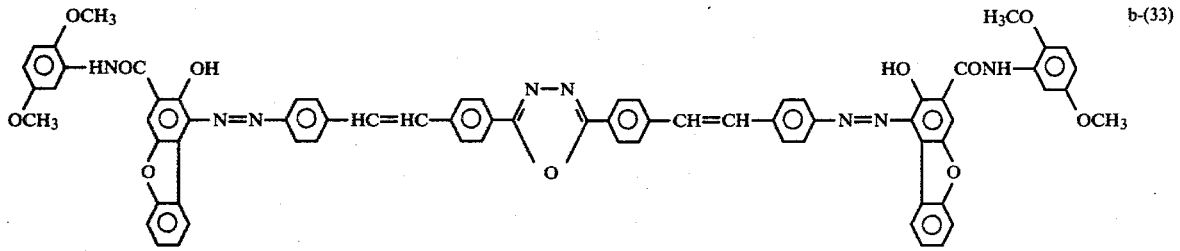
b-(34)
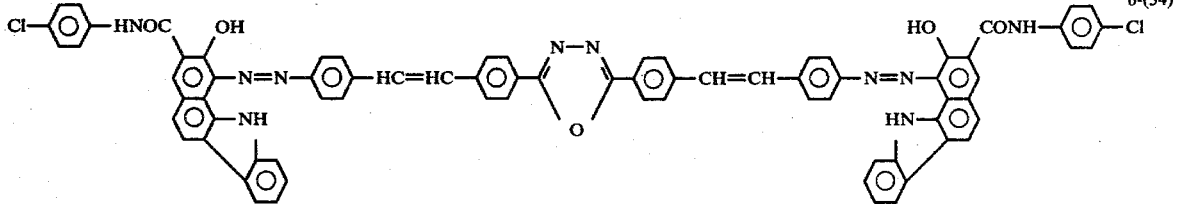
b-(35)
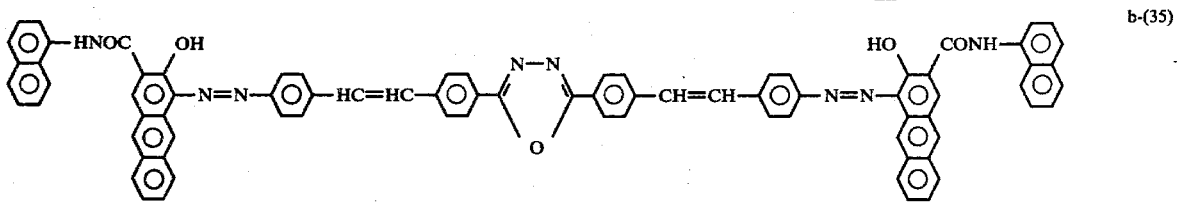
b-(36)
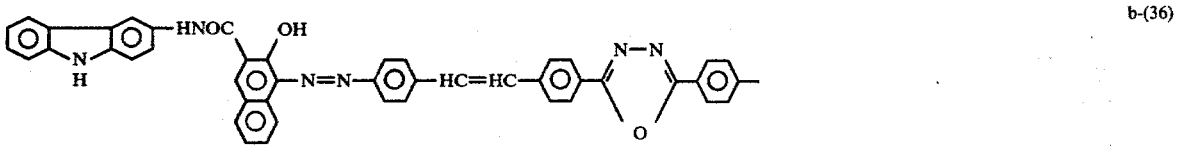

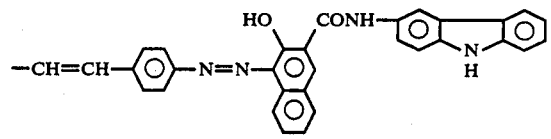
b-(37)
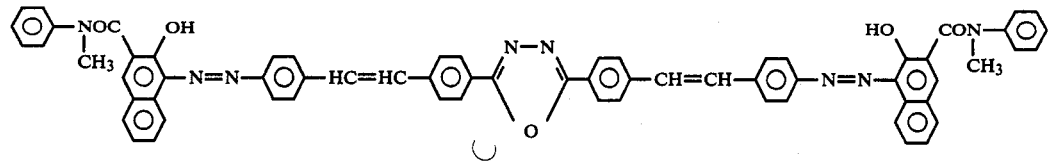
b-(38)
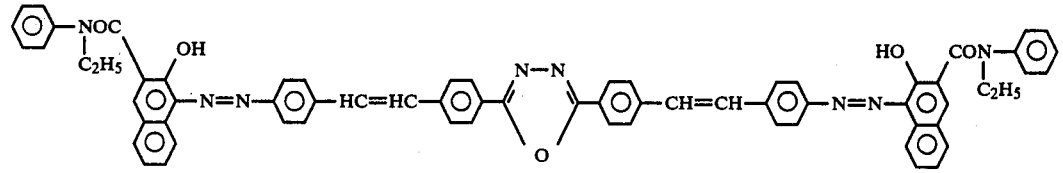
b-(39)
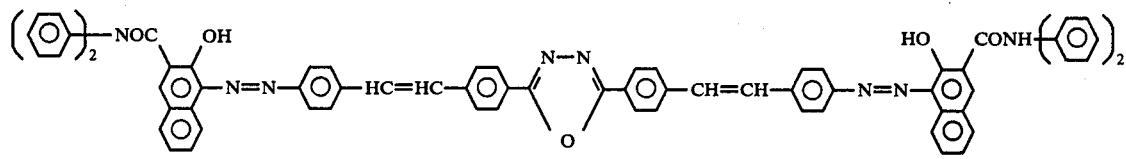
b-(40)
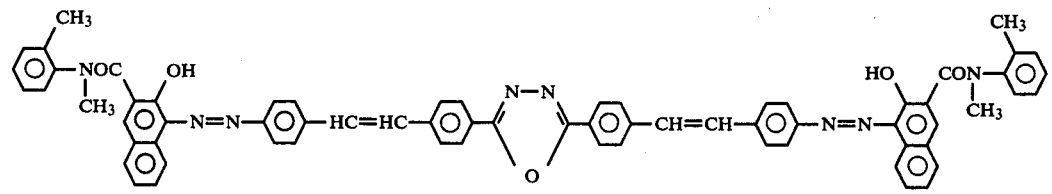
b-(41)
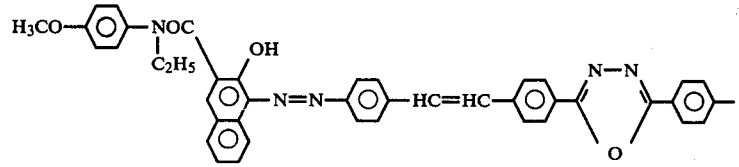
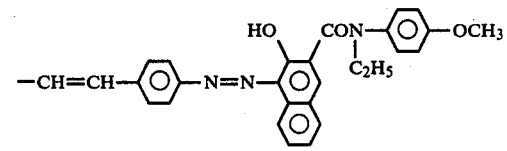
b-(42)
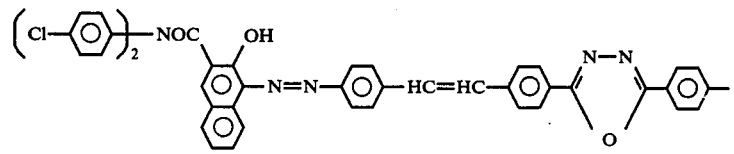
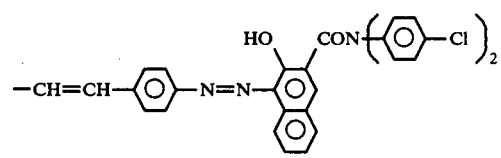
b-(43)
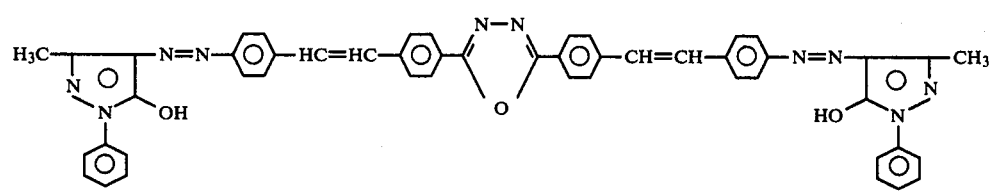

-continued
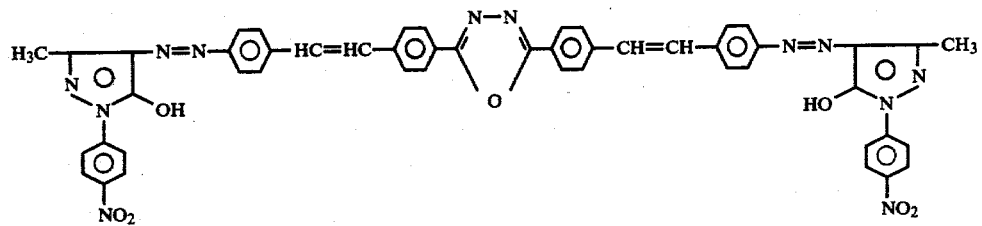
b-(44)
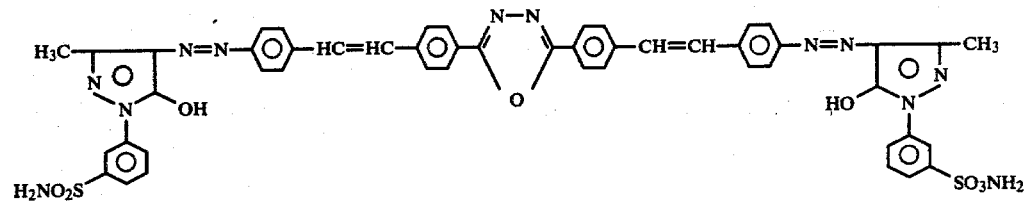
b-(45)
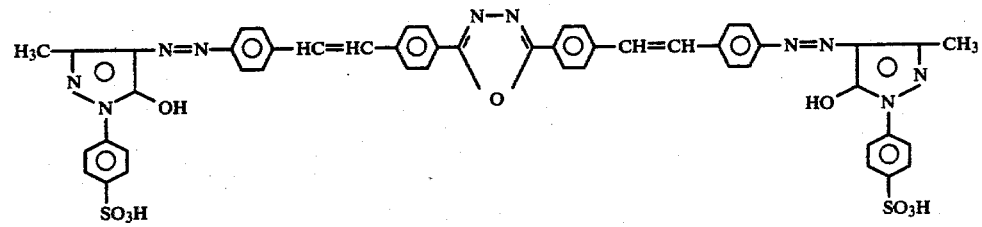
b-(46)
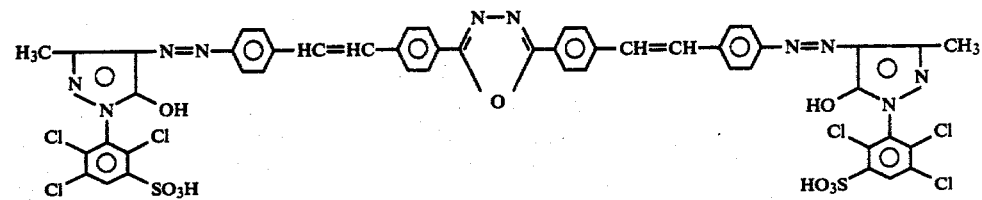
b-(47)
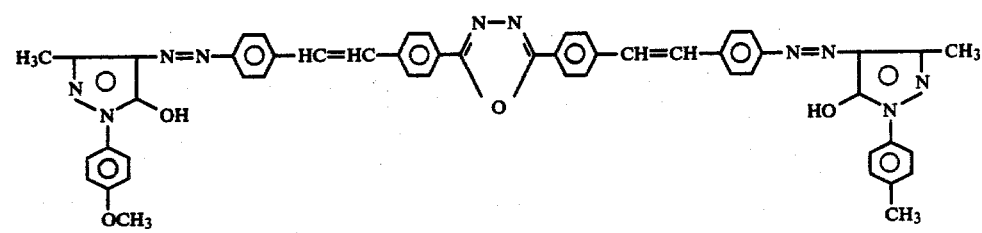
b-(48)
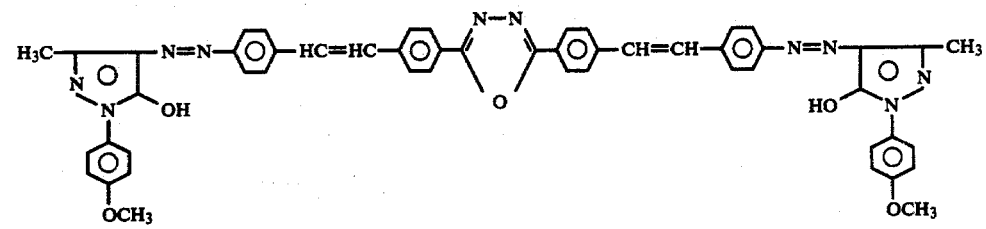
b-(49)
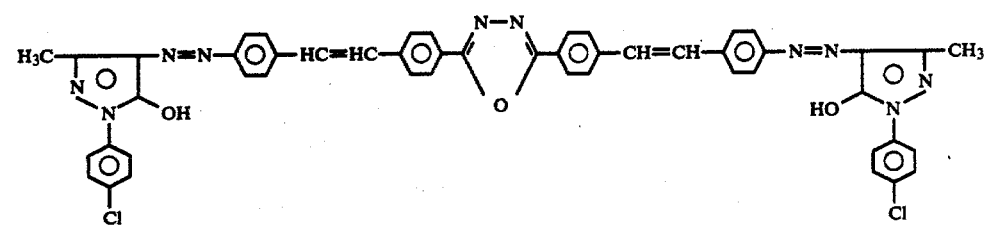
b-(50)

-continued
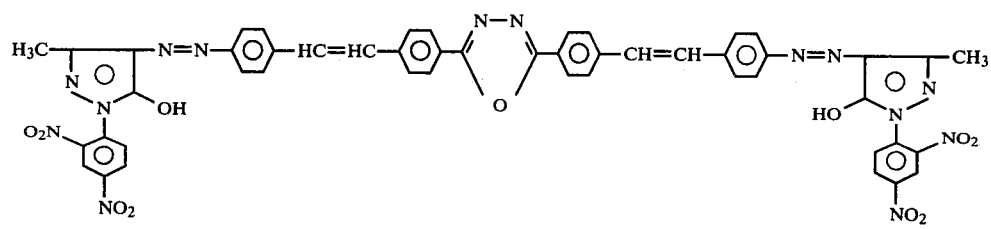
b-(51)
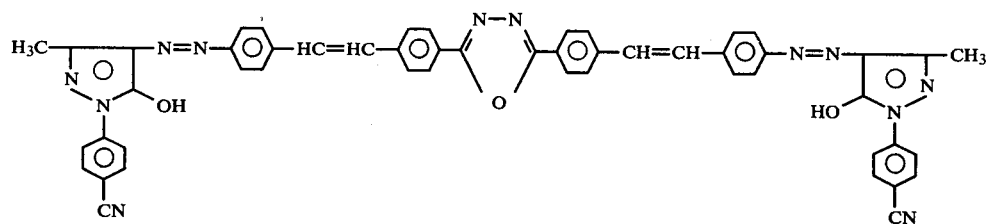
b-(52)
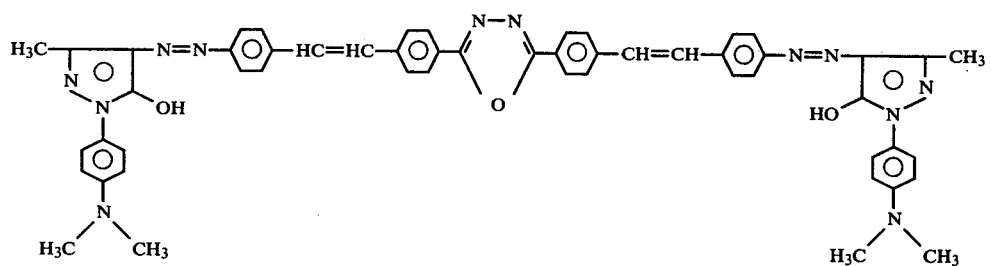
b-(53)
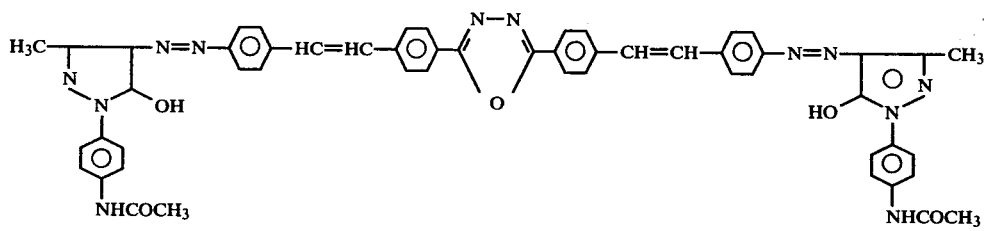
b-(54)
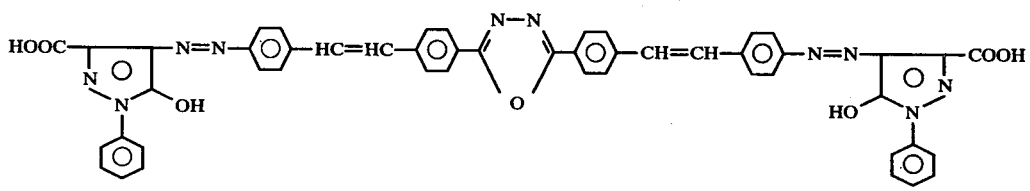
b-(55)
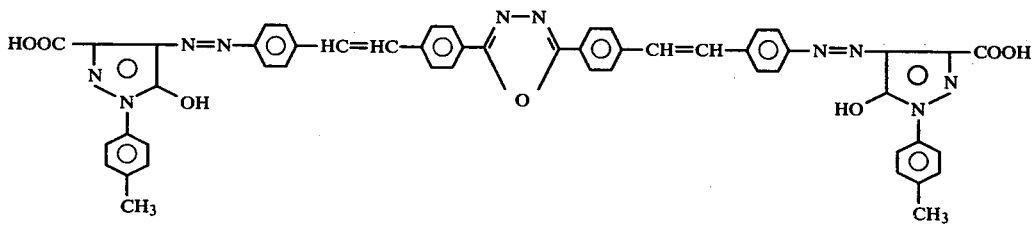
b-(56)
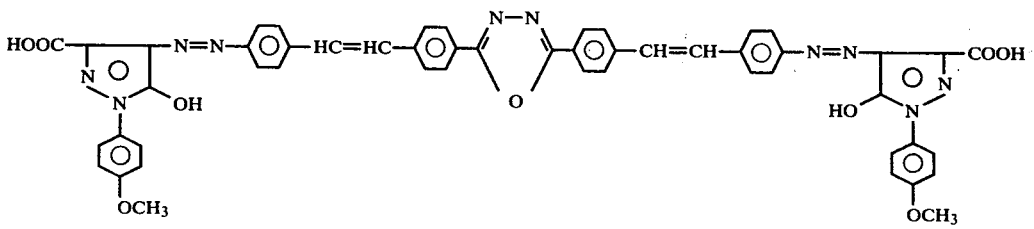
b-(57)

-continued
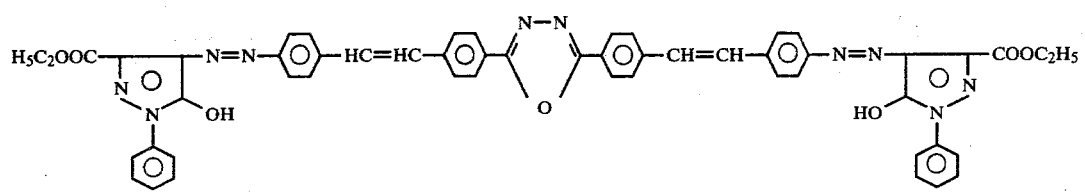
b-(58)
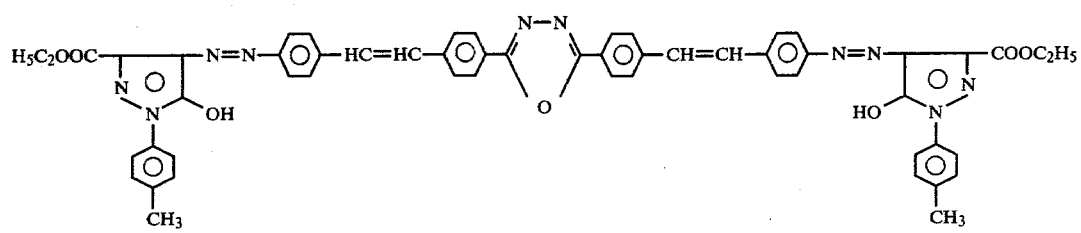
b-(59)
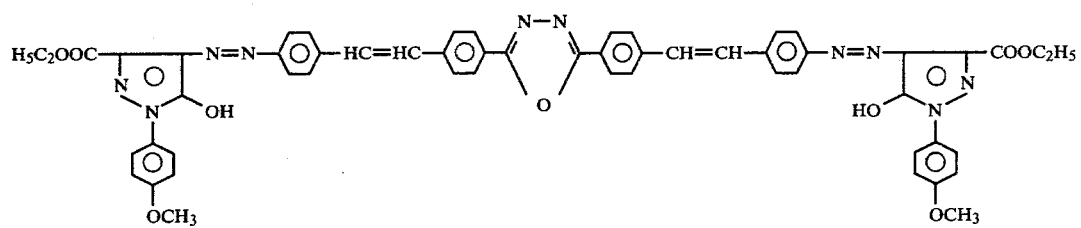
b-(60)
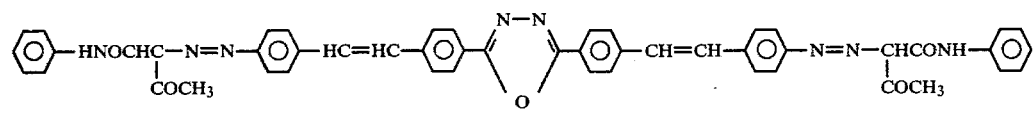
b-(61)
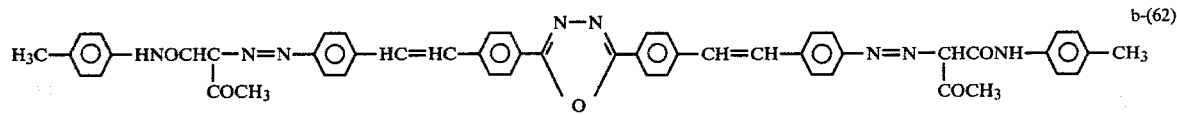
b-(62)
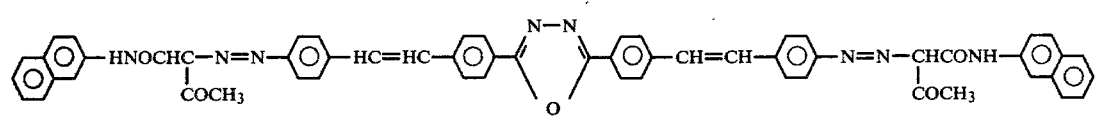
b-(63)
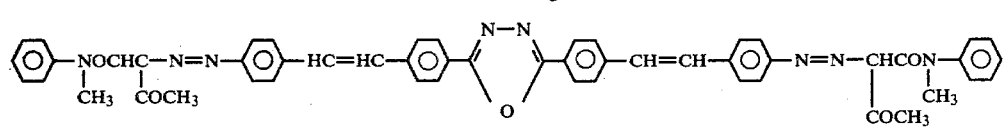
b-(64)
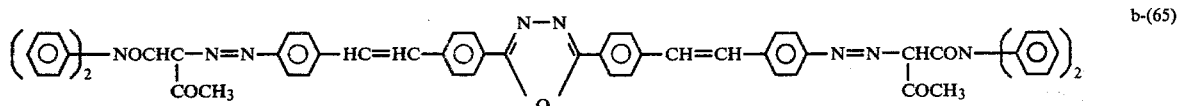
b-(65)
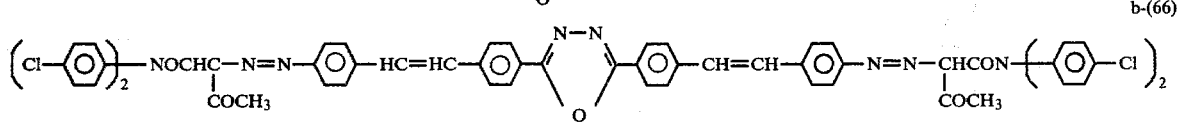
b-(66)
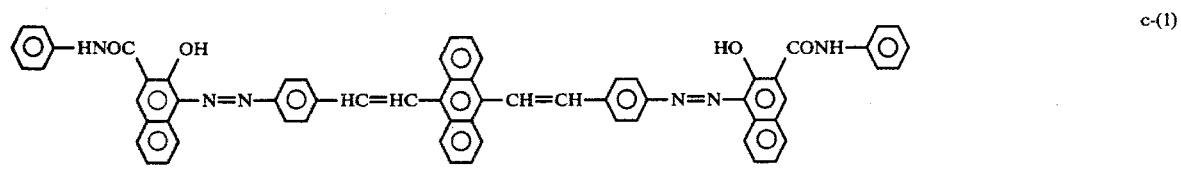
c-(1)
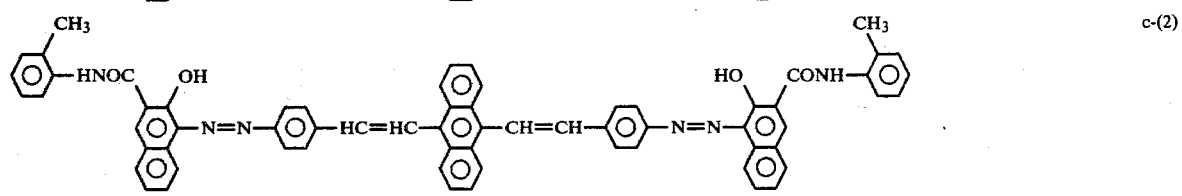
c-(2)

-continued
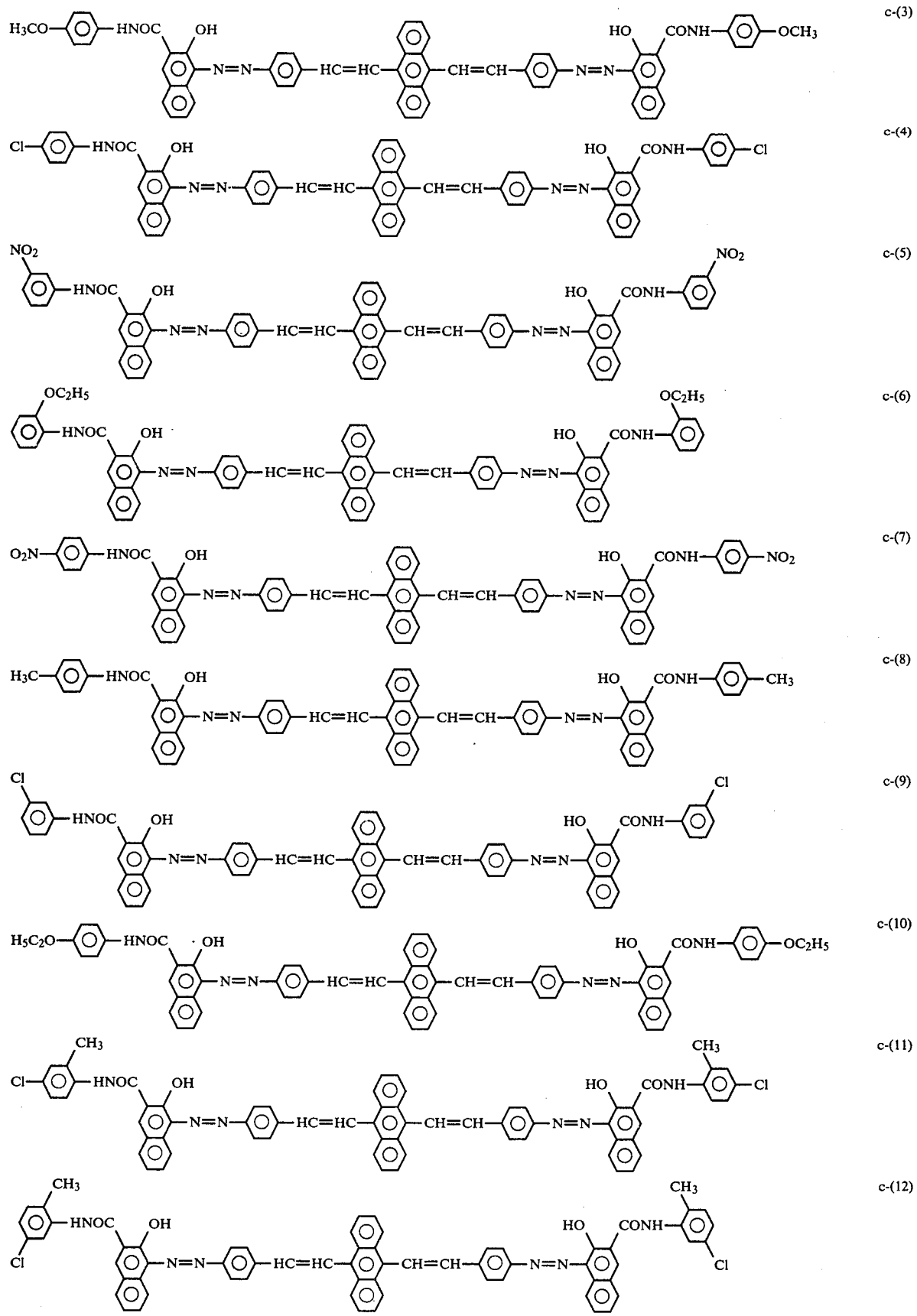

-continued
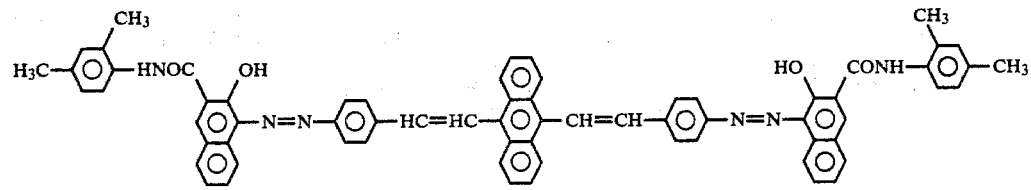
c-(13)
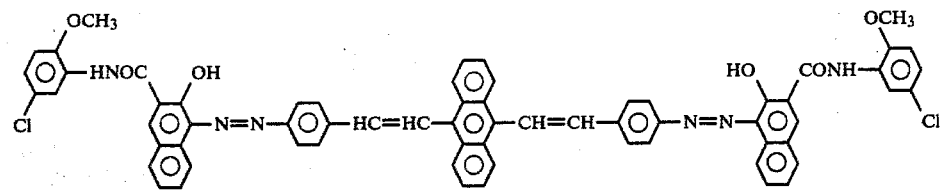
c-(14)
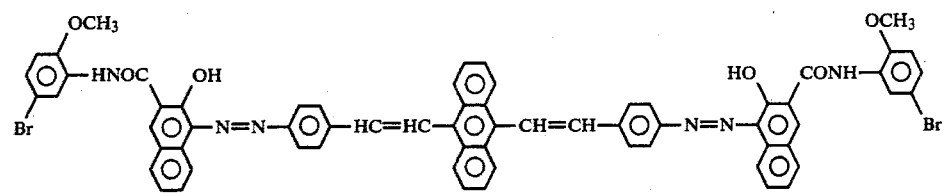
c-(15)
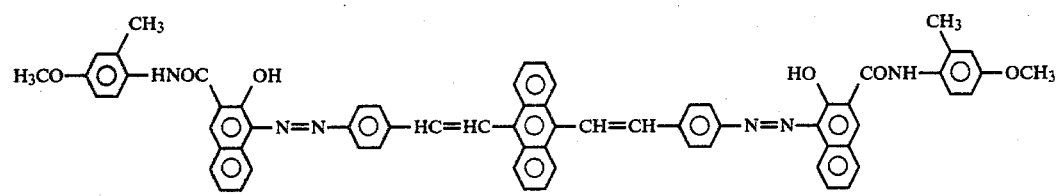
c-(16)
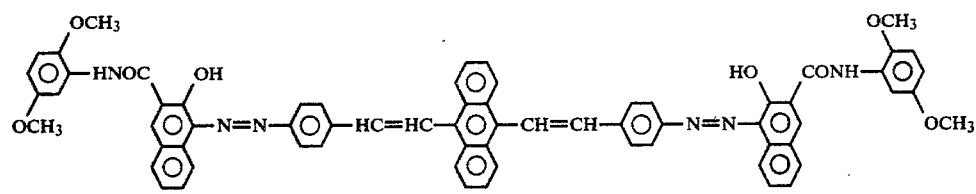
c-(17)
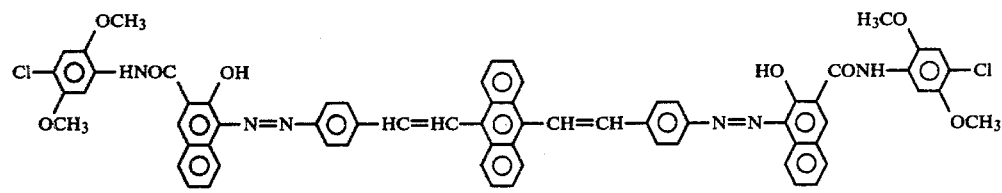
c-(18)
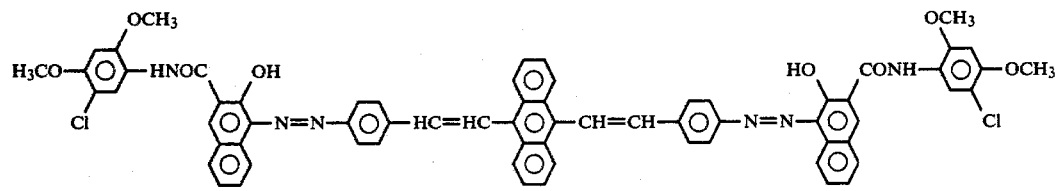
c-(19)
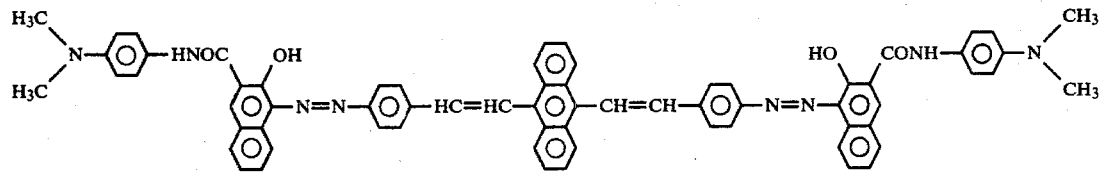
c-(20)
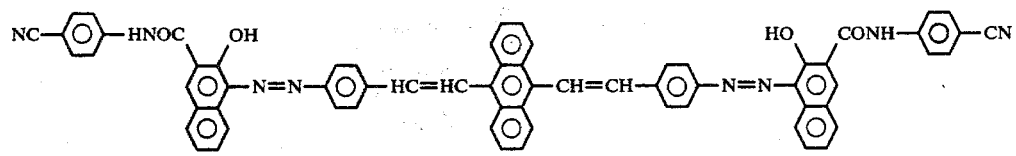
c-(21)

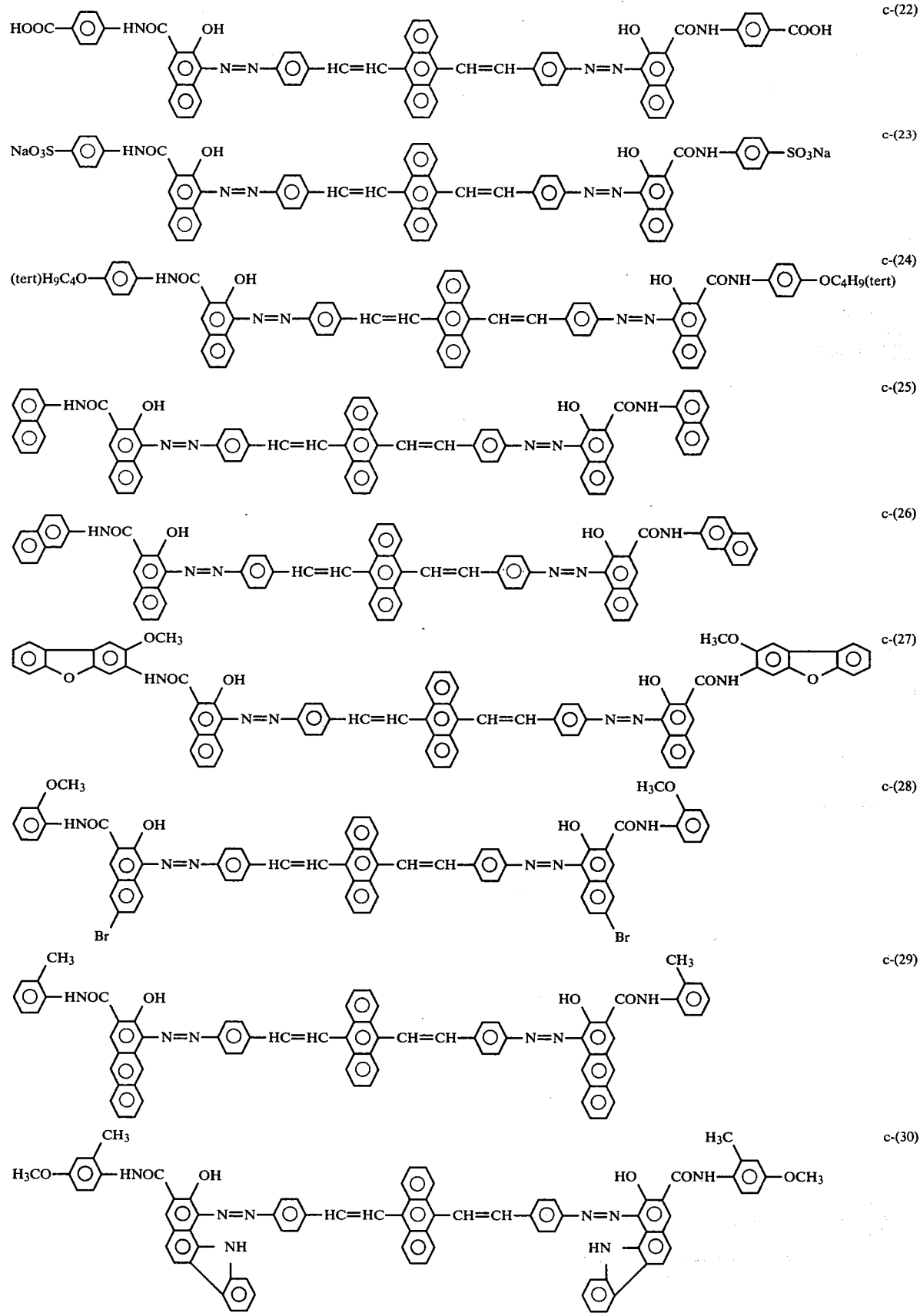

-continued
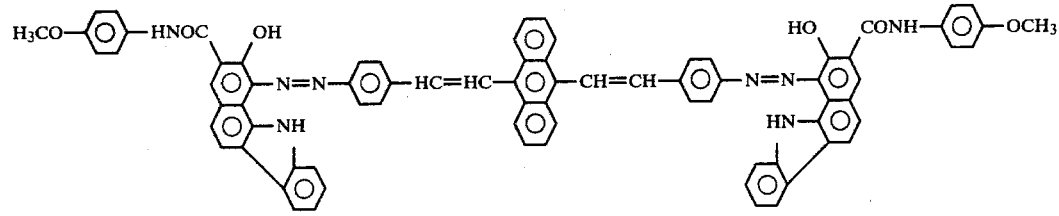
c-(31)
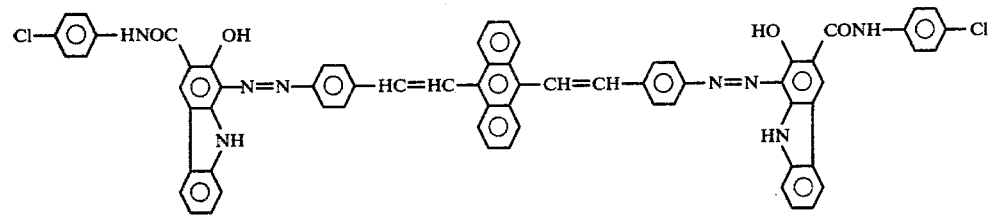
c-(32)
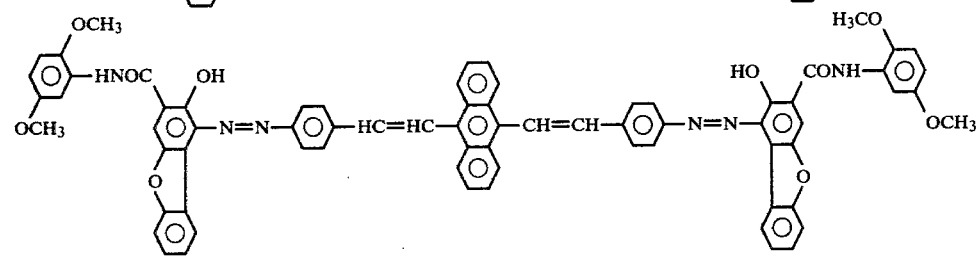
c-(33)
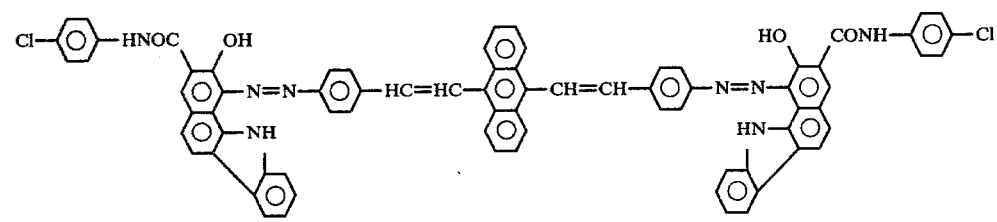
c-(34)
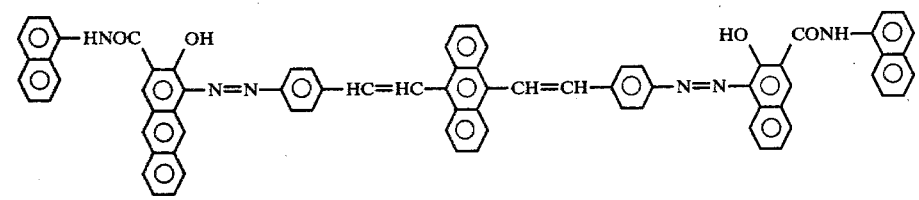
c-(35)
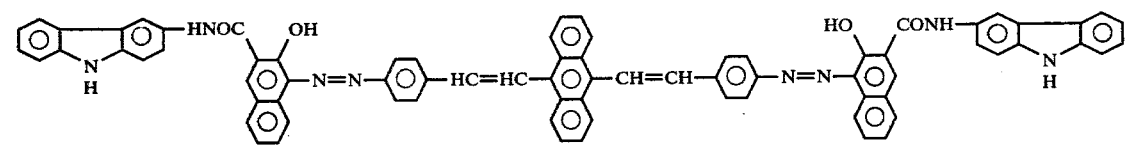
c-(36)
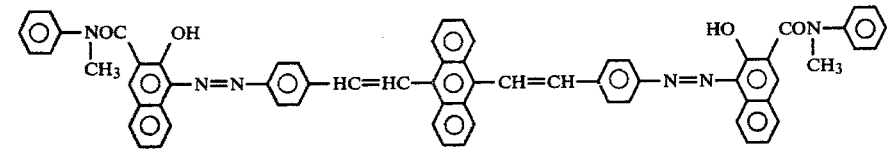
c-(37)
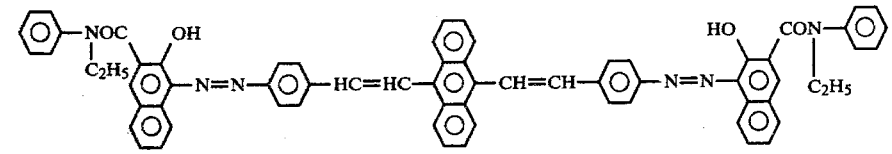
c-(38)
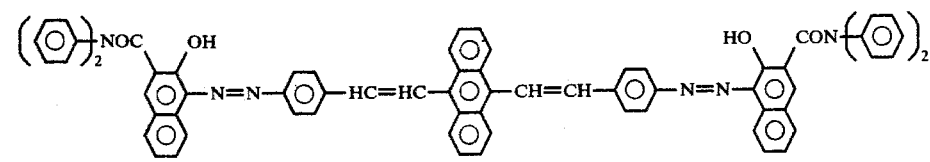
c-(39)

-continued
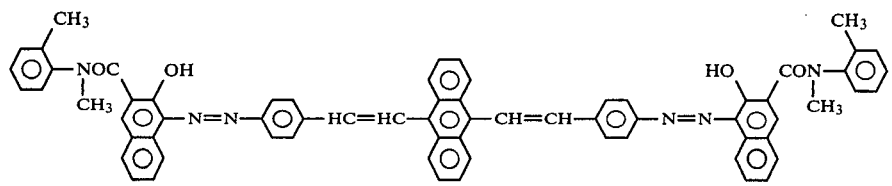 c-(40)
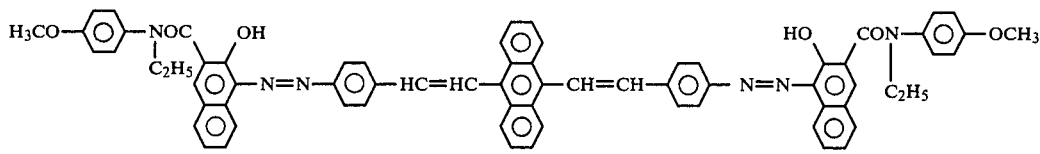 c-(41)
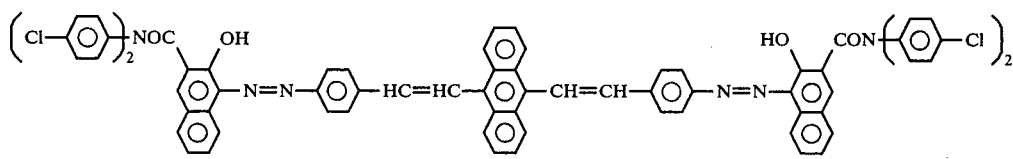 c-(42)
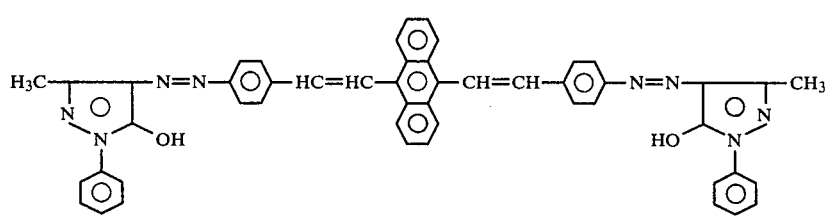 c-(43)
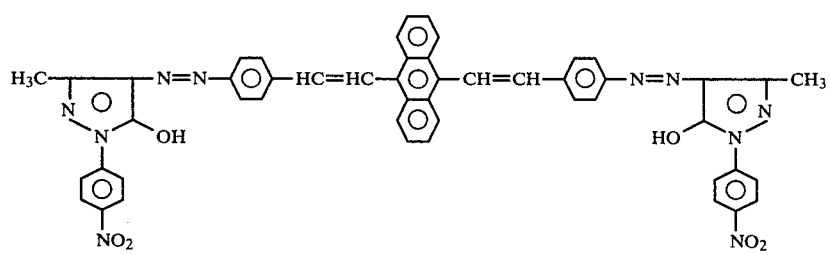 c-(44)
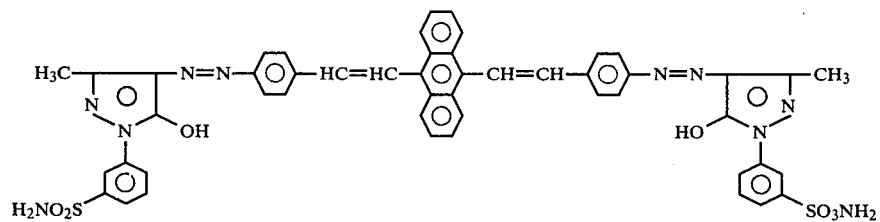 c-(45)
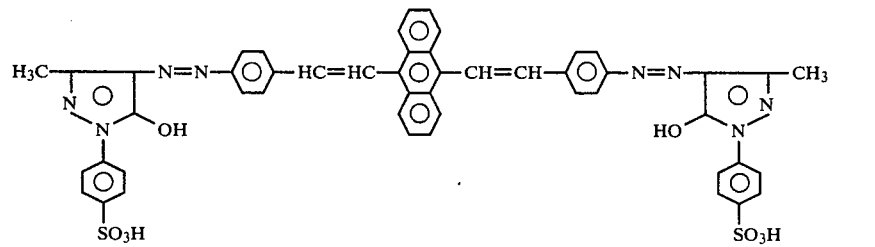 c-(46)
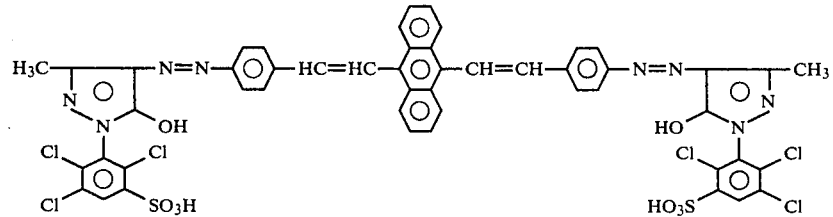 c-(47)

c-(48)
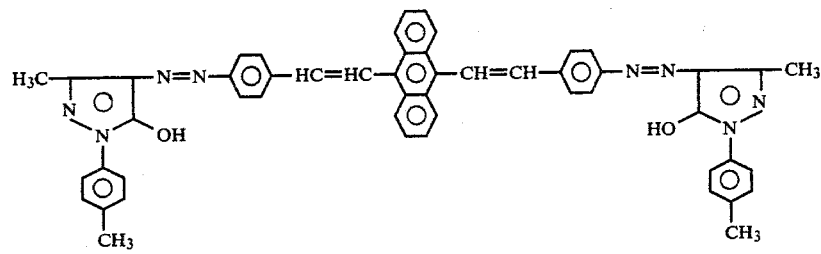
c-(49)
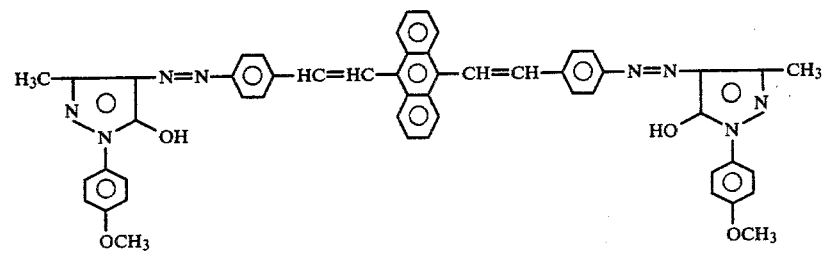
c-(50)
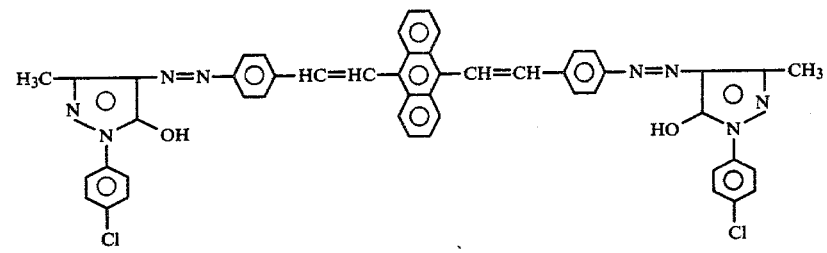
c-(51)
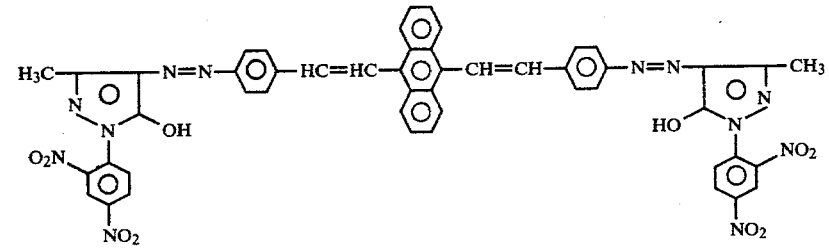
c-(52)
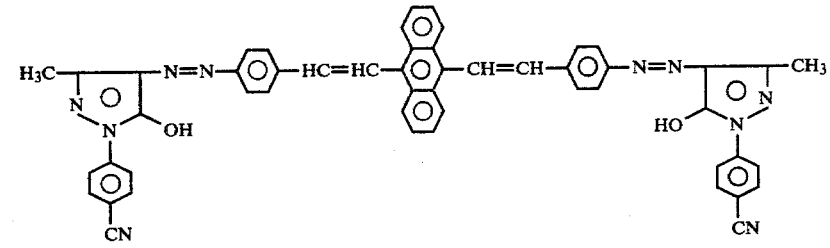
c-(53)
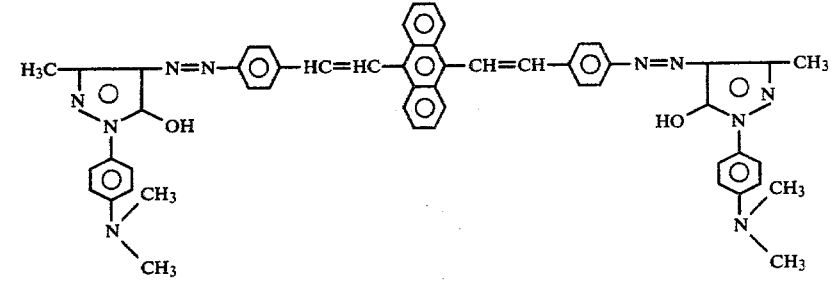

-continued
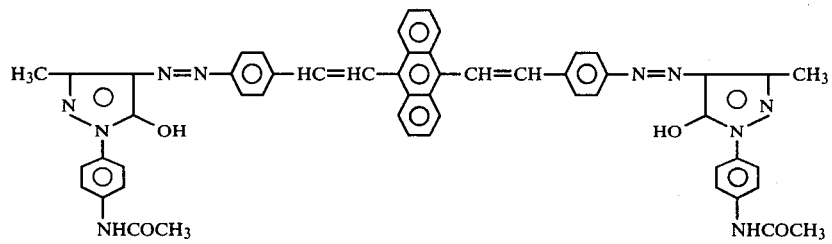
c-(54)
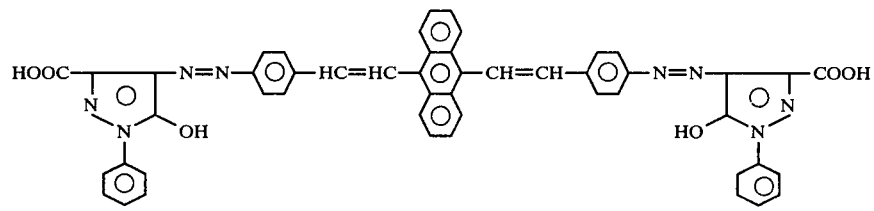
c-(55)
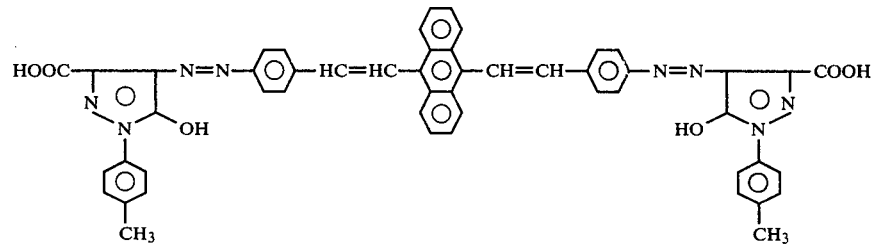
c-(56)
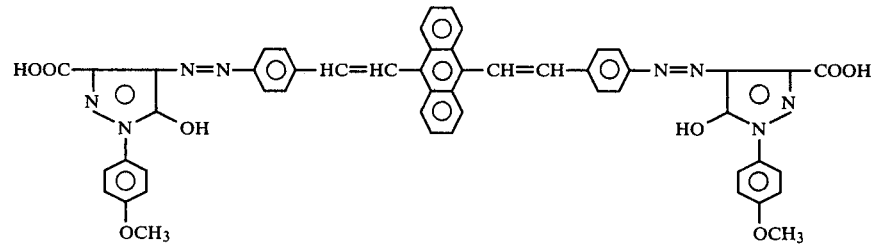
c-(57)
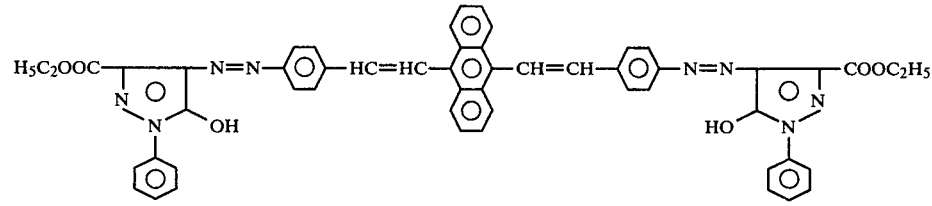
c-(58)
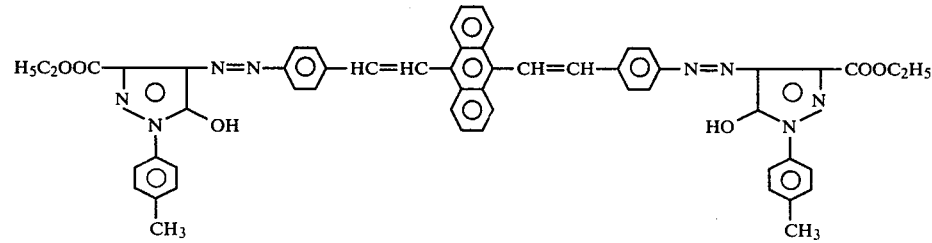
c-(59)
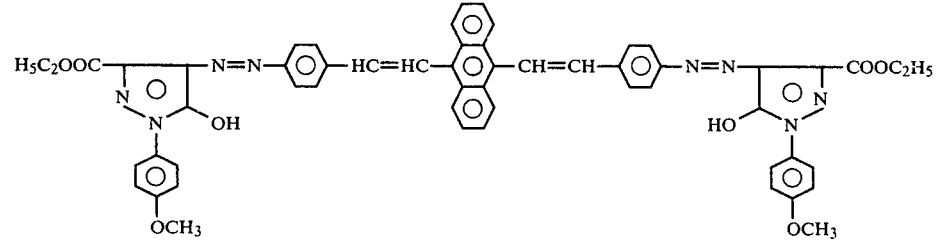
c-(60)

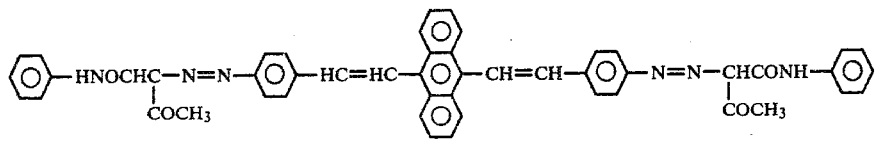

c-(61)

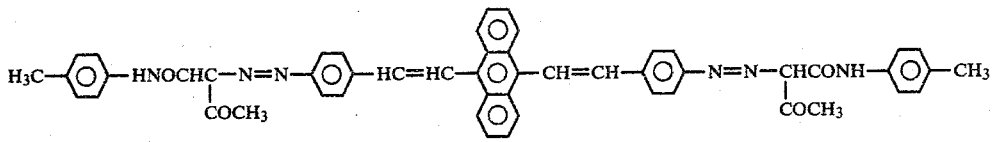

c-(62)

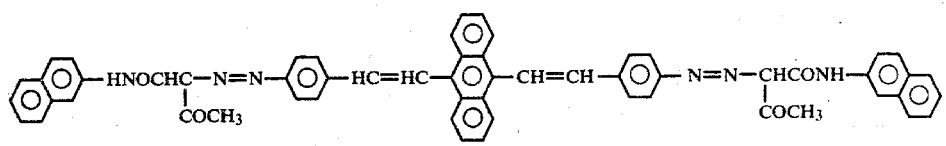

c-(63)

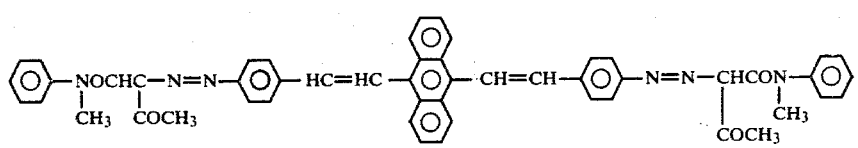

c-(64)

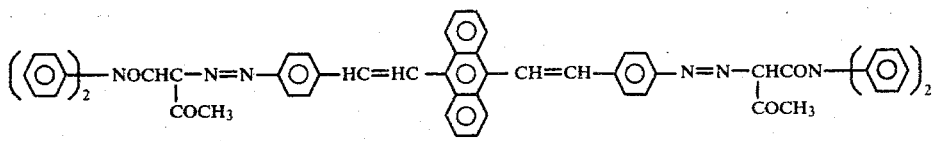

c-(65)

c-(66)

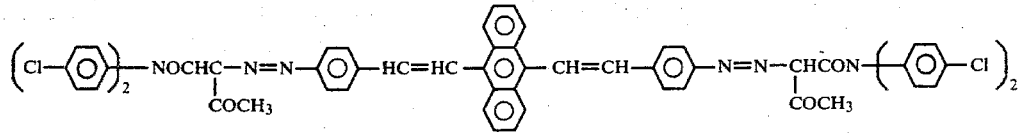

These disazo compounds can be easily obtained. That is, they can be easily prepared by the process comprising first reducing and then diazotizing the starting material, e.g., 2,5-bis(p-nitrophenyl)-1,3,4-oxadiazole, 2,5-bis[4-(p-nitrostyryl) phenyl]-1,3,4-oxadiazole or 9,10-bis(p-nitrostyryl) anthracene to precipitate tetrazonium salt and thereafter effecting coupling within an appropriate organic solvent such as N,N-dimethyl formamide in the presence of a coupler corresponding to the afore-exemplified various compounds and in the presence of alkali. Accordingly, preparation of the foregoing compound a-(1) and b-(5) is carried out in such a way as described below. In this connection, other disazo compounds can also be prepared after Examples of Preparation-1 and -2 except for appropriately changing the starting material.

Example of Preparation-1.
Preparation of the Compound a-(1)

4.9 g. of 2,5-bis(p-aminophenyl)-1,3,4-oxadiazole were added to dilute hydrochloric acid prepared by employing 37 ml. of undiluted hydrochloric acid and 37 ml. of water and thorough stirring was conducted for 30 minutes at a temperature of 60°C. Next, after cooling the thus prepared mixture down to about 0°C., a solution prepared by dissolving 3.0 g. of sodium nitrite in 10 ml. of water was added dropwise thereto in about 30 minutes at a temperature of 0° to 5°C. Thereafter, the mixture was stirred for about 30 minutes at the same temperature as above, and then a small amount of unreacted matter was filtered. The resulting filtrate was poured in 70 ml. of 42% borofluoric acid, and the crystals separated thereby were collected by filtering, washed in water and dried, whereby there were obtained 5.9 g. (yield: 63%) of tetrazonium difluoroborate as yellow crystals.

Subsequently, 5.9 g. of the thus obtained tetrazonium salt together with 7.6 g. of 2-hydroxy-3-naphthoic acid anilide as coupler were dissolved in 990 ml. of cooled N,N-dimethyl formamide, and to the resulting solution were added dropwise a solution consisting of 10.7 g. of sodium acetate and 95 ml. of water in an hour at a temperature of 4° to 8°C., followed by about 3 hours' stirring at room temperature. Then, the precipitate was collected by filtering, washed 3 times with 500 ml. of water, and thereafter rinsed 8 times with 500 ml. of N,N-dimethyl formamide. Subsequently, by rinsing out the remaining N,N-dimethyl formamide with acetone and drying at a temperature of 70°C. and under a reduced pressure of 2 mmHg., there were obtained 4.7 g. (yield rate: 45%) of the intended disazo compound corresponding to Compound a-(1). The melting point of this disazo compound was 300°C. or more.

(1) Elementary analysis

| | Theoretical value | Actual value |
|---|---|---|
| C (%) | 71.99 | 71.55 |
| H (%) | 4.03 | 4.10 |
| N (%) | 13.99 | 14.00 |

(2) Infrared absorption spectrum (KBr Tablet process) 1685 cm.$^{-1}$ (secondary amide).

Example of Preparation-2

Preparation of the Compound b-(5)

After mixing 6.0 g of 2,5-bis[4-(p-nitrostyryl)phenyl]-1,3,4-oxadiazole, 12.0 g of iron powder and 200 g of N,N-dimethyl formamide together, by adding dilute hydrochloric acid prepared by employing 5 ml of undiluted hydrochloric acid and 17 ml of water to the resulting mixture and intensely stirring it, reaction was effected at a temperature of 90° to 100° C. for one hour. After completing the reaction, by adding a 5% aqueous solution of sodium carbonate while heating as above, the pH value of the reactant mixture was adjusted to be 8, the undissolved matter was filtered while heating, and the resulting filtrate was diluted with 70 ml of water, whereby there were separated yellow crystals. Then, said crystals were collected by filtering, washed in water and dried, whereby there were obtained 5.0 g (yield rate: 94.3%) of 2,5-bis[4-(p-aminostyryl)phenyl]-1,3,4-oxadiazole. The melting point of this crystal was 250° C. or more (decomposition point).

Elementary analysis (as $C_{30}H_{24}N_4O$)

|  | theoretical value | actual value |
| --- | --- | --- |
| C (%) | 78.91 | 78.70 |
| H (%) | 5.31 | 5.30 |
| N (%) | 12.27 | 12.30 |

Next, after adding 6.9 g of this 2,5-bis[4-(p-aminostyryl)phenyl]-1,3,4-oxadiazole to dilute hydrochloric acid prepared by employing 50 ml of undiluted hydrochloric acid and 50 ml of water, the mixture was thoroughly stirred at a temperature of 60° C. for 30 minutes. Subsequently, this mixture was cooled down to about 0° C., and a solution prepared by dissolving 2.1 g of sodium nitrite in 6 ml of water was added dropwise thereto at a temperature of 0° to 5° C. in about 30 minutes. Thereafter, the mixture was stirred for about 30 minutes at the same temperature as above, and then a small amount of unreacted matter was filtered. The resulting filtrate was poured in 20 ml of 42% borofluoric acid, and the crystals separated thereby were collected by filtering, washed in water and dried, whereby there were obtained 8.9 g (yield rate: 92.7%) of tetrazonium fluoroborate as orange-colored crystals. Decomposition point of this crystal was about 180° C.

31.1 g of the thus obtained tetrazonium salt together with 30.8 g of 2-hydroxy-3-naphthoic acid-3'-nitroanilide as coupler were dissolved in 4,250 ml of cooled N,N-dimethyl formamide, and to the resulting solution was added dropwise a solution consisting of 41 g of sodium acetate and 600 ml of water in an hour at a temperature of 4° to 5° C. Then, after stirring for about 3 hours at room temperature, the precipitate was collected by filtering, washed 3 times with 2 l of water, and then rinsed 8 times with 2 l of N,N-dimethyl formamide. Subsequently, by rinsing out the remaining N,N-dimethyl formamide with acetone and drying the resulting purple crystals at a temperature of 70° C. and under a reduced pressure of 2 mmHg, there were obtained 45.0 g (yield rate: 85.4%) of a diazo compound corresponding to Compound b-(5). The melting point of this crystal was 300° C. or more.

Elementary analysis (as $C_{64}H_{42}N_{10}O_9$)

|  | theoretical value | actual value |
| --- | --- | --- |
| C (%) | 70.20 | 69.98 |
| H (%) | 3.84 | 3.79 |
| N (%) | 12.80 | 12.60 |

Infrared absorption spectrum (KBr Tablet process) 1680 cm$^{-1}$ (secondary amide)

In this connection, instances of the preparation of disazo compound employing 9,10-bis(p-aminostyryl)anthracene as the starting material were illustrated in the examples described later on.

Figure 4:
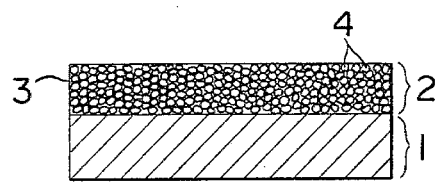
FIGS. 4 through 6 illustrate respectively enlarged cross-sectional views of photosensitive materials according to the present invention.
Figure 5:
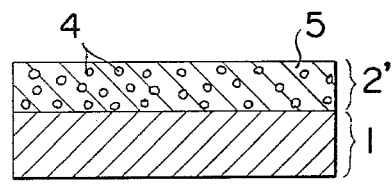
Figure 6:
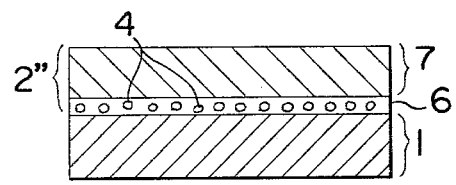

The photosensitive materials according to the present invention contain the aforementioned disazo compounds and can assume such structures as illustrated in FIGS. 4 through 6 depending on the way of application of these compounds. The photosensitive material illustrated in FIG. 4 is one prepared by forming a disazo compound 4 (which serves herein as a photoconductive substance)~resinous binder 3 type photosensitive layer 2 on a conductive support 1. The photosensitive material illustrated in FIG. 5 is one prepared by forming a disazo compound 4 (which serves herein as a charge-carrier generating substance)~charge-transfer medium (which is a mixture of a charge-transfer substance and a resinous binder) 5 type photosensitive layer 2' on a conductive support 1. The photosensitive material illustrated in FIG. 6 is a modification of the photosensitive material in FIG. 5, and the photosensitive layer 2" thereof is composed of a charge-carrier generating layer 6 consisting essentially of a disazo compound and a charge-transfer medium layer 7.

In the photosensitive material of FIG. 4, the disazo compound probably acts as a photoconductive substance, and generation and transfer of the charge-carrier necessary for light decay may be performed through the compound particles. In the case of the photosensitive material of FIG. 5, said charge-transfer substance probably forms a charge-transfer medium together with said binder (plus a plasticizer as occasion demands), while said disazo compound probably acts as a charge-carrier generating substance. This charge-transfer medium probably does not have any charge-carrier generating ability like disazo compounds, but has an ability to accept and transfer the charge-carrier generated by disazo compounds. That is, in the case of the photosensitive material of FIG. 5, generation of the charge-carrier necessary for light decay is probably performed by the disazo compound, while transfer of the charge-carrier is probably performed mainly by the charge-transfer medium. An essential condition further required for the charge-transfer medium on this occasion is that the range of the absorption wavelength of the charge-transfer medium should not fall on mainly the range of the absorption wavelength of the visible region of the disazo compound. The reason for this is that, in order to generate the charge-carrier efficiently in the disazo compound, it is necessary to transmit the light to the surface of the compound. This rule, however, does not apply to the case of, for instance, a photosensitive material which is only sensitive to a specific wavelength. Therefore, the absorption wavelength of the charge-transfer medium and that of the disazo compound should not completely overlap each other. Next, in the case of the photosensitive material of FIG. 6, the light after passing through the charge-transfer medium layer probably reaches to the photosensitive layer 2" constituting a charge-carrier generating layer to cause generation of the charge-carrier in the disazo compound of this portion, while the charge-transfer medium layer probably accepts and transfers the charge-carrier pouring therein. The mechanism whereby generation of the charge-carrier necessary for light decay is performed by the disazo compound and transfer of the charge-carrier is performed by the charge-transfer medium in this photosensitive material is the same as in the case of the photosensitive material illustrated in FIG. 5. The disazo compound herein is also a charge-carrier generating substance.

In order to prepare the photosensitive material of FIG. 4, it suffices to coat a dispersion obtained by dispersing fine particles of a disazo compound in a binder solution on a conductive support and dry thereafter. In order to prepare the photosensitive material of FIG. 5, it suffices to disperse fine particles of a disazo compound in a solution obtained by dissolving a charge-transfer substance in a binder, coat the resulting dispersion on a conductive support, and dry thereafter. And, the photosensitive material of FIG. 6 can be obtained either by depositing a disazo compound on a conductive support through vacuum evaporation or through the procedure comprising dispersing fine particles of a disazo compound in an appropriate solvent containing a binder dissolved therein as occasion demands, coating the resulting dispersion on a conductive support and drying thereafter, subjecting the thus formed photosensitive layer to the surface finishing by, for instance, puff-grinding or the like, if necessary, thereby adjusting the thickness of the coating film, thereafter coating thereon a solution containing a charge-transfer substance and a binder, followed by the drying. In any case, the disazo compound for use in the present invention is employed upon pulverizing into a particle size of less than 5μ, preferably less than 2μ, by means of a ball-mill or the like. Coating is performed by the conventional means such as doctor blade, wire bar, etc. The thickness of the photosensitive layer in the case of the photosensitive materials illustrated in FIG. 4 and FIG. 5 is about 3 to 50μ, preferably 5 to 20μ. And, in the case of the photosensitive material illustrated in FIG. 6, the desirable thickness of the charge-carrier generating layer is less than 5μ, preferably less than 2μ, and the thickness of the charge-transfer medium layer is about 3 to 50μ, preferably 5 to 20μ. Therefore, in the case of the photosensitive material illustrated in FIG. 4, the appropriate ratio of the disazo compound contained in the photosensitive layer is 30 to 70% based on the weight of the photosensitive layer. (As described in the foregoing, in the case of the photosensitive material of FIG. 4, the disazo compound acts as a photoconductive substance, and generation and transfer of the charge-carrier necessary for light decay are probably performed through the compound particles. Therefore, contact between the compound particles is desirable to be continuous from the photosensitive layer surface to the support. Accordingly, it is desirable that the ratio of the disazo compound to the photosensitive layer is as high as possible, but when both the strength and the sensitivity of the photosensitive layer are taken into consideration, it is preferably about 50 wt.%.) In the case of the photosensitive material illustrated in FIG. 5, the disazo compound accounts for 1 to 50 wt.%, preferably less than 20 wt.%, of the photosensitive layer, and the charge-transferable substance accounts for 10 to 95 wt.%, preferably 30 to 90 wt.%, of the photosensitive layer. And, in the case of the photosensitive material of FIG. 6, the ratio of the charge-transferable substance to the charge-transfer medium layer is 10 to 95 wt.%, preferably 30 to 90 wt.%, like in the case of the photosensitive layer in the photosensitive material of FIG. 5. Further, in the preparation of all photosensitive materials illustrated in FIGS. 4 through 6, it is possible to employ some plasticizer jointly with the binder.

In the photosensitive materials according to the present invention, as the conductive support, a plate or foil of a metal such as aluminum, etc., a plastic film deposited with a metal such as aluminum, etc. through vacuum evaporation, or a paper processed for conductivity are useful. As applicable binders, there can be cited such condensation resins as polyamide, polyurethane, polyester, epoxide resin, polyketone, polycarbonate, etc. and such vinyl polymers as polyvinyl ketone, polystyrene, poly-N-vinyl carbazole, polyacrylamide, etc.; yet, resins having insulating and adhesive properties are all useful. As applicable plasticizers, there can be cited halogenated paraffin, polybiphenyl chloride, dimethyl naphthalene, dibritylphthalate, etc. To cite applicable charge-transfer substances, as for high-molecular substances, there are such vinyl polymers as poly-N-vinyl carbazole, halogenated poly-N-vinyl carbazole, polyvinyl pyrene, polyvinyl indroquinoxaline, polyvinyl dibenzothiophene, polyvinyl anthracene, polyvinyl acridine, etc. and such condensation resins as pyrene-formaldehyde resin, bromopyreneformaldehyde resin, ethyl carbazole-formaldehyde resin, chloroethyl carbazole-formaldehyde resin, etc., and as for low-molecular substances (monomers), there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrodibenzothiophene-5,5-dioxide, 3-nitrodibenzothiophene-5,5-dioxide, 3,7-dinitrodibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyanomethylene fluorene, tetrachlorophthalic anhydride, 1-bromopyrene, 1-methyl pyrene, 1-ethyl pyrene, 1-acetyl pyrene, carbazole, N-ethyl carbazole, N-β-chloroethyl carbazole, N-β-hydroxyethyl carbazole, 2-phenyl indole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyl oxazole, triphenyl amine, tris(4-diethylaminophenyl)methane, 3,6-bis(dibenzylamino)-9-ethyl carbazole, etc. These charge-transfer substances are employed either singly or as a mixture of two or more of them.

Further, all of the photosensitive materials thus prepared can be provided with an adhesive layer or a barrier layer disposed in between the conductive support and the photosensitive layer as occasion demands. As the materials for use in forming these layers, polyamide, nitro-cellulose, aluminum oxide, etc. are appropriate, and the thickness of the layers is preferably less than 1μ.

In order to perform the copying by using a photosensitive material under the present invention, it suffices to follow the procedure that the photosensitive layer side of the photosensitive material is electrified and exposed to light, and then developing is conducted, followed by, if necessary, transfer onto an ordinary paper or the like.

The photosensitive materials according to the present invention have excellent advantages such that they are generally high in sensitivity and rich in flexibility.

DESCRIPTION OF THE PREFERRED EMBODIMENTS

EXAMPLE 1

Preparation of disazo compound No. I expressed by general formula I (cf. Table-1)

After mixing 6.0 g of 9,10-bis(p-nitrostyryl)anthracene, 12.0 g of iron powder and 200 ml of N,N-dimethyl formamide together, by adding dilute hydrochloric acid prepared by employing 5 ml of concentrated hydrochloric acid and 17 ml of water to the resulting mixture and intensely stirring, reaction was effected at a temperature of 90° to 100° C. for an hour. After completing the reaction, the pH value of the reactant mixture was adjusted to be 8 by adding a 5% aqueous solution of sodium carbonate while heating as above, and the undissolved matter was filtered. Then, by diluting the resulting filtrate with 70 ml of water, there were separated yellowish brown-colored crystals. These crystals were collected by filtering, washed in water and dried, whereby there were obtained 5.0 g (yield rate: 96.2%) of 9,10-bis(p-aminostyryl)anthracene. The melting point of this crystal was in the range of from 281.5° to 20° C. (decomposition point).

Elementary analysis (as $C_{30}H_{24}N_2$)

|  | theoretical value | actual value |
|---|---|---|
| C (%) | 87.34 | 87.10 |
| H (%) | 5.87 | 5.79 |
| N (%) | 6.79 | 6.80 |

Infrared absorption spectrum (KBr Tablet process) $\nu$NH 3,300 to 3,500 cm$^{-1}$ FIG. 1 illustrates the infrared absorption spectrum of this product.

Next, 6.2 g of the thus obtained 9,10-bis(p-aminostyryl)anthracene were added to dilute hydrochloric acid prepared by employing 50 ml of undiluted hydrochloric acid and 50 ml of water, and thorough stirring was conducted for 30 minutes at a temperature of 60° C. After cooling the resulting mixture down to about 0° C., a solution prepared by dissolving 2.1 g of sodium nitrite in 6 ml of water was added dropwise thereto at a temperature of 0° to 5° C. in about 30 minutes. Subsequently, the mixture was stirred for about 30 minutes at the same temperature, a small amount of unreacted matter was filtered, the resulting filtrate was poured in 20 ml of 42% borofluoric acid, and the crystals separated thereby were collected by filtering, washed in water and dried thereafter, whereby there were obtained 8.7 g (yield rate: 94.6%) of tetrazonium difluoroborate as red-colored crystals. The decomposition point of this crystal was about 160° C.

Infrared absorption spectrum (KBr Tablet process): $\nu N_2$ 2,250 cm$^{-1}$

Figure 2:
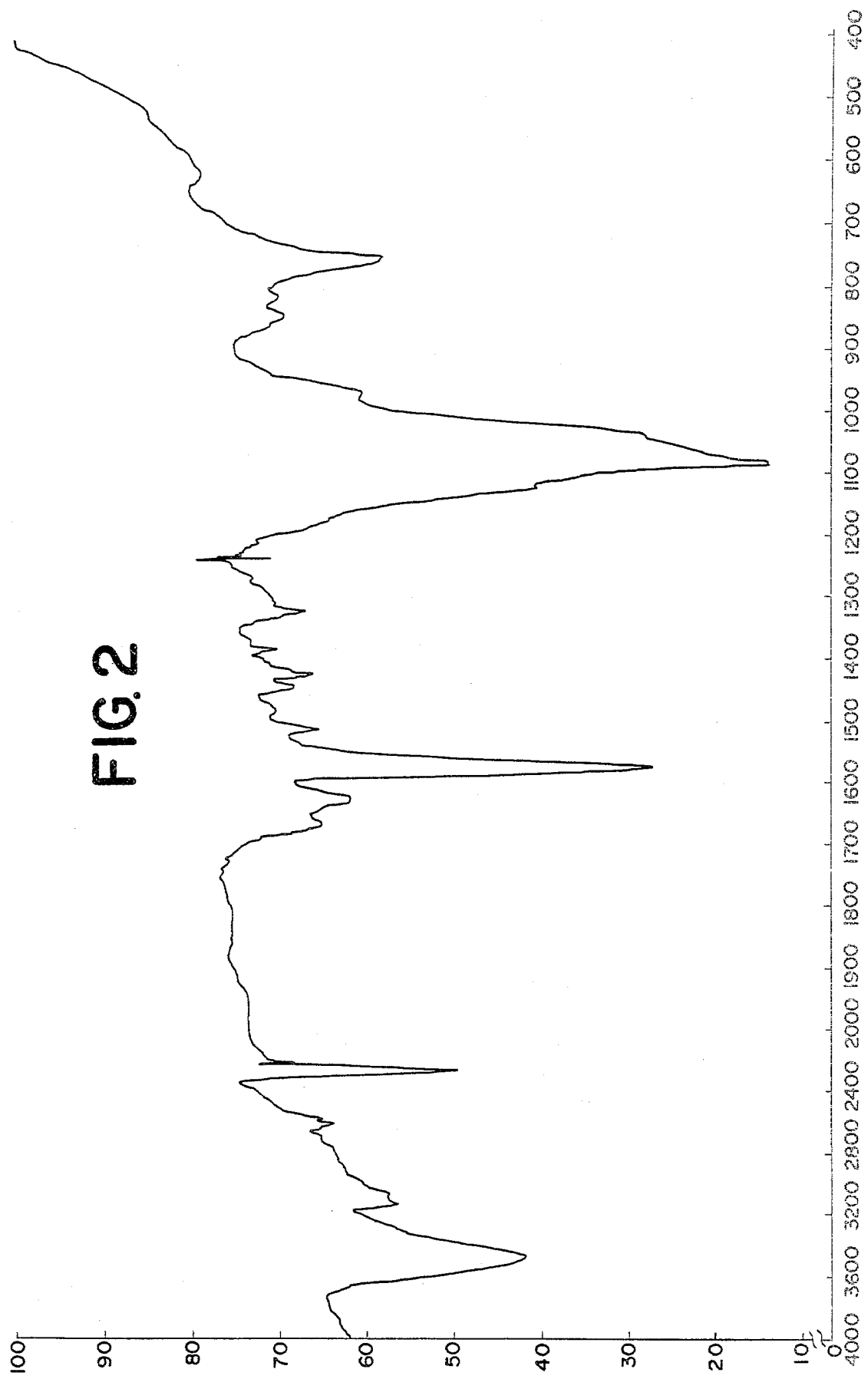

FIG. 2 illustrates the infrared absorption spectrum of this product.

Next, after dissolving 4.3 g of this tetrazonium salt together with 2-hydroxy-3-naphthoic acid anilide as coupler in 600 ml of cooled N,N-dimethyl formamide, a solution consisting of 7.0 g of sodium acetate and 100 ml of water was added dropwise to the resulting solution at a temperature of 4° to 8° C. in about an hour, and stirring was conducted for about 3 hours at the room temperature. Thereafter, the resulting precipitate was filtered, washed 3 times with 600 ml of water, and then rinsed 8 times with 600 ml of N,N-dimethyl formamide. Subsequently, by rinsing out the remaining N,N-dimethyl formamide with acetone and drying the thus obtained bluish black crystals at a temperature of 70° C. and under a reduced pressure of 2 mmHg, there were obtained 6.2 g (yield rate: 91.2%) of a disazo compound corresponding to Compound No. I. FIG. 3 illustrates the infrared absorption spectrum of this compound.

EXAMPLES 2 THROUGH 14

Preparation of disazo compounds No. II (Example 2), No. III (Example 3), No. IV (Example 4), No. V (Example 5), No. VI (Example 6), No. VII (Example 7), No. VIII (Example 8), No. IX (Example 9), No. X (Example 10), No. XI (Example 11), No. XII (Example 12), No. XIII (Example 13) and No. XIV (Example 14) (cf. Table-1)

By applying the same procedure as in Example 2 save for the employment of the respective compounds listed in the following Table-2 as coupling ingredient, disazo compounds Nos. II through XIV were prepared.

TABLE 2

| Compound No. | Coupling ingredient | Compound No. | Coupling ingredient |
|---|---|---|---|
| II | HO, CONH—⟨⟩—OCH₃ (naphthol) | IX | HO, CONH—⟨⟩ with OCH₃, OCH₃ (naphthol) |
| III | HO, CONH—⟨⟩ with OCH₃ (naphthol) | X | HO, CONH—⟨⟩—CH₃ with CH₃ (naphthol) |

TABLE 2-continued

| Compound No. | Coupling ingredient | Compound No. | Coupling ingredient |
|---|---|---|---|
| IV | HO, CONH—C₆H₄—CH₃ (2-methylphenyl) on 2-hydroxy-3-naphthamide | XI | HO, CONH—C₆H₃(CH₃)(Cl) on 2-hydroxy-3-naphthamide |
| V | HO, CONH—C₆H₄—Cl on 2-hydroxy-3-naphthamide | XII | HO, CONH—C₆H₂(OCH₃)₂Cl on 2-hydroxy-3-naphthamide |
| VI | HO, CONH—C₆H₄—N(CH₃)₂ on 2-hydroxy-3-naphthamide | XIII | 3-methyl-1-phenyl-5-pyrazolone derivative |
| VII | HO, CONH—C₆H₄—NO₂ (meta) on 2-hydroxy-3-naphthamide | XIV | 3-methyl-1-(4-nitrophenyl)-5-pyrazolone derivative |
| VIII | HO, CONH—C₆H₄—NO₂ (para) on 2-hydroxy-3-naphthamide | | |

EXAMPLE 15

Preparation of Electrophotographic Sensitive Material

1 Part by weight of polyester resin (namely, Polyester Adhesive 49000, the manufacture of Du Pont Inc.), 1 part by weight of the disazo compound a-(1) expressed by the general formula II and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7 μ-thick photosensitive layer and a structure illustrated in FIG. 4.

Subsequently, after charging positive electricity on the photosensitive layer of this photosensitive material by applying +6 KV corona discharge for 20 seconds by means of a commercial electrostatic copying paper testing apparatus, the photosensitive material was left alone in the dark for 20 seconds, and the surface potential Vpo(volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure $E_{1/2}$ (lux-sec.) was obtained. The result was as follows:

$Vpo = 800$ V, $E_{1/2} = 7.7$ lux-sec.

EXAMPLES 16 THROUGH 24

Preparation of Electrophotographic Sensitive Materials

Varieties of photosensitive materials were prepared by applying the same procedure as in Example 15 save for employing the respective disazo compounds referred to by number in the following Table-3 in place of the disazo compound a-(1) used in Example 15. When these photosensitive materials were subsequently subjected to the same measurement of Vpo and $E_{1/2}$ as in Example 15, the result was as shown in Table-3, respectively.

TABLE 3

| Example No. | Disazo compound No. | Vpo (volt) | E1/2 (lux . sec.) |
|---|---|---|---|
| 16 | a-(2) | 900 | 10 |
| 17 | a-(5) | 930 | 3 |
| 18 | a-(7) | 850 | 10 |
| 19 | a-(9) | 930 | 5 |
| 20 | a-(12) | 950 | 8 |
| 21 | a-(17) | 990 | 4 |
| 22 | a-(18) | 890 | 10 |
| 23 | a-(31) | 930 | 2 |
| 24 | a-(44) | 1000 | 5 |

EXAMPLE 25

Preparation of Electrophotographic Sensitive Material

10 Parts by weight of polyester resin (the same as that in Example 15), 10 parts by weight of 2,4,7-trinitro-9-fluorenone, 2 parts by weight of disazo compound a-(1) expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10 μ-thick photosensitive layer and a structure illustrated in FIG. 5. Subsequently, measurement of Vpo and E½ of this photosensitive material was conducted through the same procedure as in Example 15 save for applying −6 KV corona discharge instead of +6 KV corona discharge employed in Example 15. The result was as follows:

Vpo = −550 V, E½ = 8 lux·sec.

EXAMPLES 26 THROUGH 34

Preparation of Electrophotographic Sensitive Materials

Varieties of photosensitive materials having a structure illustrated in FIG. 5 were prepared by applying the same procedure as in Example 25 save for employing the respective disazo compounds referred to by number in the following Table-4 in place of the disazo compound a-(1) used in Example 25. When these photosensitive materials were subsequently subjected to the same measurement of Vpo and E½ as in Example 25, the result was as shown in Table-4, respectively.

TABLE 4

| Example No. | Disazo compound No. | Vpo (volt) | E½ (lux . sec.) |
|---|---|---|---|
| 26 | a-(3) | 550 | 5 |
| 27 | a-(6) | 630 | 7 |
| 28 | a-(8) | 490 | 9 |
| 29 | a-(10) | 500 | 8 |
| 30 | a-(14) | 520 | 10 |
| 31 | a-(32) | 630 | 9 |
| 32 | a-(45) | 380 | 13 |
| 33 | a-(55) | 480 | 19 |
| 34 | a-(61) | 690 | 25 |

EXAMPLE 35

Preparation of Electrophotographic Sensitive Material

10 Parts by weight of polyester resin (the same as that in Example 15), 10 parts by weight of 2,5-bis(4-diethylaminophenyl)-1,3,4-oxadiazole, 2 parts by weight of the disazo compound a-(1) expressed by the general formula II and 198 parts by weight of tetrahydrofuran were pulverized and mixed together within a ball-mill, and the resulting dispersion was coated, by means of a doctor blade, on a polyester film deposited with aluminum through vaccum evaporation and was dried at a temperature of 120° C. for 10 minutes, whereby there was prepared a photosensitive material having a 10 μ-thick photosensitive layer and a structure illustrated in FIG. 5. When this photosensitive material was subsequently subjected to the same measurement as in Example 15, the result was as follows:

Vpo = 830 V, E½ = 8 lux·sec.

EXAMPLES 36 THROUGH 44

Preparation of Electrophotographic Sensitive Materials

Varieties of photosensitive materials having a structure illustrated in FIG. 5 were prepared by applying the same procedure as in Example 35 save for employing the respective disazo compounds the disazo compound a-(1) used in Example 35. When these photosensitive materials were subsequently subjected to the same measurement of Vpo and E½ as in Example 15, the result was as shown in the following Table-5, respectively.

TABLE 5

| Example No. | Disazo compound No. | Vpo (volt) | E½ (lus . sec.) |
|---|---|---|---|
| 36 | a-(4) | 800 | 8 |
| 37 | a-(9) | 820 | 7 |
| 38 | a-(11) | 800 | 8 |
| 39 | a-(13) | 790 | 9 |
| 40 | a-(15) | 700 | 13 |
| 41 | a-(22) | 600 | 10 |
| 42 | a-(25) | 780 | 6 |
| 43 | a-(30) | 820 | 7 |
| 44 | a-(38) | 700 | 13 |

EXAMPLE 45

Preparation of Electrophotographic Sensitive Material

200 Parts by weight of poly-N-vinyl carbazole, 33 parts by weight of 2,4,7-trinitro-9-fluorenone, 20 parts by weight of polyester resin (the same as that in Example 15) and 20 parts by weight of the disazo compound a-(1) expressed by the general formula II as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was obtained a photosensitive material having a 13 μ-thick photosensitive layer and a structure illustrated in FIG. 5. When this photosensitive material was subjected to the same measurement as in Example 15, the result was as follows:

Vpo = 1,020 V, E½ = 3 lux·sec.

EXAMPLES 46 THROUGH 54

Preparation of Electrophotographic Sensitive Materials

Varieties of photosensitive materials having a structure illustrated in FIG. 5 were prepared by applying the same procedure as in Example 45 save for employing the respective disazo referred to by number in the following Table-6 in place of the disazo compound a-(1) used in Example 45. When these photosensitive materials were subsequently subjected to the same measurement of Vpo and E½ as in Example 15, the result was as shown in the following Table-6, respectively.

TABLE 6

| Example No. | Disazo compound No. | Vpo (volt) | E½ (lux . sec.) |
|---|---|---|---|
| 46 | a-(4) | 1000 | 3 |
| 47 | a-(2) | 1100 | 3 |
| 48 | a-(5) | 1200 | 2 |
| 49 | a-(7) | 1000 | 7 |
| 50 | a-(9) | 980 | 8 |

TABLE 6-continued

| Example No. | Disazo compound No. | Vpo (volt) | E½ (lux . sec.) |
|---|---|---|---|
| 51 | a-(13) | 1020 | 6 |
| 52 | a-(21) | 1000 | 5 |
| 53 | a-(63) | 1200 | 13 |
| 54 | a-(64) | 800 | 25 |

EXAMPLE 55

Preparation of Electrophotographic Sensitive Material

2 Parts by weight of the disazo compound a-(1) expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1 μ-thick charge-carrier generating layer. Meanwhile, another dispersion was prepared by mixing 2 parts by weight of 2,4,7-trinitro-9-fluorenone, 2 parts by weight of polycarbonate (namely, Panlite L, the manufacture of TEIJIN Co. Ltd.) and 46 parts by weight of tetrahydrofuran together, and this dispersion was coated on the foregoing charge-carrier generating layer by means of a doctor blade and then dried at a temperature of 100° C. for 10 minutes to form a 10 μ-thick charge-transfer medium layer, whereby there was obtained a photosensitive material having a structure illustrated in FIG. 6. When the thus obtained photosensitive material was subjected to the same measurement as in Example 15, the result was as follows:

Vpo=900 V, E½=13 lux·sec.

EXAMPLES 56 THROUGH 64

Preparation of Electrophotographic Sensitive Materials

Varieties of photosensitive materials having a structure illustrated in FIG. 6 were prepared by applying the same procedure as in Example 55 save for employing the respective disazo compounds of the disazo compound a-(1) used in Example 55. When these photosensitive materials were subjected to the same measurement of Vpo and E½ as in Example 15, the result was as shown in Table-7, respectively.

TABLE 7

| Example No. | Disazo compound No. | Vpo (volt) | E½ (lux . sec.) |
|---|---|---|---|
| 56 | a-(2) | 900 | 10 |
| 57 | a-(5) | 950 | 13 |
| 58 | a-(11) | 890 | 13 |
| 59 | a-(18) | 900 | 15 |
| 60 | a-(22) | 890 | 17 |
| 61 | a-(30) | 920 | 18 |
| 62 | a-(44) | 900 | 20 |
| 63 | a-(59) | 900 | 25 |
| 64 | a-(61) | 900 | 30 |

EXAMPLE 65

Preparation of Electrophotographic Sensitive Material

2 Parts by weight of the disazo compound a-(1) expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1 μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as that in Example 55) and 46 parts by weight of tetrahydrofuran together, and this dispersion was coated on the foregoing charge-carrier generating layer by means of a doctor blade and then dried at a temperature of 120° C. for 10 minutes to form a 10 μ-thick charge-transfer medium layer, whereby there was obtained a laminate-type photosensitive material illustrated in FIG. 6. When the thus obtained photosensitive material was subjected to the same measurment of Vpo and E½ as in Example 15 save for applying −6 KV corona discharge instead of +6 KV corona discharge, the result was as follows:

Vpo=1,000 V, E½=5 lux·sec.

EXAMPLES 66 THROUGH 74

Preparation of Electrophotographic Sensitive Materials

Varieties of photosensitive materials having the same structure as that of Example 65 were prepared by employing the respective disazo compound referred to by number in the following Table-8 in place of the disazo compound a-(1) used in Example 65. When these photosensitive materials were subjected to the same measurement of Vpo and E½ as in Example 15, the result was as shown in Table-8, respectively.

TABLE 8

| Example No. | Disazo compound No. | Vpo (volt) | E1/2 (lux . sec.) |
|---|---|---|---|
| 66 | a-(2) | 1000 | 5 |
| 67 | a-(5) | 1000 | 8 |
| 68 | a-(11) | 990 | 5 |
| 69 | a-(18) | 1010 | 6 |
| 70 | a-(22) | 1000 | 8 |
| 71 | a-(30) | 1100 | 10 |
| 72 | a-(44) | 1120 | 15 |
| 73 | a-(59) | 1130 | 25 |
| 74 | a-(61) | 1000 | 30 |

EXAMPLE 75

Preparation of Electrophotographic Sensitive Material

1 Part by weight of polyester resin (namely, Polyester Adhesive 49000, the manufacture of Du Pont Inc.), 1 part by weight of the disazo compound b-(1) expressed by the general formula II and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having 7 μ-thick photosensitive layer and a structure illustrated in FIG. 4.

Subsequently, after charging positive electricity on the photosensitive layer side of this photosensitive material by applying +6 KV corona discharge for 20 seconds by means of a commercial electrostatic copying paper testing apparatus, the photosensitive material was left alone in the dark for 20 seconds, and the surface potential Vpo(volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure $E_{\frac{1}{2}}$ (lux·sec.) was obtained. The result was as follows:

Vpo = 720 V, $E_{\frac{1}{2}}$ = 9.3 lux·sec.

EXAMPLES 76 THROUGH 84

Preparation of Electrophotographic Sensitive Materials

Varieties of photosensitive materials were prepared by applying the same procedure as in Example 75 save for employing the respective disazo compounds referred to by number in the following Table-9 in place of the disazo compound b-(1) used in Example 75. When these photosensitive materials were subsequently subjected to the same measurement of Vpo and $E_{\frac{1}{2}}$ as in Example 75, the result was as shown in Table-9, respectively.

TABLE 9

| Example No. | Disazo compound No. | Vpo (volt) | E1/2 (lux . sec.) |
|---|---|---|---|
| 76 | b-(3) | 800 | 9.0 |
| 77 | b-(5) | 790 | 4.9 |
| 78 | b-(18) | 850 | 10.0 |
| 79 | b-(20) | 920 | 5.5 |
| 80 | b-(32) | 900 | 8.2 |
| 81 | b-(40) | 780 | 6.3 |
| 82 | b-(41) | 800 | 6.5 |
| 83 | b-(50) | 900 | 18.2 |
| 84 | b-(63) | 950 | 25.1 |

EXAMPLE 85

Preparation of Electrophotographic Sensitive Material

10 Parts by weight of polyester resin (the same as that in Example 75), 10 parts by weight of 2,4,7-trinitro-9-fluorenone, 2 parts by weight of the disazo compound b-(1) expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10 μ-thick photosensitive layer and a structure illustrated in FIG. 5. When this photosensitive material was subsequently subjected to the same measurement of Vpo and $E_{\frac{1}{2}}$ as in Example 75 save for applying −6 KV corona discharge instead of +6 KV corona discharge, the result was as follows:

Vpo = 600 V, $E_{\frac{1}{2}}$ = 12.5 lux·sec.

EXAMPLES 86 THROUGH 94

Preparation of Electrophotographic Sensitive Materials

Varieties of photosensitive materials having a structure illustrated in FIG. 5 were prepared by applying the same procedure as in Example 85 save for employing respective disazo compounds referred to by number in the following Table-10 in place of the disazo compound b-(1) used in Example 85. When these photosensitive materials were subsequently subjected to the same measurement of Vpo and $E_{\frac{1}{2}}$ as in Example 85, the result was as shown in Table-10, respectively.

TABLE 10

| Example No. | Disazo compound No. | Vpo (volt) | E1/2 (lux . sec.) |
|---|---|---|---|
| 86 | b-(4) | 700 | 9.1 |
| 87 | b-(5) | 810 | 11.5 |
| 88 | b-(15) | 690 | 9.0 |
| 89 | b-(22) | 720 | 9.5 |
| 90 | b-(23) | 680 | 13.5 |
| 91 | b-(30) | 700 | 7.0 |
| 92 | b-(39) | 650 | 12.5 |
| 93 | b-(49) | 750 | 18.0 |
| 94 | b-(63) | 640 | 21.1 |

EXAMPLE 95

Preparation of Electrophotographic Sensitive Material

10 Parts by weight of polyester resin (the same as that in Example 75), 10 parts by weight of 2,5-bis(4-diethylaminophenyl)-1,3,4-oxadiazole, 2 parts by weight of the disazo compound b-(1) expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was obtained a photosensitive material having a 10 μ-thick photosensitive layer and a structure illustrated in FIG. 5. When this photosensitive material was subsequently subjected to the same measurement of Vpo and $E_{\frac{1}{2}}$ as in Example 75, the result was as follows:

Vpo = 850 V, $E_{\frac{1}{2}}$ = 6.5 lux·sec.

EXAMPLES 96 THROUGH 104

Preparation of Electrophotographic Sensitive Materials

Varieties of photosensitive materials having a structure illustrated in FIG. 5 were prepared by applying the same procedure as in Example 95 save for employing the respective disazo compound referred to by number in the following Table-11 in place of the disazo compound b-(1) used in Example 95. When these photosensitive materials were subsequently subjected to the same measurement of Vpo and $E_{\frac{1}{2}}$ as in Example 75, the result was as shown in Table-11, respectively.

TABLE 11

| Example No. | Disazo compound No. | Vpo (volt) | E1/2 (lux . sec.) |
|---|---|---|---|
| 96 | b-(6) | 900 | 7.5 |
| 97 | b-(10) | 850 | 6.3 |
| 98 | b-(13) | 800 | 10.5 |
| 99 | b-(23) | 790 | 9.0 |
| 100 | b-(35) | 810 | 5.5 |
| 101 | b-(47) | 920 | 15.5 |
| 102 | b-(48) | 940 | 9.5 |
| 103 | b-(55) | 820 | 16.5 |
| 104 | b-(66) | 800 | 21.0 |

EXAMPLE 105

Preparation of Electrophotographic Sensitive Material

200 Parts by weight of poly-N-vinyl carbazole, 33 parts by weight of 2,4,7-trinitro-9-fluorenone, 20 parts by weight of polyester resin (the same as that in Example 75) and 20 parts by weight of the disazo compound b-(1) expressed by the general formula II as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was obtained a photosensitive material having a 13 μ-thick photosensitive layer and a structure illustrated in FIG. 5. When this photosensitive material was subjected to the same measurement as in Example 75, the result was as follows:

$V_{po}=990$ V, $E_{\frac{1}{2}}=4.5$ lux·sec.

EXAMPLES 106 THROUGH 114

Preparation of Electrophotographic Sensitive Materials

Varieties of photosensitive materials having a structure illustrated in FIG. 5 were prepared by applying the same procedure as in Example 75 save for employing the respective disazo compounds referred to by number in the following Table-12 in place of the disazo compound b-(1) used in Example 105. When these photosensitive materials were subjected to the same measurement of Vpo and El2 as in Example 75, the result was as shown in Table-12, respectively.

TABLE 12

| Example No. | Disazo compound No. | Vpo (volt) | E1/2 (lux . sec.) |
|---|---|---|---|
| 106 | b-(2) | 980 | 3.5 |
| 107 | b-(4) | 1000 | 5.5 |
| 108 | b-(13) | 950 | 3.0 |
| 109 | b-(17) | 990 | 2.5 |
| 110 | b-(20) | 980 | 10.0 |
| 111 | b-(21) | 1010 | 9.5 |
| 112 | b-(43) | 1200 | 8.5 |
| 113 | b-(59) | 950 | 15.0 |
| 114 | b-(62) | 1000 | 12.5 |

EXAMPLE 115

Preparation of Electrophotographic Sensitive Material

2 Parts by weight of the disazo compound b-(1) expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1 μ-thick charge-carrier generating layer. Meanwhile, 2 parts by weight of 2,4,7-trinitro-9-fluorenone, 2 parts by weight of polycarbonate (namely, Panlite L, the manufacture of TEIJIN Co., Ltd.) and 46 parts by weight of tetrahydrofuran were mixed and dissolved, and the resulting solution was coated on the foregoing charge-carrier generating layer by means of a doctor blade and dried at a temperature of 100° C. for 10 minutes to form a 10 μ-thick charge-transfer medium layer, whereby there was obtained a photosensitive layer having a structure illustrated in FIG. 6. When the thus prepared photosensitive material was subjected to the same measurement as in Example 75, the result was as follows:

$V_{po}=850$ V, $E_{1/2}=15$ lux·sec.

EXAMPLES 116 THROUGH 124

Preparation of Electrophotographic Sensitive Materials

Varieties of photosensitive material having a structure illustrated in FIG. 6 were prepared by applying the same procedure as in Example 115 save for employing the respective disazo compounds referred to by number in the following Table-13 in place of the disazo compound b-(1) used in Example 115. When these photosensitive materials were subjected to the same measurement of Vpo and El/2 as in Example 75, the result was as shown in Table-13, respectively.

TABLE 13

| Example No. | Disazo compound No. | Vpo (volt) | E1/2 (lux . sec.) |
|---|---|---|---|
| 116 | b-(6) | 870 | 11.5 |
| 117 | b-(11) | 840 | 9.5 |
| 118 | b-(25) | 800 | 12.5 |
| 119 | b-(30) | 780 | 8.5 |
| 120 | b-(33) | 900 | 7.0 |
| 121 | b-(47) | 890 | 25.0 |
| 122 | b-(54) | 850 | 15.4 |
| 123 | b-(55) | 900 | 13.5 |
| 124 | b-(61) | 850 | 30.5 |

EXAMPLE 125

Preparation of Electrophotographic Sensitive Material

2 Parts by weight of the disazo compound b-(1) expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby a 1 μ-thick charge-carrier generating layer was formed. Meanwhile, 2 parts by weight of 2,5-bis(4-diethylaminophenyl)-1,3,4-oxadiazole, 2 parts by weight of polycarbonate (the same as that in Example 115) and 46 parts by weight of tetrahydrofuran were mixed and dissolved, and the resulting solution was coated on the foregoing charge-carrier generating layer by means of a doctor blade and dried at a temperature of 120° C. for 10 minutes to form a 10 μ-thick charge-transfer medium layer, whereby there was obtained a laminate-type photosensitive material illustrated in FIG. 6. When the thus prepared photosensitive material was subjected to the same measurement as in Example 75 save for applying −6 KV corona discharge, the result was as follows:

$V_{po}=1,050$ V, $E_{1/2}=6.5$ lux·sec.

EXAMPLES 126 THROUGH 134

Preparation of Electrophotographic sensitive Materials

Varieties of photosensitive materials similar to that in Example 125 were prepared by applying the same procedure as in Example 125 save for employing the respective disazo compound referred to by number in the following Table-14 in place of the disazo compound b-(1) used in Example 125. When these photosensitive materials were subjected to the same measurement of Vpo and El/2 as in Example 75, the result was as shown in Table-14.

TABLE 14

| Example No. | Disazo compound No. | Vpo (volt) | E1/2 (lux . sec.) |
|---|---|---|---|
| 126 | b-(4) | 980 | 7.5 |
| 127 | b-(12) | 950 | 11.2 |
| 128 | b-(14) | 1000 | 5.8 |
| 129 | b-(19) | 1100 | 9.5 |
| 130 | b-(23) | 980 | 12.5 |
| 131 | b-(30) | 890 | 15.0 |
| 132 | b-(41) | 900 | 9.0 |
| 133 | b-(60) | 950 | 25.0 |
| 134 | b-(63) | 1050 | 19.4 |

EXAMPLE 135

Preparation of Electrophotographic Sensitive Material

1 Part by weight of polyester resin (namely, Polyester Adhesive 49000, the manufacture of Du Pont Inc.), 1 part by weight of the disazo compound c-(1) expressed by the general formula II and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7 μ-thick photosensitive layer and a structure illustrated in FIG. 3.

Subsequently, after charging positive electricity on the photosensitive layer side of this photosensitive material by applying +6 KV corona discharge for 20 seconds by means of a commercial electrostatic copying paper testing apparatus, the photosensitive material was left alone in the dark for 20 seconds, and the surface potential Vpo (volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure E½ (lux·sec.) was obtained. The result was as follows:

Vpo=810 V, E½=8.3 lux·sec.

EXAMPLES 136 THROUGH 144

Preparation of Electrophotographic Sensitive Materials

Varieties of photosensitive materials were prepared by applying the same procedure as in Example 135 save for employing the respective disazo compounds referred to by number in the following Table-15 in place of the disazo compound c-(1) used in Example 135. When these photosensitive materials were subsequently subjected to the same measurement of Vpo and E½ as in Example 135, the result was as shown in Table-15, respectively.

TABLE 15

| Example No. | Disazo compound No. | Vpo (volt) | E1/2 (lux . sec.) |
|---|---|---|---|
| 136 | c-(3) | 790 | 7.2 |
| 137 | c-(10) | 900 | 8.3 |
| 138 | c-(13) | 820 | 5.2 |
| 139 | c-(21) | 910 | 10.0 |
| 140 | c-(29) | 800 | 9.0 |
| 141 | c-(35) | 790 | 11.0 |
| 142 | c-(48) | 850 | 10.2 |
| 143 | c-(55) | 830 | 18.2 |
| 144 | c-(62) | 880 | 21.5 |

EXAMPLE 145

Preparation of Electrophotographic Sensitive Material

10 Parts by weight of polyester resin (the same as that in Example 135); 10 parts by weight of 2,4,7-trinitro-9-fluorenone, 2 parts by weight of the disazo compound c-(1) expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was prepared a photosensitive material having a 10 μ-thick photosensitive layer and a structure illustrated in FIG. 5. When this photosensitive material was subjected to the same measurement of Vpo and E½ as in Example 135 save for applying −6 KV corona discharge instead of +6 KV corona discharge, the result was as follows:

Vpo=700 V, E½=14.0 lux·sec.

EXAMPLES 146 through 154

Preparation of Electrophotographic Sensitive Materials

Varieties of photosensitive materials having a structure illustrated in FIG. 5 were prepared by applying the same procedure as in Example 145 save for employing the respective disazo compound referred to by number in the following Table-16 in place of the disazo compound c-(1) used in Example 145. When Vpo and E½ of these photosensitive materials were sought through the same procedure as in Example 145, the result was as shown in Table-16, respectively.

TABLE 16

| Example No. | Disazo compound No. | Vpo (volt) | E1/2 (lux . sec.) |
|---|---|---|---|
| 146 | c-(5) | 690 | 4.3 |
| 147 | c-(9) | 780 | 5.0 |
| 148 | c-(18) | 700 | 10.0 |
| 149 | c-(20) | 750 | 9.0 |
| 150 | c-(31) | 730 | 13.5 |
| 151 | c-(49) | 700 | 11.0 |
| 152 | c-(50) | 800 | 7.9 |
| 153 | c-(61) | 690 | 18.0 |
| 154 | c-(66) | 650 | 21.5 |

EXAMPLE 155

Preparation of Electrophotographic Sensitive Material

10 Parts by weight of polyester resin (the same as that in Example 135), 10 parts by weight of 2,5-bis(4-diethylaminophenyl)-1,3,4-oxadiazole, 2 parts by weight of the disazo compound c-(1) expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10

μ-thick photosensitive layer and a structure illustrated in FIG. 5. When this photosensitive material was subsequently subjected to the same measurement of Vpo and E½ as in Example 135, the result was as follows:

Vpo=860 V, E½=5 lux·sec.

EXAMPLES 156 THROUGH 164

Preparation of Electrophotographic Sensitive Materials

Varieites of photosensitive materials having a structure illustrated in FIG. 5 were prepared by applying the same procedure as in Example 155 save for employing the respective disazo compounds referred to by number in the following Table-17 in place of the disazo compound c-(1) used in Example 155. When these photosensitive materials were subjected to the same measurement as in Example 135, the result was as shown in Table-17.

TABLE 17

| Example No. | Disazo compound No. | Vpo (volt) | E1/2 (lux.sec.) |
|---|---|---|---|
| 156 | c-(2) | 905 | 4.9 |
| 157 | c-(10) | 870 | 10.0 |
| 158 | c-(11) | 890 | 8.5 |
| 159 | c-(32) | 900 | 7.0 |
| 160 | c-(34) | 850 | 20.0 |
| 161 | c-(58) | 900 | 15.0 |
| 162 | c-(60) | 910 | 19.0 |
| 163 | c-(62) | 890 | 22.1 |
| 164 | c-(64) | 890 | 19.0 |

EXAMPLE 165

Preparation of Electrophotographic Sensitive Material

200 Parts by weight of poly-N-vinyl carbazole, 33 parts by weight of 2,4,7-trinitro-9-fluorenone, 20 parts by weight of polyester resin (the same as that in Example 135), 20 parts by weight of the disazo compound c-(1) expressed by the general formula II as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was prepared a photosensitive material having a 13 μ-thick photosensitive layer and a structure illustrated in FIG. 5. When this photosensitive material was subjected to the same measurement as in Example 135, the result was as follows:

Vpo=1000 V, E½=4.5 lux·sec.

EXAMPLES 166 THROUGH 174

Preparation of Electrophotographic Sensitive Materials

Varieties of photosensitive materials having a structure illustrated in FIG. 5 were prepared by applying the same procedure as in Example 165 save for employing the respective disazo compounds referred to by number in the following Table-18 in place of the disazo compound c-(1) used in Example 165. When Vpo and E½ of these photosensitive materials were sought through the same procedure as in Example 135, the result was as shown in Table-18, respectively.

TABLE 18

| Example No. | Disazo compound No. | Vpo (volt) | E1/2 (lux.sec.) |
|---|---|---|---|
| 166 | c-(4) | 980 | 4.9 |
| 167 | c-(7) | 1000 | 3.2 |
| 168 | c-(9) | 990 | 9.0 |
| 169 | c-(12) | 1100 | 5.0 |
| 170 | c-(18) | 980 | 6.3 |
| 171 | c-(19) | 950 | 10.0 |
| 172 | c-(38) | 1050 | 13.5 |
| 173 | c-(52) | 990 | 21.0 |
| 174 | c-(60) | 10000 | 20.0 |

EXAMPLE 175

Preparation of Electrophotographic Sensitive Material

2 Parts by weight of the disazo compound c-(1) expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1 μ-thick charge-carrier generating layer. Meanwhile, 2 parts by weight of 2,4,7-trinitro-9-fluorenone, 2 parts by weight of polycarbonate (namely, Panlite L, the manufacture of TEIJIN Co., Ltd.) and 46 parts by weight of tetrahydrofuran were mixed and dissolved, and the resulting solution was coated on the foregoing charge-carrier generating layer by means of a doctor blade and dried at a temperature of 100° C. for 10 minutes to form a 10 μ-thick charge-transfer medium layer, whereby there was obtained a photosensitive material having a structure illustrated in FIG. 6. When the thus prepared photosensitive material was subjected to the same measurement as in Example 135, the result was as follows:

Vpo=890 V, E½=15 lux·sec.

EXAMPLES 176 THROUGH 184

Preparation of Electrophotographic Sensitive Materials

Varieties of photosensitive materials having a structure illustrated in FIG. 6 were prepared by applying the same procedure as in Example 175 save for employing the respective disazo compound referred to by number in the following Table-19 in place of the disazo compound c-(1) used in Example 175. Vpo and E½ of these photosensitive materials were as shown in Table-19, respectively.

TABLE 19

| Example No. | Disazo compound No. | Vpo (volt) | E1/2 (lux.sec.) |
|---|---|---|---|
| 176 | c-(5) | 890 | 9.0 |
| 177 | c-(11) | 900 | 10.5 |
| 178 | c-(21) | 850 | 12.0 |
| 179 | c-(25) | 800 | 21.0 |
| 180 | c-(30) | 900 | 19.8 |
| 181 | c-(35) | 870 | 10.9 |
| 182 | c-(42) | 800 | 12.0 |
| 183 | c-(50) | 880 | 28.1 |
| 184 | c-(60) | 870 | 25.0 |

EXAMPLE 185

Preparation of Electrophotographic Sensitive Material

2 Parts by weight of the disazo compound c-(1) expressed by by general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1 μ-thick charge-carrier generating layer. Meanwhile, 2 parts by weight of 2,5-bis(4-diethylaminophenyl)-1,3,4-oxadiazole, 2 parts by weight of polycarbonate (the same as that in Example 175) and 46 parts by weight of tetrahydrofuran were mixed and dissolved, and the resulting solution was coated on the foregoing charge-carrier generating layer by means of a doctor blade and dried at a temperature of 120° C. for 10 minutes to form a 10 μ-thick charge-transfer medium layer, whereby there was obtained a laminate-type photosensitive layer illustrated in FIG. 6. When the thus prepared photosensitive material was subjected to the same measurement as in Example 135 save for applying −6 KV corona discharge instead of +6 KV corona discharge, the result was as follows:

$V_{po} = 1000$ V, $E_{\frac{1}{2}} = 7.9$ lux·sec.

EXAMPLES 186 THROUGH 194

Preparation of Electrophotographic Sensitive Materials

Varieties of photosensitive materials similar to that in Example 185 were prepared by employing the respective disazo compounds referred to by number in the following Table-20 in place of the disazo compound c-(1) used in Example 185. $V_{po}$ and $E_{\frac{1}{2}}$ of these photosensitive materials were as shown in Table-20, respectively.

TABLE 20

| Example No. | Disazo compound No. | Vpo (volt) | E1/2 (lux.sec.) |
|---|---|---|---|
| 186 | c-(3) | 950 | 5.2 |
| 187 | c-(12) | 1000 | 4.9 |
| 188 | c-(18) | 980 | 3.1 |
| 189 | c-(19) | 1050 | 9.5 |
| 190 | c-(31) | 980 | 12.0 |
| 191 | c-(39) | 1000 | 10.0 |
| 192 | c-(50) | 1100 | 21.5 |
| 193 | c-(52) | 1000 | 20.0 |
| 194 | c-(64) | 980 | 19.0 |

EXAMPLE 195 AND COMPARATIVE EXAMPLES 1 THROUGH 4

Comparison With Well-Known Electrophotographic Sensitive Materials

2 Varieties of dispersion-type photosensitive materials having a structure illustrated in FIG. 6 were prepared by applying the same procedure as in Example 45 save for replacing the disazo compound a-(1) used in Example 45 with the respective disazo compounds described in U.S. Pat. Nos. 3,898,084 and 4,052,210 (cf. Comparative Examples 1 and 3 in the following Table-21) in an equivalent thereto.

Further, 3 varieties of laminate-type photosensitive materials having a structure illustrated in FIG. 6 were prepared by applying the same procedure as in Example 65 save for replacing the disazo compound a-(1) used in Example 65 with the disazo compound b-(1) (cf. Example 195 in Table-21) and the disazo compounds described in the foregoing U.S. Patents (to wit, Comparative Examples 2 and 4 in Table-21) in an equivalent thereto, and also replacing 2,5-bis(4-diethylaminophenyl)-1,3,4-oxadiazole with 9-(p-diethylamino)anthracene in an equivalent thereto.

When the thus obtained photosensitive materials were subjected to the same measurement as in Example 15, the result was as shown in Table-21, respectively. In this context, the result of the same measurement conducted on the respective dispersion-type photosensitive materials obtained in Example 45 and 165 are also listed in Table-21.

TABLE 21

| Compound | Dispersion-type photosensitive material Vpo | Dispersion-type photosensitive material E½ | Laminate-type photosensitive material Vpo | Laminate-type photosensitive material E½ |
|---|---|---|---|---|
| Comparative Example 1 (U.S. Pat. No. 3,898,084) [bis-azo naphthol anilide compound] | 920 | 27.7 | — | — |
| Comparative Example 2 (U.S. Pat. No. 3,898,084) [dichloro-substituted bis-azo naphthol anilide compound] | — | — | 800 | 4.3 |
| Comparative Examples 3 and 4 (U.S. Pat. No. 4,052,210) [stilbene bis-azo naphthol anilide compound] | 435 | 17.1 | 820 | 5.8 |
| Examples 175 and 195 [b-(1)] [oxadiazole bis-azo naphthol anilide compound] | 990 | 4.5 | 880 | 3.0 |
| Example 165 [c-(1)] [anthracene stilbene bis-azo naphthol anilide compound] | 1000 | 4.5 | — | — |
| Example 45 [a-(1)] [oxadiazole bis-azo naphthol anilide compound] | 1020 | 3.0 | — | — |

What is claimed is:

1. An electrophotographic material which comprises an electrically conductive support and a photosensitive layer formed thereon, said photosensitive layer consisting essentially of fine particles of a disazo compound having the formula A'—N=N—Z—N=N—A', wherein A' is a member selected from the group consisting of

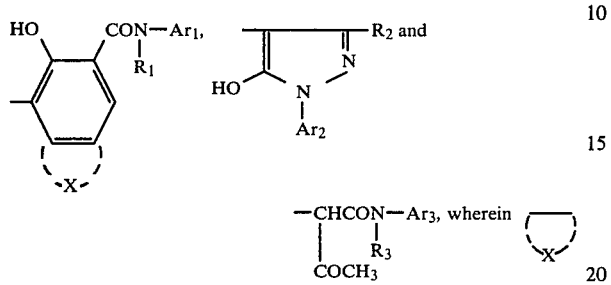

is a fused ring selected from the group consisting of benzene ring, bromobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, dimethylphenyl, methylchlorophenyl, methoxychlorophenyl, methoxybromophenyl, ethoxychlorophenyl, methylmethoxyphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, nitrophenyl, benzenesulfonamide, benzenesulfonic acid, trichlorobenzenesulfonic acid, methylphenyl, methoxyphenyl, chlorophenyl, dinitrophenyl, cyanophenyl, dimethylaminophenyl and acetylaminophenyl; each of $R_1$ and $R_3$ is a member selected from the group consisting of hydrogen, methyl, ethyl, phenyl and chlorophenyl; and $R_2$ is selected from the group consisting of methyl, carboxyl and $COOC_2H_5$; and Z is a member selected from the group consisting of

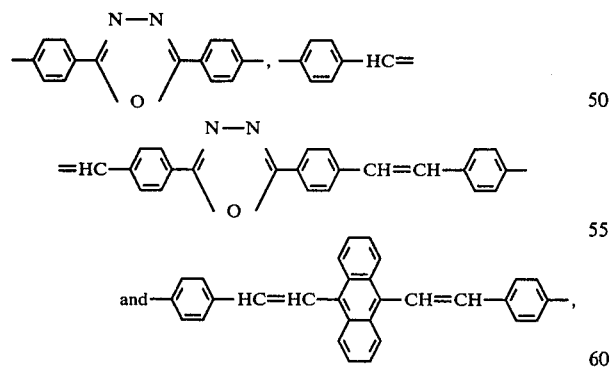

and a resinous binder.

2. An electrophotographic material according to claim 1, wherein the particle size of said disazo compound is less than 5 microns, the content of said disazo compound is in the range of from 30 to 70% based on the weight of the photosensitive layer and the thickness of said photosensitive layer is about 3 to 50 microns.

3. An electrophotographic material according to claim 1 in which A' is

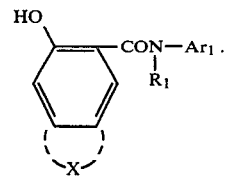

4. An electrophotographic material according to claim 1 in which A' is

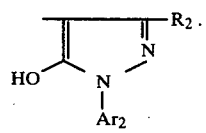

5. An electrophotographic material according to claim 1 in which Z is

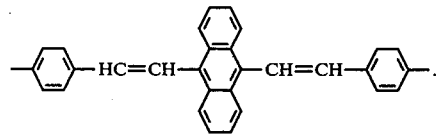

6. An electrophotographic material according to claim 5 in which A' is

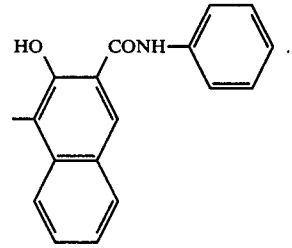

7. An electrophotographic material according to claim 5 in which A' is

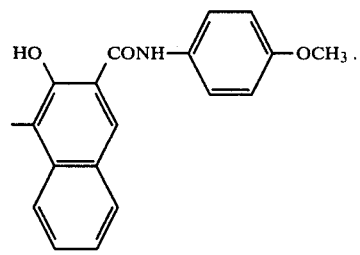

8. An electrophotographic material according to claim 5 in which A' is

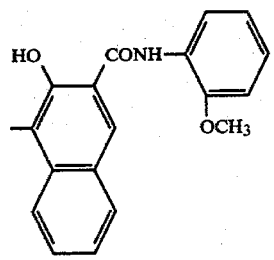

9. An electrophotographic material according to claim 5 in which A' is

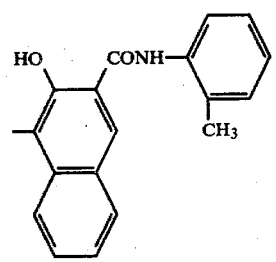

10. An electrophotographic material according to claim 5 in which A' is

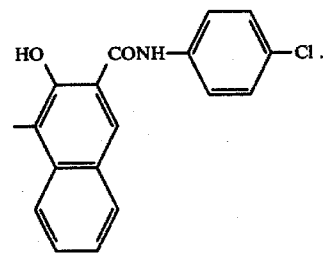

11. An electrophotographic material according to claim 5 in which A' is

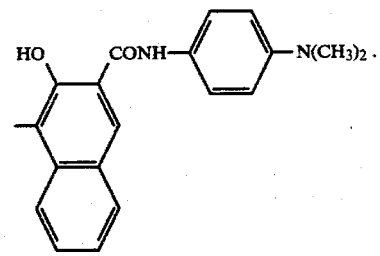

12. An electrophotographic material according to claim 5 in which A' is

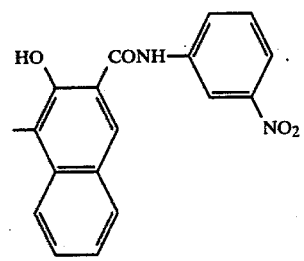

13. An electrophotographic material according to claim 5 in which A' is

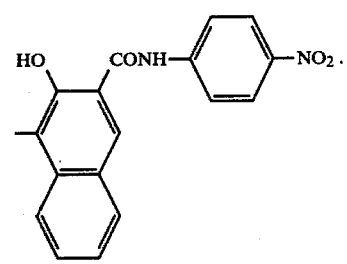

14. An electrophotographic material according to claim 5 in which A' is

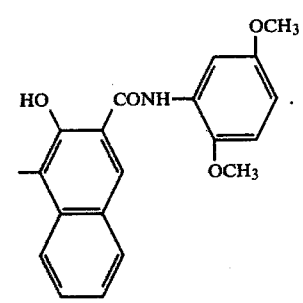

15. An electrophotographic material according to claim 5 in which A' is

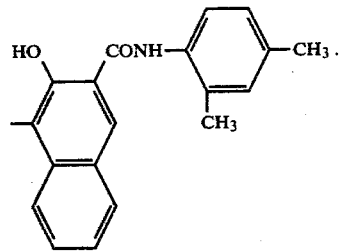

16. An electrophotographic material according to claim 5 in which A' is

17. An electrophotographic material according to claim 5 in which A' is

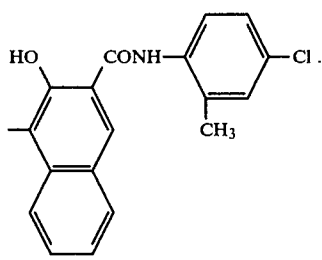

18. An electrophotographic material according to claim 5 in which A' is

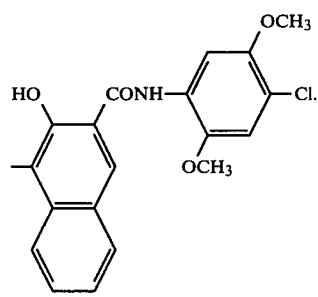

19. An electrophotographic material according to claim 5 in which A' is

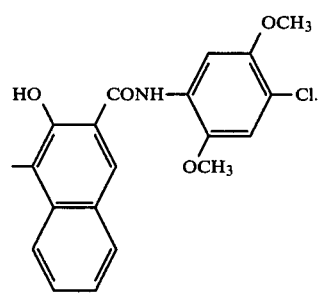

20. An electrophotographic material according to claim 5 in which A' is

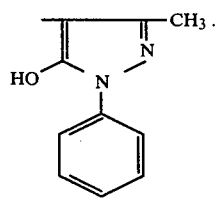

21. An electrophotographic material which comprises an electrically conductive support and a photosensitive layer formed thereon, said photosensitive layer consisting essentially of fine particles of a disazo compound having the formula A'—N=N—Z—N=N—A', wherein A' is a member selected from the group consisting of

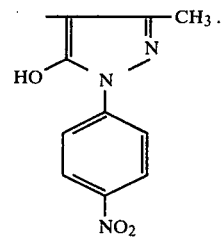

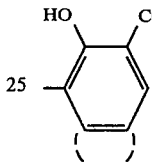

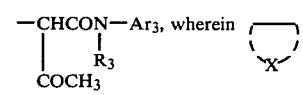

is a fused ring selected from the group consisting of benzene ring, bromobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, dimethylphenyl, methylchlorophenyl, methoxychlorophenyl, methoxybromophenyl, ethoxychlorophenyl, methylmethoxyphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, nitrophenyl, benzenesulfonamide, benzenesulfonic acid, trichlorobenzenesulfonic acid, methylphenyl, methoxyphenyl, chlorophenyl, dinitrophenyl, cyanophenyl, dimethylaminophenyl and acetylaminophenyl; each of $R_1$ and $R_3$ is a member selected from the group consisting of hydrogen, methyl, ethyl, phenyl and chlorophenyl; and $R_2$ is selected from the group consisting of methyl, carboxyl and $COOC_2H_5$; and Z is a member selected from the group consisting of

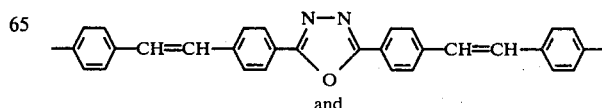

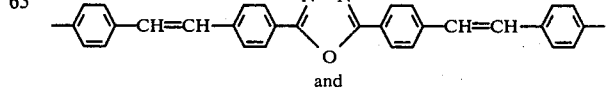

and

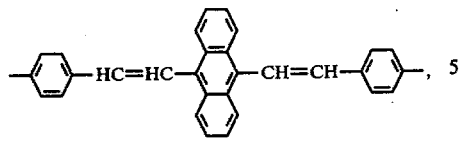

a charge-transfer substance and a resinous binder.

22. An electrophotographic material according to claim 21, wherein the particle size of said disazo compound is less than 5 microns, the content of said disazo compound and said charge-transfer substance are in the range of from 1 to 50% and from 10 to 90%, respectively, based on the weight of said photosensitive layer, and the thickness of said photosensitive layer is about 3 to 50 microns.

23. An electrophotographic material according to claim 21 in which A' is

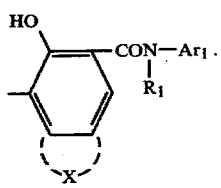

24. An electrophotographic material according to claim 21 in which A' is

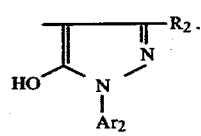

25. An electrophotographic material according to claim 21 in which Z is

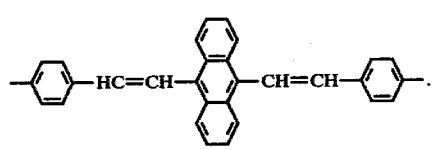

26. An electrophotographic material according to claim 25 in which A' is

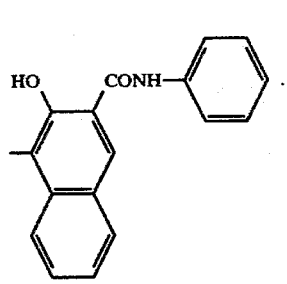

27. An electrophotographic material according to claim 25 in which A' is

28. An electrophotographic material according to claim 25 in which A' is

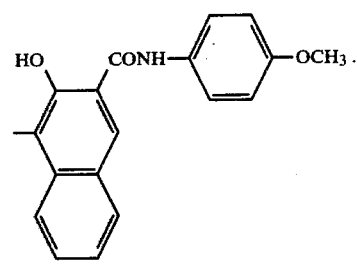

29. An electrophotographic material according to claim 25 in which A' is

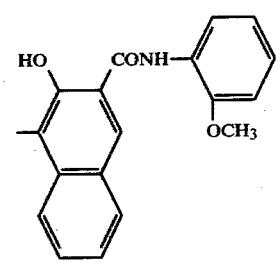

30. An electrophotographic material according to claim 25 in which A' is

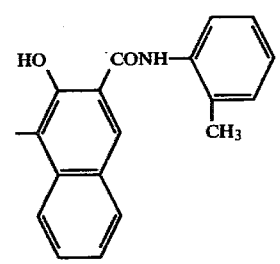

31. An electrophotographic material according to claim 25 in which A' is

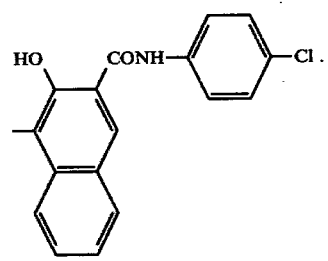

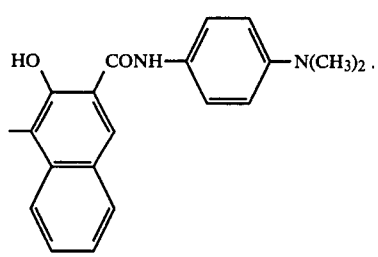

32. An electrophotographic material according to claim 25 in which A' is

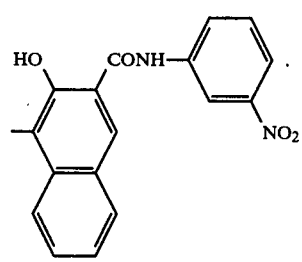

33. An electrophotographic material according to claim 25 in which A' is

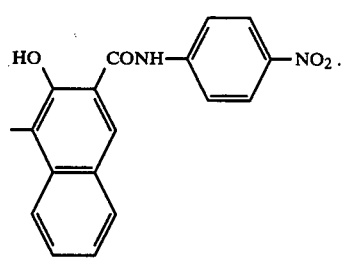

34. An electrophotographic material according to claim 25 in which A' is

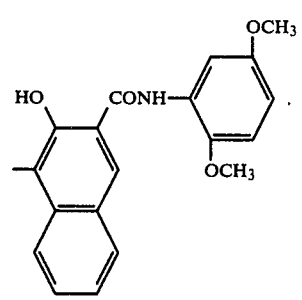

35. An electrophotographic material according to claim 25 in which A' is

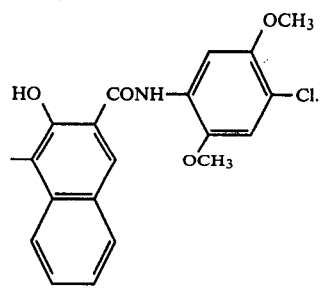

36. An electrophotographic material according to claim 25 in which A' is

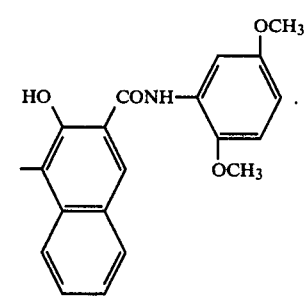

37. An electrophotographic material according to claim 25 in which A' is

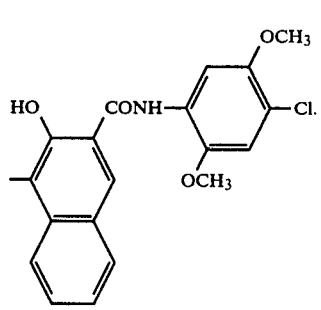

38. An electrophotographic material according to claim 25 in which A' is

39. An electrophotographic material according to claim 25 in which A' is

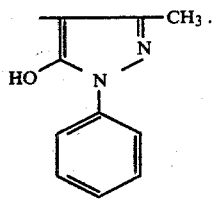

40. An electrophotographic material according to claim 25 in which A' is

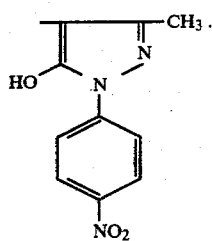

41. An electrophotographic sensitive material which comprises an electrically conductive support, a charge-carrier generating layer which consists essentially of fine particles of a disazo compound having the formula A'—N=N—Z—N=N—A', wherein A' is a member selected from the group consisting of

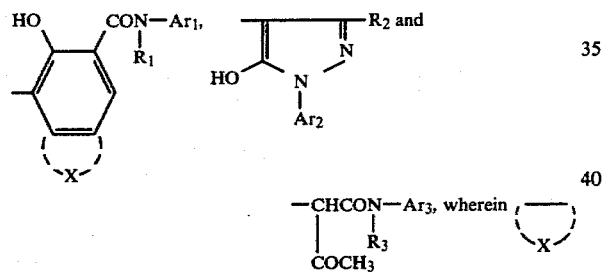

is a fused ring selected from the group consisting of benzene ring, bromobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, dimethylphenyl, methylchlorophenyl, methoxychlorophenyl, methoxybromophenyl, ethoxychlorophenyl, methylmethoxyphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, nitrophenyl, benzensulfonamide, benzenesulfonic acid, trichlorobenzenesuflonic acid, methylphenyl, methoxyphenyl, chlorophenyl, dinitrophenyl, cyanophenyl, dimethylaminophenyl and acetylaminophenyl; each of $R_1$ and $R_3$ is a member selected from the group consisting of hydrogen, methyl, ethyl, phenyl and chlorophenyl; and $R_2$ is selected from the group consisting of methyl, carboxyl and $COOC_2H_5$; and Z is a member selected from the group consisting of

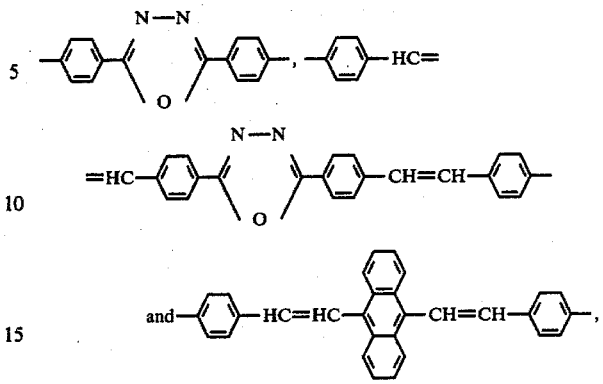

and a charge-transfer layer which consists essentially of a charge-transfer substance and a resinous binder, said two layers being formed on said conductive support.

42. An electrophotographic material according to claim 41, wherein the particle size of said disazo compound is less than 5 microns, the content of said charge-transfer substance is in the range of from 10 to 95% based on the weight of the charge-transfer layer, the thickness of said charge-carrier generating layer is less than 5 microns and the thickness of said charge-transfer layer is about 3 to 50 microns.

43. An electrophotographic material according to claim 41 in which A' is

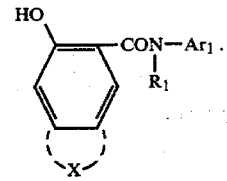

44. An electrophotographic material according to claim 41 in which A' is

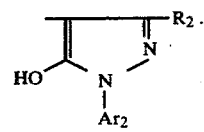

45. An electrophotographic material according to claim 41 in which Z is

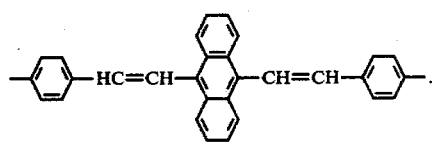

46. An electrophotographic material according to claim 45 in which A' is

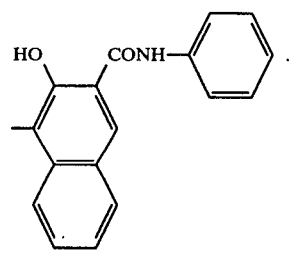

47. An electrophotographic material according to claim 45 in which A' is

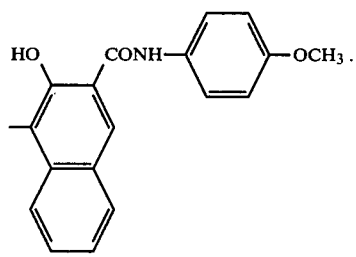

48. An electrophotographic material according to claim 45 in which A' is

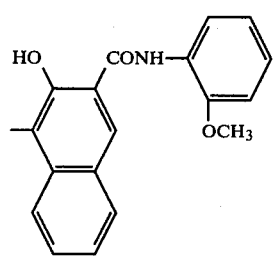

49. An electrophotographic material according to claim 45 in which A' is

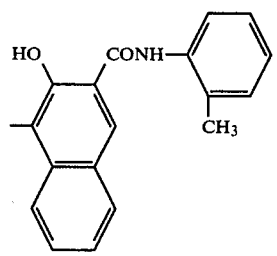

50. An electrophotographic material according to claim 45 in which A' is

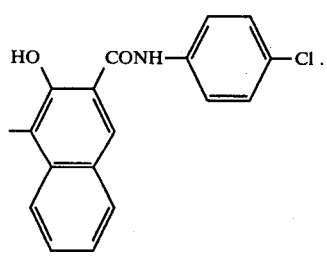

51. An electrophotographic material according to claim 45 in which A' is

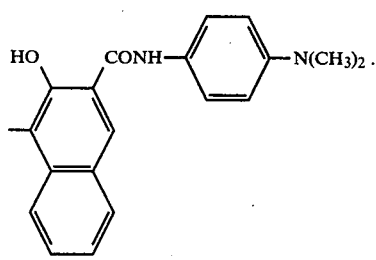

52. An electrophotographic material according to claim 45 in which A' is

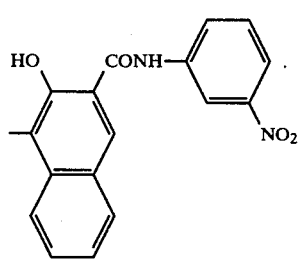

53. An electrophotographic material according to claim 45 in which A' is

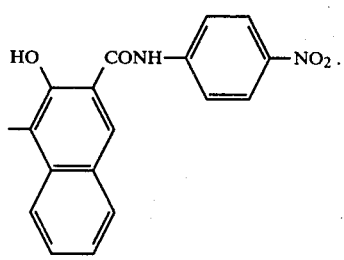

54. An electrophotographic material according to claim 45 in which A' is

55. An electrophotographic material according to claim 45 in which A' is

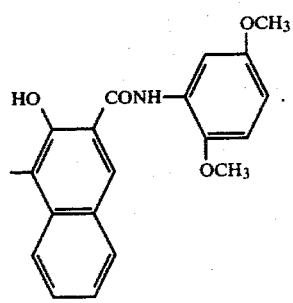

56. An electrophotographic material according to claim 45 in which A' is

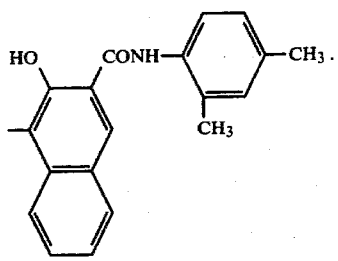

57. An electrophotographic material according to claim 45 in which A' is

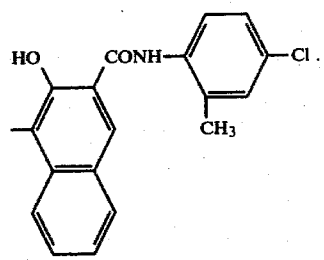

58. An electrophotographic material according to claim 45 in which A' is

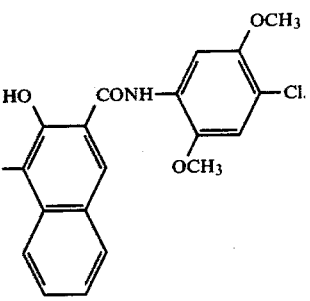

59. An electrophotographic material according to claim 45 in which A' is

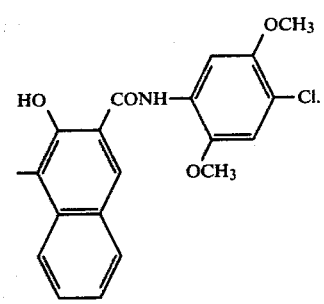

60. An electrophotographic material according to claim 45 in which A' is

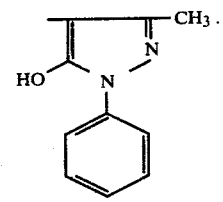

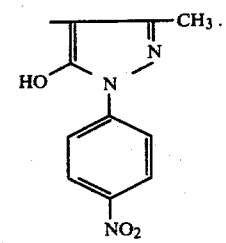

* * * * *

UNITED STATES PATENT AND TRADEMARK OFFICE
CERTIFICATE OF CORRECTION

PATENT NO. : 4,251,613
DATED : February 17, 1981
INVENTOR(S): Masaomi SASAKI et al It is certified that error appears in the above-identified patent and that said Letters Patent is hereby corrected as shown below:

Column 91, lines 34 through 50, comprising Claim 18, are cancelled.
Column 96, lines 31 through 65, comprising Claims 37 and 38, are cancelled.
Column 102, lines 14 through 29, comprising Claim 58, are cancelled.
In Column 102, following Claim 60, the following claim is inserted:

61. An electrophotographic material according to claim 25 in which A' is

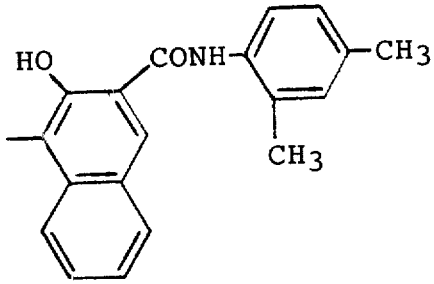

Signed and Sealed this

Twenty-fourth Day of July 1984

[SEAL]

Attest:

GERALD J. MOSSINGHOFF

Attesting Officer

Commissioner of Patents and Trademarks